US012634202B2

(12) United States Patent
Alluboyina et al.

(10) Patent No.: US 12,634,202 B2
(45) Date of Patent: May 19, 2026

(54) AGENTLESS GENERATION OF A TOPOLOGY OF COMPONENTS IN A DISTRIBUTED COMPUTING SYSTEM

(71) Applicant: Rakuten Symphony, Inc., Tokyo (JP)

(72) Inventors: Ravi Kumar Alluboyina, Santa Clara, CA (US); Sree Nandan Atur, Newark, CA (US); Stephanie Morel, East Palo Alto, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/006,708

(22) PCT Filed: Dec. 5, 2022

(86) PCT No.: PCT/US2022/051827
    § 371 (c)(1),
    (2) Date: Jan. 24, 2023

(87) PCT Pub. No.: WO2024/123306
    PCT Pub. Date: Jun. 13, 2024

(65) Prior Publication Data
    US 2025/0293936 A1      Sep. 18, 2025

(51) Int. Cl.
    *H04L 41/12*        (2022.01)
    *H04L 41/0853*      (2022.01)
    *H04L 41/0895*      (2022.01)

(52) U.S. Cl.
    CPC .......... *H04L 41/12* (2013.01); *H04L 41/0853* (2013.01)

(58) Field of Classification Search
    CPC ..... H04L 41/12; H04L 41/0853; H04L 41/28; H04L 41/06; H04L 67/10; G06F 15/173;
    (Continued)

(56) References Cited

U.S. PATENT DOCUMENTS 7,356,590 B2    4/2008  Wilson
7,516,362 B2    4/2009  Connelly
                (Continued)

FOREIGN PATENT DOCUMENTS

CN      107809321 A  *  3/2018  ......... H04L 41/0631
CN      109471727       1/2021
                (Continued)

OTHER PUBLICATIONS

DataDog. Enrich your observability data from a CSV. [online] published Nov. 18, 2021. [retrieved on 1 O Feb. 2023] Retrieved from the Internet <URL: https://web.archive.org/web/20211127021249/ https://vector.dev/highlights/2021-11-18-csv-enrichment/> entire document, especially p. 1 to p. 3.
(Continued)

*Primary Examiner* — Alina A Boutah
(74) *Attorney, Agent, or Firm* — David R. Stevens; Stevens Law Group

(57)                    ABSTRACT

A computer system retrieves provisioning data and observability data (metrics, logs, events, alerts, inventory) for a plurality of components from remote servers. The computer system extracts component identifiers from the provisioning data and the log data. The computer system identifies relationships between components from the provisioning data and the log data, such as environmental variable relationships, network relationships, session relationships, access relationships, and network connection relationships. The computer system generates a topology in which nodes represent components and edges represent relationships. The topology is updated to show changes to components and relationships. A user may interact with a visual representation of the topology to change data displayed or invoke changes to the components and relationships represented by the topology.

20 Claims, 30 Drawing Sheets

(58) Field of Classification Search
CPC ........ G06F 15/177; G06F 15/16; G06F 9/455;
G06F 9/46; G06F 9/50
See application file for complete search history.

(56) References Cited

U.S. PATENT DOCUMENTS

| | | | |
|---|---|---|---|
| 7,546,609 B2 | 6/2009 | Florissi | |
| 7,631,222 B2 | 12/2009 | Hasan | |
| 7,644,137 B2 | 1/2010 | Bozak | |
| 7,782,798 B2 | 8/2010 | Xu | |
| 8,103,664 B2 | 1/2012 | Hooks | |
| 8,429,630 B2 | 4/2013 | Nickolov | |
| 8,467,354 B1 | 6/2013 | Jerkunica | |
| 8,495,646 B2 | 7/2013 | Uchida | |
| 8,671,189 B2 | 3/2014 | Cho | |
| 8,849,987 B2 * | 9/2014 | Berg | G06F 9/5061 |
| | | | 709/224 |
| 8,949,847 B2 | 2/2015 | Kim | |
| 9,292,353 B2 | 3/2016 | Gulati | |
| 9,497,136 B1 | 11/2016 | Ramarao | |
| 9,686,207 B2 | 6/2017 | Shanmuganathan | |
| 9,848,041 B2 | 12/2017 | Einkauf | |
| 9,921,866 B2 | 3/2018 | Ganguli | |
| 9,934,061 B2 | 4/2018 | Deng | |
| 9,960,958 B2 | 5/2018 | Ramachandran | |
| 10,061,529 B2 | 8/2018 | Bobroff | |
| 10,079,730 B2 | 9/2018 | Subramanian | |
| 10,129,101 B2 | 11/2018 | Luo | |
| 10,257,044 B2 | 4/2019 | Voigt | |
| 10,257,268 B2 | 4/2019 | Cencini | |
| 10,326,673 B2 | 6/2019 | Kulshreshtha | |
| 10,333,820 B1 * | 6/2019 | Wang | H04L 45/02 |
| 10,389,596 B2 * | 8/2019 | Strobel | H04L 67/1004 |
| 10,404,523 B2 | 9/2019 | Cencini | |
| 10,419,437 B2 | 9/2019 | Hu | |
| 10,430,094 B2 | 10/2019 | Waldspurger | |
| 10,498,642 B1 | 12/2019 | Morris | |
| 10,521,324 B2 | 12/2019 | Whitner | |
| 10,609,129 B2 | 3/2020 | Lam | |
| 10,637,737 B2 * | 4/2020 | Whitner | H04L 41/12 |
| 10,659,310 B1 * | 5/2020 | Oren | H04L 41/0803 |
| 10,673,706 B2 * | 6/2020 | Garcia | H04L 41/12 |
| 10,686,675 B2 * | 6/2020 | Cordray | H04L 41/0894 |
| 10,693,743 B2 | 6/2020 | Zhong | |
| 10,833,940 B2 | 11/2020 | Cencini | |
| 10,862,781 B2 | 12/2020 | Al Ramady | |
| 10,877,865 B2 | 12/2020 | Johnsson | |
| 10,893,100 B2 * | 1/2021 | Jamjoom | H04L 45/64 |
| 10,999,145 B2 | 5/2021 | Debolle | |
| 11,003,502 B2 | 5/2021 | Ahmed | |
| 11,010,197 B2 | 5/2021 | Beveridge | |
| 11,258,688 B2 | 2/2022 | Gell | |
| 11,316,763 B1 | 4/2022 | Chitalia et al. | |
| 11,425,054 B1 | 8/2022 | Dunsmore et al. | |
| 11,431,786 B1 * | 8/2022 | Keren | H04L 67/10 |
| 11,483,205 B1 | 10/2022 | Jain | |
| 11,615,082 B1 | 3/2023 | Shrigondekar | |
| 11,843,523 B1 * | 12/2023 | Gdaliahu | H04L 67/50 |
| 12,039,369 B1 | 7/2024 | Neelakantam | |
| 12,095,794 B1 * | 9/2024 | Karaje | H04L 67/306 |
| 2004/0042416 A1 | 3/2004 | Ngo | |
| 2004/0046785 A1 * | 3/2004 | Keller | H04L 41/5054 |
| | | | 715/734 |
| 2005/0038818 A1 | 2/2005 | Hooks | |
| 2006/0020866 A1 | 1/2006 | Lo | |
| 2007/0283194 A1 * | 12/2007 | Villella | G06F 11/3476 |
| | | | 714/E11.204 |
| 2008/0046887 A1 | 2/2008 | Ditlow | |
| 2008/0091806 A1 | 4/2008 | Shen | |
| 2008/0244600 A1 | 10/2008 | Wong | |
| 2009/0006487 A1 | 1/2009 | Gavrilov | |
| 2009/0180399 A1 | 7/2009 | Li | |
| 2009/0235324 A1 * | 9/2009 | Griffin | G06F 21/629 |
| | | | 726/1 |
| 2009/0328051 A1 | 12/2009 | Maes | |

| | | | |
|---|---|---|---|
| 2011/0071981 A1 | 3/2011 | Ghosh | |
| 2012/0005542 A1 * | 1/2012 | Petersen | H04L 63/1425 |
| | | | 714/48 |
| 2012/0176975 A1 | 7/2012 | Choi | |
| 2013/0111468 A1 | 5/2013 | Davis et al. | |
| 2013/0150039 A1 | 6/2013 | Ramie | |
| 2013/0163471 A1 | 6/2013 | Indukuri et al. | |
| 2014/0280224 A1 | 9/2014 | Feinberg et al. | |
| 2015/0039677 A1 | 2/2015 | Kahal | |
| 2015/0074679 A1 | 3/2015 | Fenoglio | |
| 2015/0163163 A1 | 6/2015 | Kato | |
| 2015/0212856 A1 | 7/2015 | Shanmuganathan et al. | |
| 2016/0085413 A1 | 3/2016 | Luo | |
| 2016/0098292 A1 | 4/2016 | Boutin | |
| 2016/0179636 A1 | 6/2016 | Fitzpatrick et al. | |
| 2016/0234518 A1 | 8/2016 | Maes | |
| 2017/0093645 A1 * | 3/2017 | Zhong | H04L 43/045 |
| 2017/0111440 A1 | 4/2017 | Alonzo | |
| 2017/0257432 A1 | 9/2017 | Fu | |
| 2017/0264493 A1 * | 9/2017 | Cencini | H04L 67/12 |
| 2017/0286518 A1 | 10/2017 | Horowitz | |
| 2018/0097744 A1 | 4/2018 | Hu | |
| 2018/0157511 A1 | 6/2018 | Krishnan | |
| 2018/0219743 A1 * | 8/2018 | Garcia | H04L 41/0213 |
| 2018/0267837 A1 | 9/2018 | Shan | |
| 2018/0276266 A1 * | 9/2018 | Diwakar | G06F 16/2358 |
| 2018/0278496 A1 | 9/2018 | Kulshreshtha et al. | |
| 2018/0287876 A1 * | 10/2018 | Strobel | H04L 67/1004 |
| 2018/0288129 A1 * | 10/2018 | Joshi | H04L 43/08 |
| 2019/0052659 A1 * | 2/2019 | Weingarten | H04L 41/0894 |
| 2019/0068619 A1 | 2/2019 | Fan | |
| 2019/0156681 A1 | 5/2019 | Whiting | |
| 2019/0213044 A1 | 7/2019 | Cui et al. | |
| 2019/0222502 A1 | 7/2019 | May et al. | |
| 2019/0238472 A1 | 8/2019 | Anand et al. | |
| 2019/0260829 A1 | 8/2019 | Cencini | |
| 2019/0286504 A1 | 9/2019 | Muntes-Mulero | |
| 2020/0183758 A1 | 6/2020 | Subramaniam | |
| 2020/0233715 A1 | 7/2020 | Kottapalli | |
| 2021/0111943 A1 * | 4/2021 | Moser | H04L 41/142 |
| 2021/0223923 A1 * | 7/2021 | Carre | G06F 9/44505 |
| 2021/0266228 A1 | 8/2021 | Reehil | |
| 2021/0342337 A1 * | 11/2021 | Lu | G06F 11/324 |
| 2021/0409277 A1 | 12/2021 | Jeuk et al. | |
| 2022/0113790 A1 | 4/2022 | Doshi et al. | |
| 2022/0114251 A1 | 4/2022 | Guim Bernat et al. | |
| 2022/0191230 A1 * | 6/2022 | Morgan | H04L 63/20 |
| 2022/0197773 A1 | 6/2022 | Butler et al. | |
| 2023/0045472 A1 | 2/2023 | Bansal | |
| 2023/0168904 A1 | 6/2023 | Botti Filho | |
| 2023/0179651 A1 | 6/2023 | Kumar | |
| 2023/0275968 A1 | 8/2023 | Young | |
| 2024/0095079 A1 | 3/2024 | Kumar | |

FOREIGN PATENT DOCUMENTS

| | | | |
|---|---|---|---|
| EP | 1024437 | 4/2010 | |
| EP | 3611619 A1 | 2/2020 | |
| JP | 2012-032877 | 2/2012 | |
| JP | 2018-56648 A | 10/2019 | |
| JP | 2019-57037 A | 10/2020 | |
| JP | 2021-56626 A | 4/2021 | |
| JP | 2021-179745 A | 11/2021 | |
| JP | 2021-51708 A | 10/2022 | |
| JP | 2022-100620 | 3/2023 | |
| WO | WO-2007040858 A1 * | 4/2007 | G06Q 10/087 |
| WO | 2014119669 | 8/2014 | |
| WO | 2017010922 | 1/2017 | |

OTHER PUBLICATIONS

Vector; web.archive.org/web/20211127020218/https://vector.dev/
docs/reference/vrl/; Internet Archive, Nov. 27, 2021 (Year: 2021).
Lowe, Scott, "Mastering VMware vSphere 5.5", 1st edition, Shoei
Co., Ltd, Mikio Sasaki, Aug. 21, 2014, pp. 710-712.

* cited by examiner

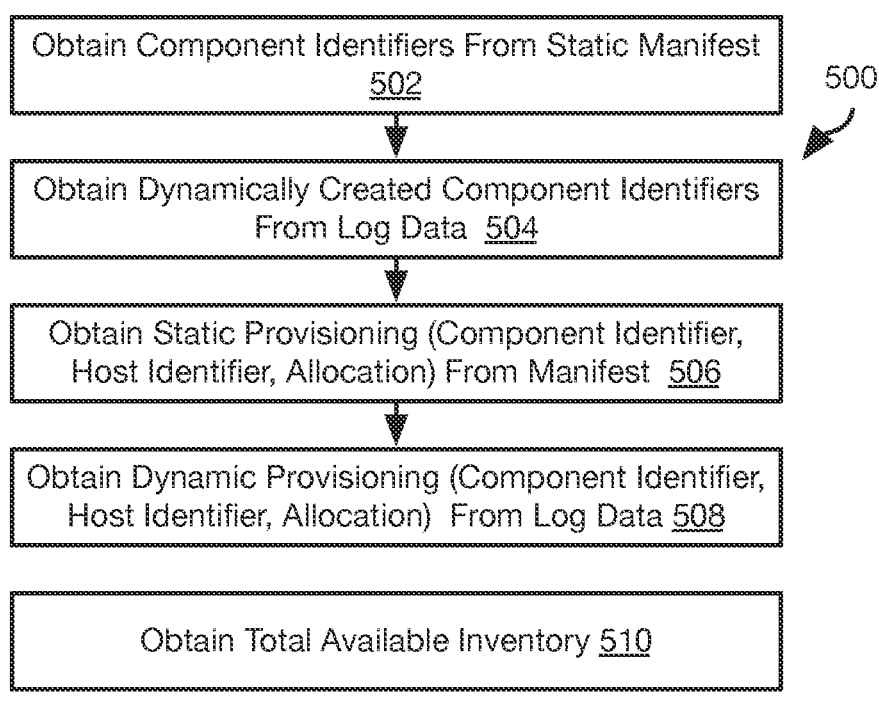

Obtain Component Identifiers From Static Manifest
502

Obtain Dynamically Created Component Identifiers
From Log Data  504

Obtain Static Provisioning (Component Identifier,
Host Identifier, Allocation) From Manifest  506

Obtain Dynamic Provisioning (Component Identifier,
Host Identifier, Allocation)  From Log Data  508

Obtain Total Available Inventory  510

Derive Usage Data for each Component Identifier
From Log Data  602

Derive Usage Data for each Host from Entity Usage
Data and Provisioning  604

Retrieve Static/Dynamic Provisioning and Inventory
For Each Host  606

Derive Active and Available Inventory  608

Modify Provisioning According to AAI  610

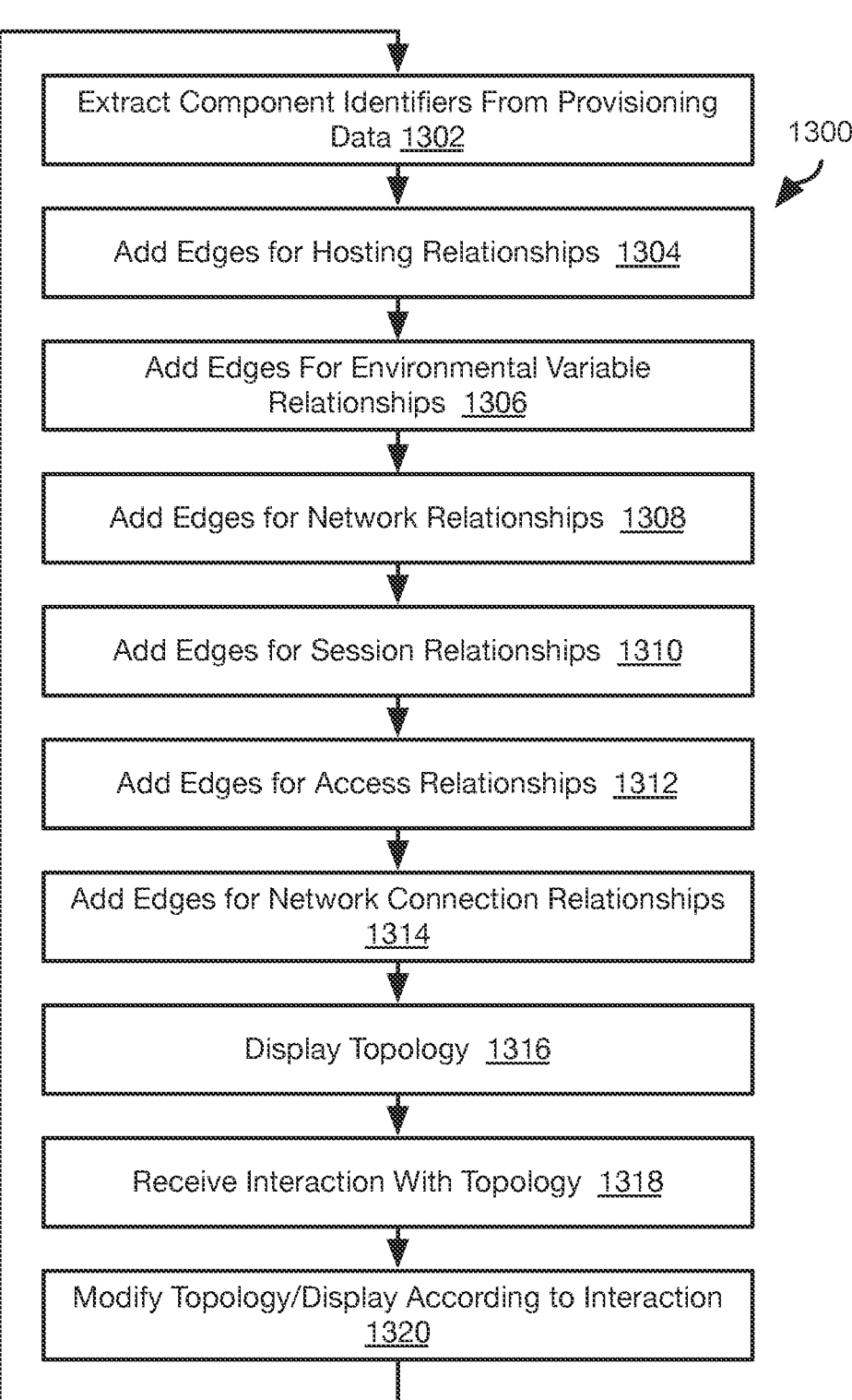

Extract Component Identifiers From Provisioning Data 1302

1300

Add Edges for Hosting Relationships 1304

Add Edges For Environmental Variable Relationships 1306

Add Edges for Network Relationships 1308

Add Edges for Session Relationships 1310

Add Edges for Access Relationships 1312

Add Edges for Network Connection Relationships 1314

Display Topology 1316

Receive Interaction With Topology 1318

Modify Topology/Display According to Interaction 1320

Determine Cluster Usages and AAIs 1702

Replan Using Component Usages 1716

Calculate Billing Reduction 1708

Threshold Met? 1710

End

N

Y

Implement Redeployment According to Plan 1712

Reduce Cloud Computing Resources 1714

Determine Cluster Usages and AAIs 1802

Attempt to Identify Consolidation(s) 1804

Found? 1806

N → End

Y

Implement Consolidation 1808

Reduce Computing Resources 1810

1800

For Each Cluster 1902

Replan Without Cluster Per AAI of Remaining Clusters and Usage Data 1904

Plan(s) Exists? 1906

N → End

Y

Add Candidate Consolidation(s) 1908

1900

AGENTLESS GENERATION OF A TOPOLOGY OF COMPONENTS IN A DISTRIBUTED COMPUTING SYSTEM

BACKGROUND

Field of the Invention

This invention relates to generating a topology of components in a distributed computing system in an agentless manner.

Background of the Invention

Whether processing ecommerce transactions, streaming content, providing back-end data management for mobile applications, or other services, the modern company requires a large amount of computing resources including processor time, memory, and persistent data storage. The amount of computing resources varies over time. Modern computing installations can dynamically sale up and scale down in order to adapt to changes in usage. For example, Kubernetes is a popular tool for adding and removing instances of applications based on usage. The high variability in usage of computing resources makes it difficult to manage on-premise computing hardware and purchased cloud computing resources.

It would be an advancement in the art to enable better management of on-premise computing hardware and purchased cloud computing resources.

SUMMARY OF THE INVENTION

An apparatus includes a computing device including one or more processing devices and one or more memory devices operably coupled to the one or more processing devices. The one or more memory devices storing executable code that, when executed by the one or more processing devices, causes the one or more processing devices to retrieve provisioning data describing instantiation of a plurality of components on remote servers over a network and extract component identifiers of the plurality of components from the provisioning data. The executable code further causes the one or more processing devices to retrieve log data from the remote servers without use of an agent executing on the remote servers. The provisioning data and log data are processed to obtain a topology of the plurality of components, the topology including nodes representing the plurality of components and edges representing relationships between pairs of components of the plurality of components.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a process flow diagram of a method for collecting provisioning data in accordance with an embodiment;

FIG. 6 is a process flow diagram of a method for deriving AAI in accordance with an embodiment.

FIG. 13 is a process flow diagram of a method for generating a representation of a topology in accordance with an embodiment;

FIGS. 16A to 16C illustrate example application redeployments and cluster consolidation in accordance with an embodiment;

DETAILED DESCRIPTION

Figure 1:
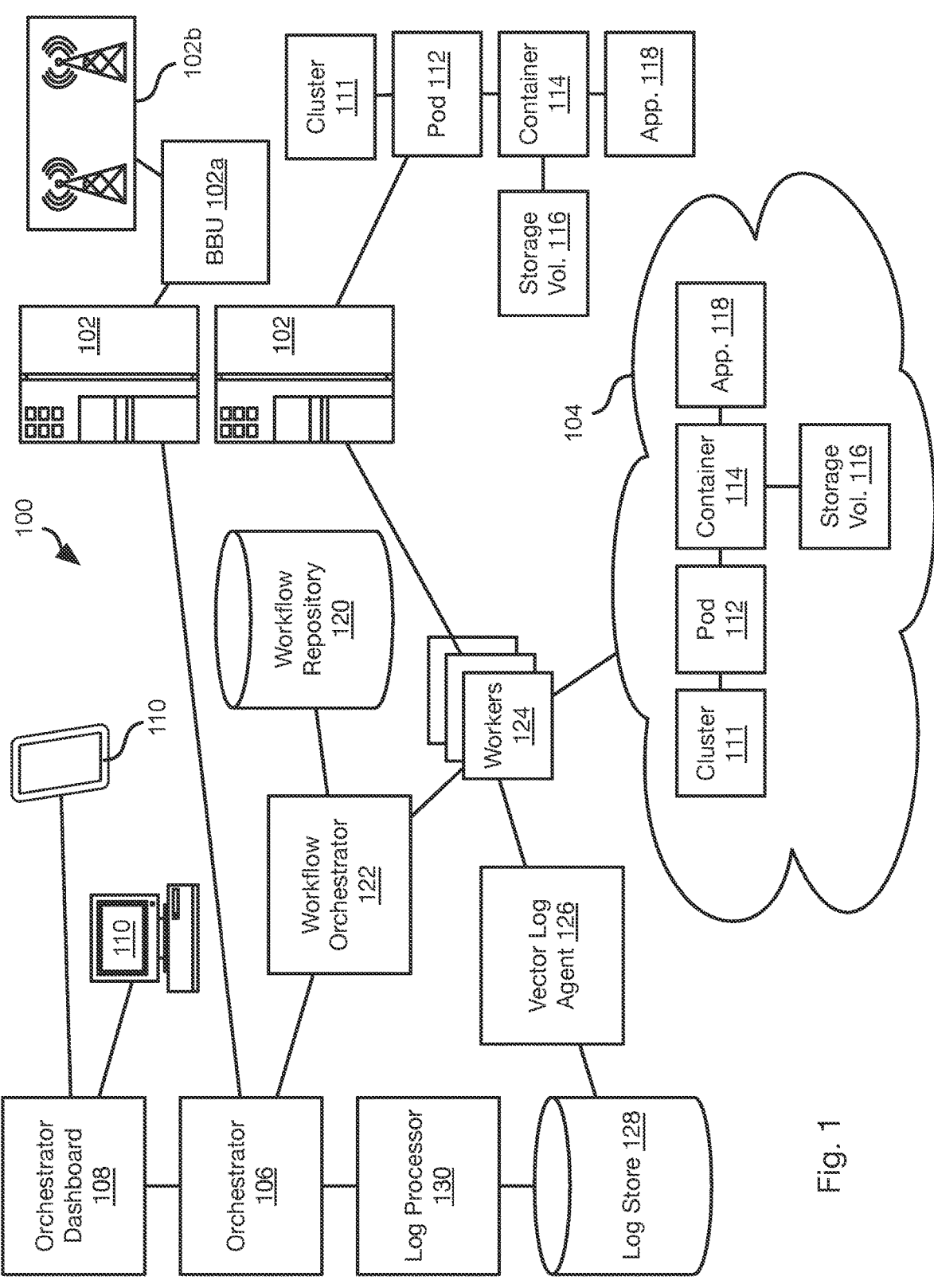
FIG. 1 is a schematic block diagram of a network environment in which discovery of active and available inventory (AAI) may be performed in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections.

The network environment 100 includes a plurality of servers 102. Each of the servers 102 may include one or more computing devices, such as a computing device having some or all of the attributes of the computing device 3400 of FIG. 34. Each server 102 lacks an agent for coordinating the performance of management tasks. The system and methods described herein enable the determination of active and available inventory (AAI) to be performed with respect to a server 102 that lacks an agent supporting the determination of AAI.

As used herein "active and available inventory" (AAI) refers to computing resources that are available for allocation to an application instance. Computing resources include some or all of storage on a physical storage device mounted to a server 102, memory of a server 102, processing cores of a server 102, and networking bandwidth of a network connection between a server 102 and another server 102 or other computing device.

Computing resources may also be allocated within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102a that provide translation between radio frequency signals output and received by antennas 102b and digital data transmitted and received by the servers 102. For example, each BBU 102a may perform this translation according to a cellular wireless data protocol (e.g., 4G, 5G, etc.). Servers 102 that function as edge servers may have limited computational resources or may be heavily loaded such that it may not be feasible for the servers 102 to execute an agent collecting data for obtaining AAI. Likewise, where there are many servers 102, installing an agent for data collection is a time-consuming task.

An orchestrator 106 provisions computing resources to application instances of one or more different application executables, such as according to a manifest that defines requirements of computing resources for each application instance. The manifest may define dynamic requirements defining the scaling up of a number of application instances and corresponding computing resources in response to usage. The orchestrator 106 may include or cooperate with a utility such as KUBERNETES to perform dynamic scaling up and scaling down the number of application instances.

An orchestrator 106 executes on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to and the instantiation of components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QoS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122.

In some implementations, the containers implementing the workers 124 are remote from the servers 102 with respect to which the workers 124 implement workflows. The workers 124 may further implement some or all workflows without an agent installed on the server 102 or cloud computing platform 104 that is programmed to cooperate with the workers 124 to implement the workflow. For example, the workers 124 may establish a secure command line interface (CLI) connection to the server 102 or cloud computing platform 104. For example secure shell (ssh), remote login (rlogin), or remote procedure calls (RPC), or other interface provided by the operating system of the server 102 or cloud computing platform 104 may be used to transmit instructions and verify the completion of instructions on the server 102 or cloud computing platform 104.

One workflow may include monitoring usage of computing resources by each component (hereinafter "the monitoring workflow"). The monitoring workflow may be invoked periodically by the orchestrator 106 for each component or the monitoring workflow may be a persistent process that periodically executed with periods of inactivity in between. The monitoring workflow may include establishing a secure connection to each component, reading one or more log files of each component, and passing the log files to a vector log agent 126. The vector log agent 126 may perform initial processing on the data in the log files to obtained enriched data. The processing of the vector log agent 126 may include augmenting the data in the log files (e.g., providing contextual information indicating the component, time, source server 102, identifier of a hosting container 114, cluster 111, pod 112, virtual machine, unit of computing resources of a cloud computing platform 104, etc.), performing a map-reduce function on messages in the log files, combining messages in the log files into an aggregated representation of the messages, and other functions. The vector log agent 126 may process the log files according to one or more vector remap language (VRL) statements. The vector log agent 126 may execute independently of the workers 124 or the monitoring workflow may include executing an instance of the vector log agent 126. For example, a set of VRL statements may be included in each monitoring workflow corresponding to the type of component the monitoring workflow is configured to monitor. Each monitoring workflow may then include processing log files according to the VRL statements of the monitoring workflow.

The enriched data output by the vector log agent 126 may be stored in a log store 128. A log processor 130 reads the enriched data from the log store and derives the active and available inventory (AAI), which is a listing of computing resources available for allocation to components. The manner in which the log processor 130 obtains the AAI is described in greater detail below. The log processor 130 passes the AAI to the orchestrator 106. The orchestrator 106 may use the AAI to perform various functions with respect to the components such as adding, deleting, or re-deploying to a different location.

Figure 2:
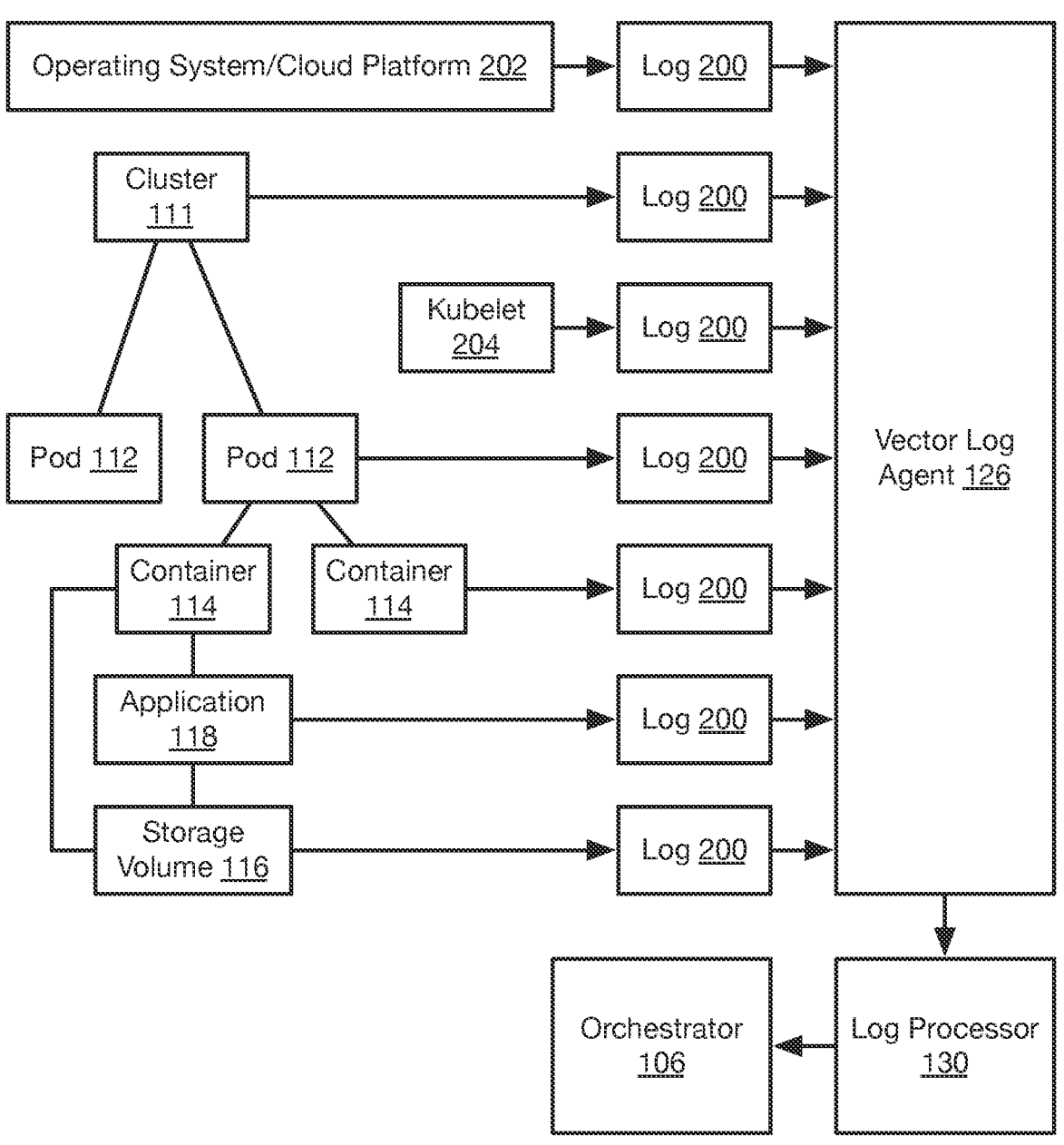
FIG. 2 is a schematic block diagram showing components for collecting and processing log data in accordance with an embodiment.

FIG. 2 illustrates the collection of log files 200 from various components. The log files 200 may be collected using the monitoring workflow for each component or other approach for collecting log files. The log files 200 may include log files generated by an operating system 202 executing on a server 102. Alternatively, a cloud computing platform 104 may generate log files 200 describing a state of a unit of computing resources and/or executables executing on the cloud computing platform 104. A virtual machine within which a component executed may also generate log files 200. In the description below, log files 200 are referenced with the understanding that any observability data represented as a log file or in other format may be collected and processed in a like manner. In particular, metrics, events, alerts, inventory, and other data may be collected in place of or in addition to the log files 200 and processed in a like manner to the log files 200.

A cluster 111 is a collection of hosts (servers 102 and/or one or more units of computing resources on a cloud computing platform) that are managed as a unit. Each host includes a master executing on one of the hosts that manages the deployment of pods 112, containers 114, and application instances 118 on the hosts of the cluster. The master manages the scaling up, scaling down, and redeploying of application instances 118. As used herein actions performed by and with respect to a cluster 111 may be understood as being performed by or with respect to the master managing the cluster 111. Each cluster 111 may generate one or more log files 200 describing operation of the cluster 111.

A Kubelet 204 is an agent of KUBERNETES that executes on a node and implements instructions from the cluster 111 on a server 102 or cloud computing platform to instantiate, monitor, and otherwise manage pods 112. Each Kubelet 204 may generate one or more log files 200 describing operation of the Kubelet 204 and each pod 112 executing within the Kubelet 204. A pod 112 is a group of one or more containers 114 that have shared storage, network resources, and execution context. The pod 112 may generate one or more log files 200 describing the state of the pod 112 and execution of containers 114 of the pod 112. Each container 114 may generate one or more log files 200 describing the execution of the container and any application instances 118 executing within the container 114. Each application instance 118 may also generate one or more log files describing operation of the application instance 118. A storage volume 116 may be a unit of virtualized storage and storage manager implementing the storage volume 116 may also generate one or more log files 200 describing operation of the storge volume 116.

The log files 200 are pulled from the server 102 or cloud computing platform 104 in which they are stored and processed by the vector log agent 126 to generate enriched data. The enriched data is processed by the log processor 130 to obtain AAI. The orchestrator 106 receives the AAI and manages the provisioning of unused computing resources identified in the AAI for use by components.

Figure 3:
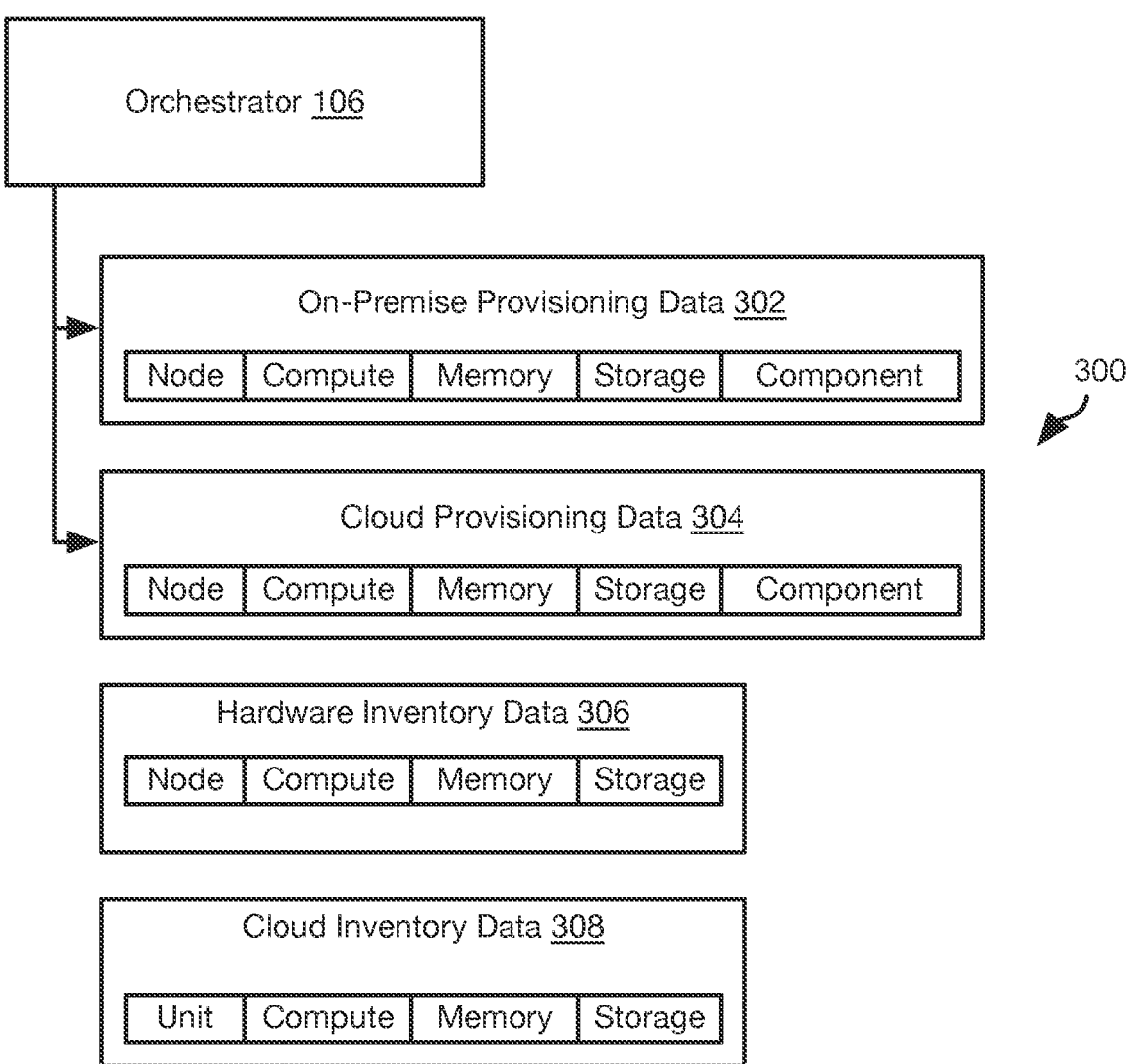
FIG. 3 is a schematic block diagram showing sources of provisioning data in accordance with an embodiment.

Referring to FIG. 3, data contained in the log files 200 may be related to provisioning data 300 in order to obtain the AAI. Provisioning data 300 includes identifiers of components instantiated by the orchestrator 106 and allocation data indicating computing resources allocated to each component. For example, on-premise provisioning data 302 may describe provisioning with respect to one or more servers 102. For example, on-premise provisioning data 302 may include a plurality of entries that each include a node identifier (i.e., identifier of the server 102), a computing allocation (e.g., number of processor cores), a memory allocation (e.g., a number of megabytes (MB), gigabytes (GB), or other unit of memory), storage allocation (e.g., a number of megabytes (MB), gigabytes (GB), or other unit of storage), and a component identifier to which the allocation belongs (e.g., identifier of a cluster 111, pod 112, container 114, storage volume 116, or application instance 118). The identifier of a component may be in the form of a universally unique identifier (UUID) that are centrally assigned for all components belonging to a common namespace, such as by the orchestrator 106 or other central component). An entry may reference multiple components. For example, provisioning may be made at the level of a cluster 111 such that all pods 112, containers 114, storage volumes 116, and applications instances 118 of that cluster 111 will be reference in the entry for the cluster 111.

The provisioning data 300 may further include cloud provisioning data 304. The cloud provisioning data 304 may describe provisioning with respect to one or more units of computing resources on the cloud computing platform 104. The cloud provisioning data 304 may include a plurality of entries that each include a unit identifier that identifies a unit of cloud computing resources. The identifier of the unit of computing resources may additionally identify a cloud computing provider (e.g., AWS, AZURE, GOOGLE CLOUD), a region of a cloud computing platform 104, and/or other data. Each entry may further include data describing allocations of computing, memory, and storage. Each entry may further include identifiers of one or more components to which the allocations belong, as described above with respect to the on-premise provisioning data 302.

Note that the on-premise provisioning data 302 and cloud provisioning data 304 is dynamic. The orchestrator 106 may scale up and scale down the number of application instances

118 of any given executable as well as the number of pods 112, containers 114, and storage volumes 116 used by the application instances.

In addition to the provisioning data 300, the AAI may also be determined using other data such as hardware inventory data 306 and cloud inventory data 308. The hardware inventory data 306 may include entries for each server 102. Each entry may indicate the computing (e.g., total number of processing cores, graphics processing unit (GPU) cores, or other computing components), memory, and storage available on a server 102 as well as the node identifier of the server 102. The cloud inventory data 308 likewise includes entries including an identifier of a unit of cloud computing resources as well as the computing, memory, and storage available for the unit. The hardware inventory data 306 and cloud inventory data 308 may indicate current availability, i.e., entries may be removed or flagged as unavailable in response to a server 102 or cloud computing platform 104 referenced by an entry becoming unavailable due to failure or lack of network connectivity. Whether a server 102 or cloud computing platform 104 is or is not available may be determined by performing health checks, transmitting ping messages, measuring latency of traffic, detecting failed network connections, or any other approach for determining the status and accessibility of a computing device.

Figure 4:
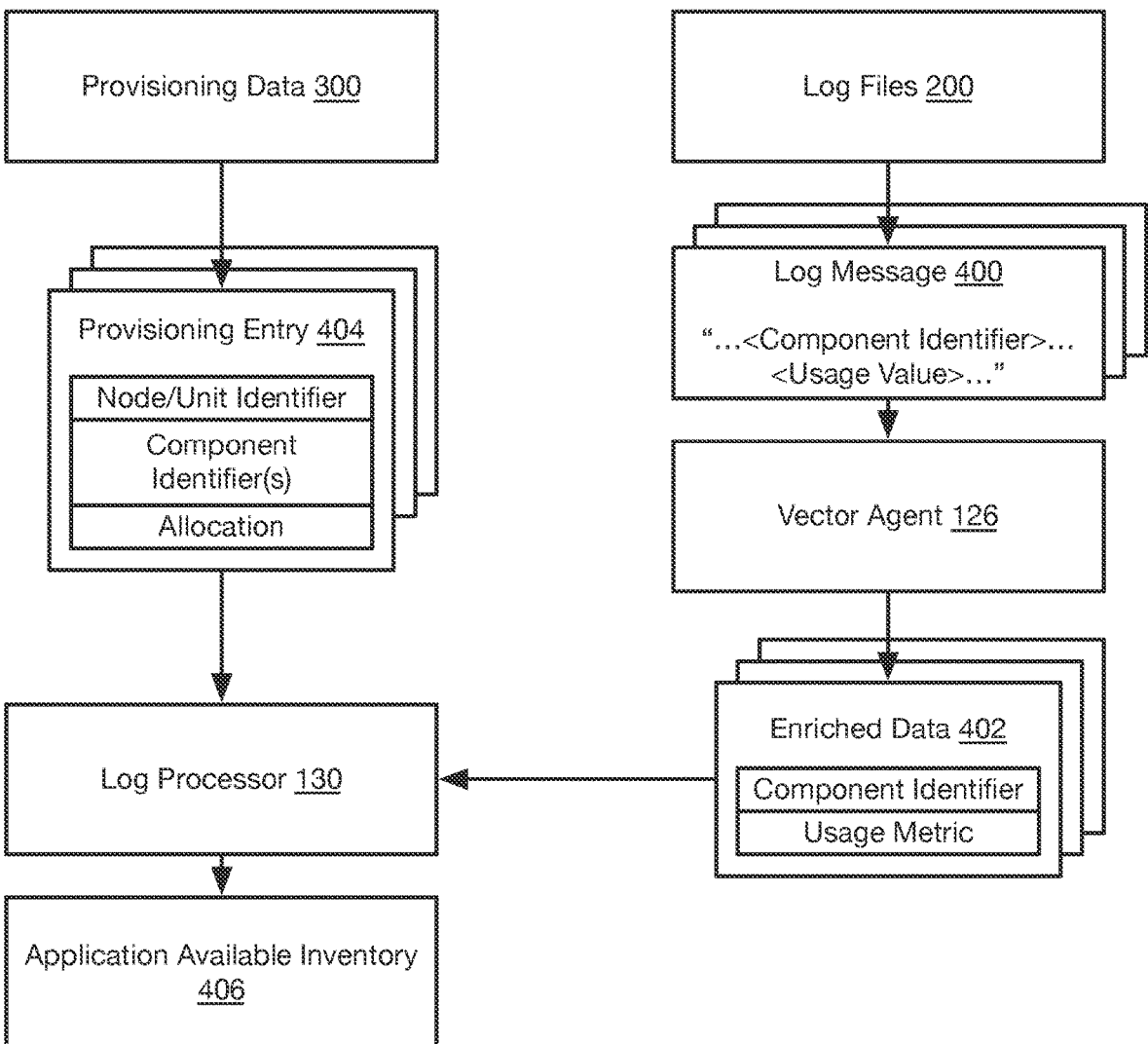
FIG. 4 is a schematic block diagram showing components showing processing of log data to obtain AAI in accordance with an embodiment.

FIG. 4 illustrates an approach for calculating the AAI. The log files 200 include a plurality of log messages 400. Each message may include a text string including values such as a component identifier and a value indicating usage. The entry identifier may also be obtained from a directory location of the log file or a name of the log file. The value indicating usage may include some or all of an indicator of processor time spent executing a component identified by the entry identifier, an amount of memory occupied by the component identified by the component identifier, and an amount of storage used (e.g., written to) by the component identified by the component identifier. For example, there may be separate entries each indicating separate information with respect to a component identifier: one indicating processor time and another indicating memory used. In some implementations, a log message 400 includes one or more usage values and another log message 400 includes the process identifier and the component identifier the executes in a process identified by the process identifier.

The log messages 400 are processed by the vector agent 126 to obtain enriched data 402. For example, an item of enriched data 402 may include a component identifier and a usage metric (processor time, memory, storage) for that component identifier. The vector agent 126 may obtain the enriched data 402 by executing one or more VRL statements with respect to the log messages 400. For example, log messages 400 relating a process identifier to a usage value may be mapped by the vector agent 126 to a log message relating the process identifier to a component identifier. The vector agent 126 may perform a map-reduce function in order to aggregate usage values into an aggregated usage metric for a component identifier.

The enriched data 402 may then be processed by the log processor 130 along with the provisioning data 300 to obtain active and available inventory (AAI) 406. For example, the provisioning data 300 may include provisioning entries 404 that include a node identifier of a server 102 or an identifier of a unit of computing resources in the cloud computing platform. Each provisioning entry 404 may include a component identifier, i.e., an identifier of a cluster 111, pod 112, container 114, storage volume 116, or application instance 118. Each provisioning entry 404 may include an allocation, i.e., values indicating the computing, memory, and/or storage allocated to the component identified by the component identifier.

The log processor 130 may therefore obtain one or more provisioning entries 404 including a component identifier and items of enriched data 402 including the same component identifier. For a given computing resource on a host (server 102 or unit of a computing resource in the cloud computing platform 104), let U(t,i) represent the utilization of that computing resource reported at given time (t) for a component i, let P(t,i) represent the current allocation of that computing resource to component i, and let T represent the inventory of that computing resource available on the host. The AAI for that computing resource on host is therefore $$AAI(t) = T - \sum_{i=1}^{N} U(t, i),$$

where N is the number of components on the host that use the given computing resource. An over provisioning amount O(t,i) of the computing resource for a component i may be calculated as O(t,i)=P(t,i)−U(t,i) and the total amount of the computing resource that is provisioned and not utilized may be calculated as $$O(t) = \sum_{i=1}^{N} (P(t, i) - U(t, i)).$$

For computing resource (computing power, memory, storage) on each host, the AAI at a given time t may include some or all of AAI(t), O(t,i) for i=1 to N, and O(t), where N is the number of components executing on each host.

FIGS. 5 and 6 illustrate methods 500 and 600, respectively, that may be performed using the network environment 100 in order to obtain the AAI. The methods 500 and 600 may be executed by one or more computing devices 3400 (see description of FIG. 34, below), such as one or more computing devices executing the orchestrator 106 and/or log processor 130.

Referring specifically to FIG. 5, the method 500 may include obtaining 502 component identifiers for statically defined components, such as those referenced in a manifest ingested by the orchestrator 106. The method 500 may include obtaining 504 component identifiers for dynamically created components. Dynamically created components may be those instantiated in order to scale up capacity. Dynamically created components may be created by the orchestrator 106 or KUBERNETES. The component identifiers of dynamically created components may be obtained from log files 200 generated by KUBERNETES, i.e., a KUBERNETES master, Kubelet, or other component of a KUBERNETES installation that performs instantiation of components. Note that dynamically created components may also be deleted. Accordingly, the current set of component identifiers obtained at steps 502 and 504 may be updated to remove component identifiers of those that are dynamically deleted due to scaling down, failure of a host, or other event.

The method 500 may include obtaining 506 static provisioning for each component identifier of each statically defined component and obtaining 508 dynamic provisioning for each component identifier of each dynamically created component. The provisioning for each component identifier may include a host identifier (identifier of a server 102 or unit of computing resources of a cloud computing platform) as well as an allocation of one or more computing resources (computing power, memory, and/or storage). The method 500 may further include obtaining the total available inventory. The total available inventory may include an inventory for each host that is currently available (functioning and accessible by a network connection). The inventory for each host may include total processor cores, memory, and/or storage capacity.

Referring to FIG. 6, the method 600 may include deriving 602 usage data for each component identifier identified at steps 502 and 504. As noted above, deriving 602 usage data may include retrieving log files 200, enriching the log files 200 to obtain enriched data 402, and aggregating the enriched data 402 to obtain usage metrics for each component identifier.

The method 600 may include deriving 604 usage data for each host. For example, the usage metrics for each component executing on each host may be aggregated (e.g., summed) to obtain total metrics for each host, i.e., total computing power usage, total memory usage, total storage usage. As used herein, "computing power" may be defined as an amount processor time used, number of processor cycles used, and/or a percentage of a processor's cycles or time used.

The method 600 may include retrieving 606 the static and dynamic provisioning data for each component identifier (see description of steps 506 and 508) and the inventory of each host (see discussion of step 510). The AAI may then be derived 608. As described above, step 608 may include calculating some or all of AAI(t), O(t,i), and O(t) for each computing resource (computing power, memory, storage) of each host.

The method 600 may further include using the AAI to modify 610 provisioning in the network environment 100. A non-limiting list of modifications may include:

Provisioning additional components (clusters 111, pods 112, containers 114, storage volumes 116, and/or application instances 118) to utilize computing resources identified in the AAI in accordance with the manifest.

Redeploy a component to a different host in order to more closely meet performance, quality of service, affinity, anti-affinity, latency or other requirement indicated in a manifest.

Delete an underutilized component.

Delete underutilized components spread across multiple servers 102 or units of computing resources in a cloud computing platform 104 and redeploy some or all of the underutilized components on a reduced number of hosts.

Redeploy an underutilized component (e.g., (O(t,i)/P(t,i)) <0.5) to a server 102 with higher latency and/or less computing resources or to the cloud computing platform 104 than a current host of the underutilized component.

Redeploy an overutilized component (e.g., (O(t,i)/P(t,i)) <0.9) to a server 102 with lower latency and/or more computing resources than the current host of the overutilized component.

Figure 7:
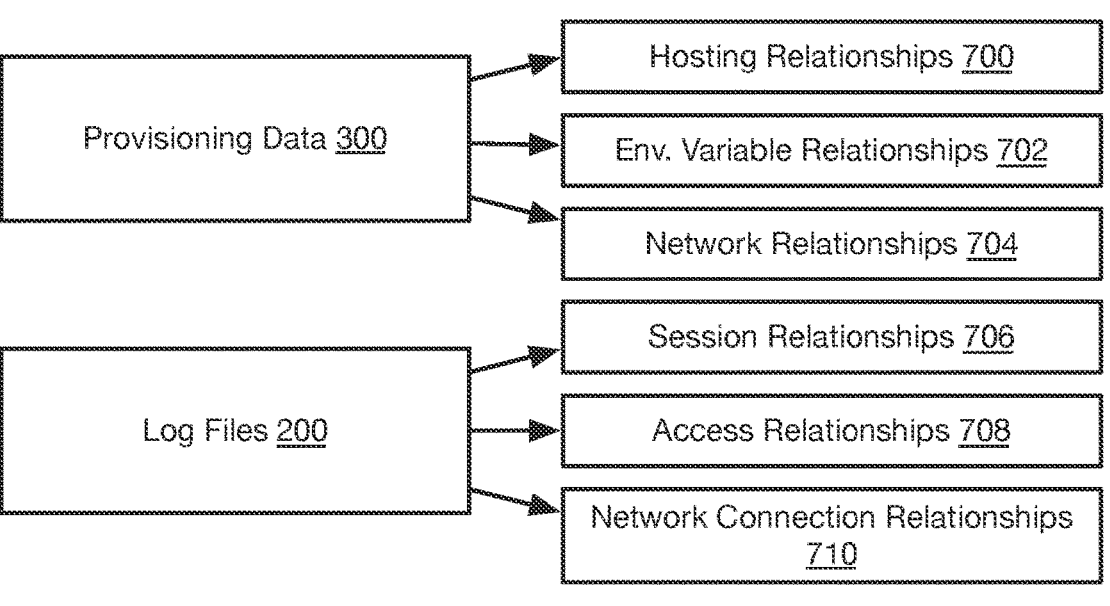
FIG. 7 is a schematic block diagram showing the derivation of relationships between components in accordance with an embodiment.

Referring to FIG. 7, the log processor 130, the orchestrator 106, and/or some other component may further process the provisioning data 300 and log files 200 in order to identify relationships between component identifiers. For example, provisioning data 300 may indicate hosting relationships 700. As used herein a "hosting relationship" refers to a component that executes on or in an another component such as cluster 111 or pod 112 hosted by a server 102 or unit of computing resources of the cloud computing platform 104, a container 114 executing within a pod 112, or an application instance 118 executing within a container. A storage volume 116 may be viewed as having a hosting relationship 700, i.e., hosted by, a container 114 or pod 112 to which the storage volume 116 is mounted. Hosting relationships 700 may be derived from instructions in the manifest that define the instantiation of a second component on a first component thereby defining a hosting relationship 700 between the first component and the second component. Hosting relationships may be derived from log files 200 in a like manner: a record of instantiating a second component on a first component establishes a hosting relationship between the first component and the second component.

The provisioning data 300 may further indicate environmental variable relationships 702. The manifest may include instructions configuring one or more environmental variables of a first component to refer to a second component, such as in order to configure the first component to use a service of, or provide a service to, the second component. The log files 200 may record the configuring of one or more environmental variables of a first component to refer to a second component in a like manner.

The provisioning data 300 may further indicate network relationships 704. The manifest may include instructions to configure a first component to use an IP address or other type of address that belongs to a second component thereby establishing a network relationship 704 between the first component and the second component. The log files 200 may record the configuring of a first component to refer to the address of a second component in a like manner. Establishing a network relationship 704 may be a multistep process: 1) determine that the first component is configured to use the first address and 2) mapping the first address to an identifier of the second component.

As noted above, provisioning data 300 is dynamic and may change over time. Accordingly, some or all of the hosting relationships 700, environmental variable relationships 702, and network relationships 704 may be re-derived on a fixed repetition period or in response to detecting a record in the log files 200 indicating an action that may affect any of these relationships 702-704.

The log files 200 may also be evaluated to identify other types of relationships between components. For example, the log files 200 may be evaluated to identify session relationships 706. When a first component establishes a session at the application level to use an application instance 118 that is a second component or hosted by a second component, one or more log files 200 generated by the second component may record this fact. The log files 200 may therefore be analyzed to identify the creation and ending of sessions in order to obtain current session relationships 706 between pairs of components.

The log files 200 may be evaluated to identify access relationships 708. When a first component accesses a session an application instance 118 that is a second component or hosted by a second component, one or more log files 200 generated by the second component may record this fact. Access may include generating a request for a service provided by the second component, reading data from the second component, writing data to the second component, or other interaction between the first component and the second component. The log files 200 may therefore be analyzed to identify access by the first component of the second component. Whether access indicates a current access relationship may be handled in various ways: an access relationship 708 may be created between a first component and a second component accessed by the second component in response to identifying a record of access and this access relationship may either (a) remain as long as the first component and the second component exist or (b) be deleted if no access is recorded in the log files 200 for a threshold time period.

The log files 200 may be evaluated to identify network connection relationships 708. For example, when a first component establishes a network connection to a second component, the log files 200 of one or both of the first component and the second component may record this fact. The log files 200 may therefore be analyzed to identify the establishment of a network connection between the first component and the second component and the ending of the network connection between the first component and the second component, if any. In this manner, all active network connections between components may be identified as network connection relationships 710. A network connection relationship 710 may be created between a first component and a second component in response to identifying the creation of an network connection between the first component and the second component the network connection relationship 710 may either (a) remain as long as the first component and the second component exist, (b) be deleted when the network connection ends, or (c) expire if no new network connection is established within a threshold time after the network connection ends.

Network connection relationships 710 may be distinguished from network relationships 704 in the sense that a network connection relationship 710 refers to an actual network connection whereas a network relationship 704 refers to the configuring of a first component with a network address of a second component whether or not a network connection is ever established. In some implementations, only network connection relationships 710 are used.

Figure 8:
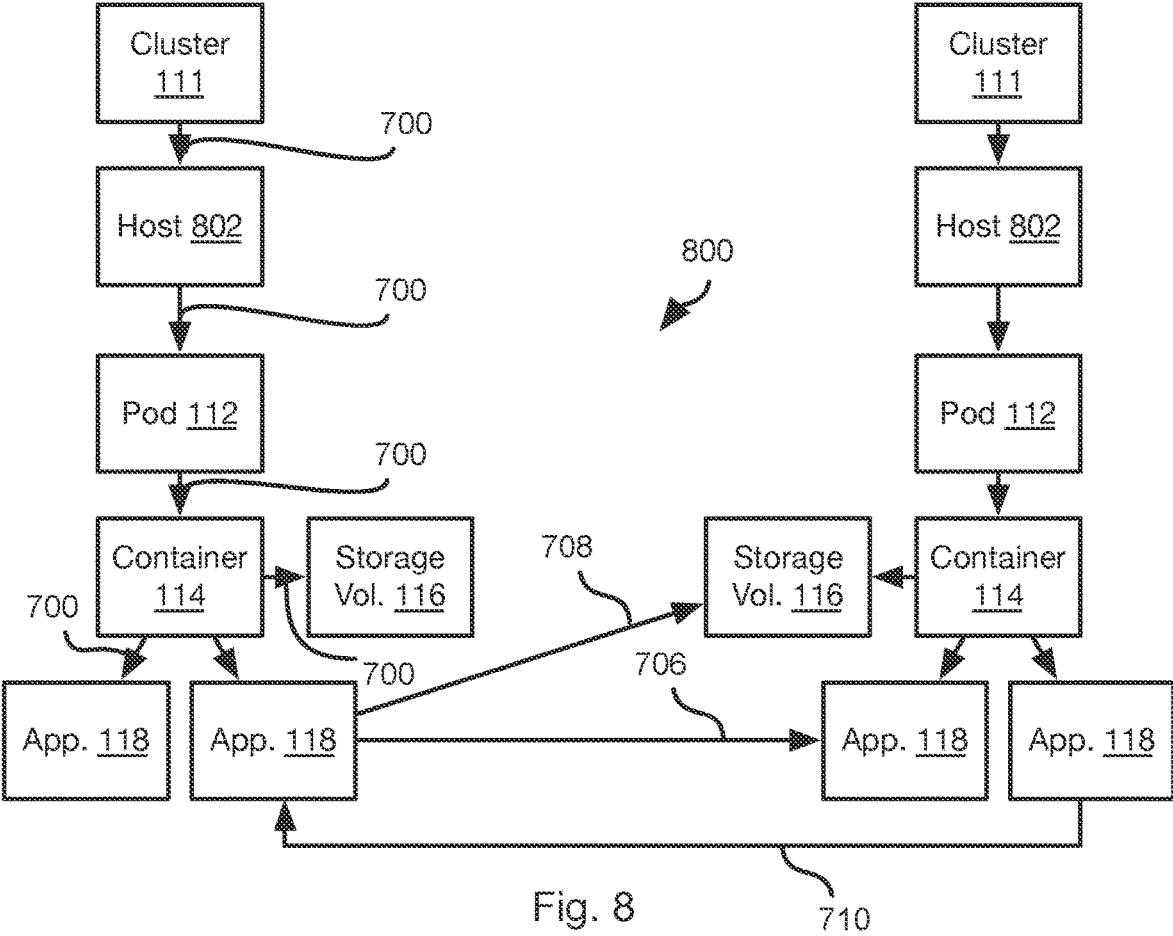
FIG. 8 is a schematic block diagram of a topology of components of a network environment in accordance with an embodiment.

Referring to FIG. 8, the log processor 130, the orchestrator 106, and/or some other component may further generate a topology representation 800. The topology 800 may be represented as a graph including nodes and edges. Each node may be a component identifier of a component. Components may include a host 802 (e.g., a server 102 or unit of computing resources of the cloud computing platform), cluster 111, pod 112, container 114, storage volume 116, application instance 118, or other component. The edges of the topology connect nodes and represent a relationship between nodes, such as any of a hosting relationship 700, environmental variable relationship 702, network relationship 704, session relationship 706, access relationship 708, and network connection relationship 710. The edges may be one directional indicating dependence of a first node on a second node that is not also dependent on the first node in order to function correctly. The edges may be bi-directional indicating first and second nodes that are dependent on one another. For example, a hosting relationship 700 may be one directional indicating dependence of a second component on a first component that is a host to the second component. A network relationship 704 or network connection relationship 710 may be bi-directional since both components must be functional for a network connection to exist.

Figure 9:
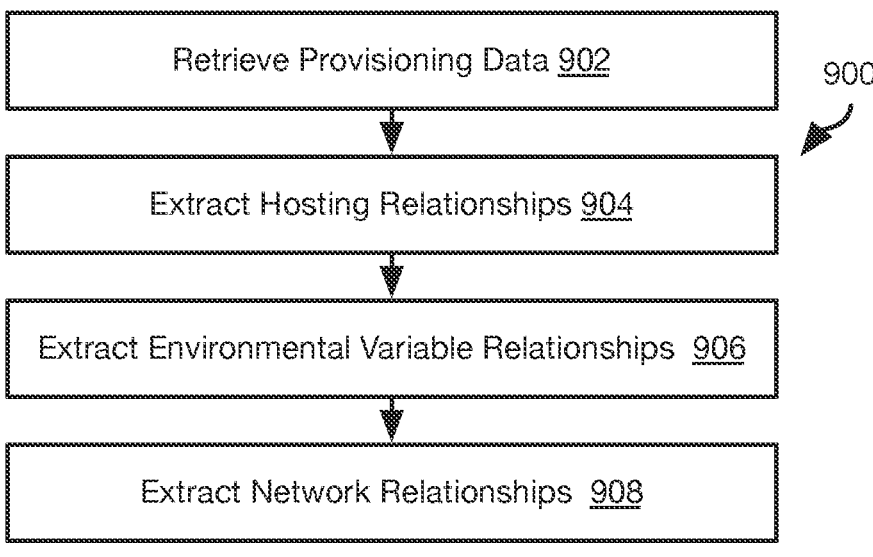
FIG. 9 is a process flow diagram of a method for identifying relationships between components according to a manifest and dynamic provisioning data in accordance with an embodiment.

FIG. 9 illustrates a method 900 for processing provisioning data 300. The method 900 may be performed by the log processor 130, the orchestrator 106, and/or some other component. The provisioning data 300 is retrieved 902. Retrieving 902 may include pulling the provisioning data from a manifest ingested by the orchestrator 106 and pulling log files 200 from components as described above with respect to FIG. 2. Retrieving 902 may include an enriching step by which the data from the manifest and/or log files 200 is processed by the vector log agent 126 in order to add additional information, perform a map-reduce operation, or perform other operations. For example, enriching may include adding an identifier of a source of a log file 200, a directory location of a log file 200, or other data to facilitate relating the data of the log file 200 to a particular component identifier. Retrieving 902 may include processing the manifest and/or log files 200 according to one or more VRL statements.

The method 900 may include extracting 904 hosting relationships 700. Extracting hosting relationships 700 may include parsing statements of the form "<instantiation instruction> . . . <host component identifier> . . . <hosted component identifier>." For example, there may be a set of keywords indicating instantiation that may be identified and lines of code or log messages including these keywords may be processed to obtain the identifiers of the host component and the hosted component. A hosting relationship 700 may then be created that references the identifiers of the host component and the hosted component.

Extracting 904 hosting relationships may further include deleting hosting relationships 700 for which the hosted component or the host component have been deleted. Log messages including instructions to delete a component may be identified, identifiers of the deleted component may be extracted, and any hosting relationships 700 referencing the identifier of the deleted component may be deleted.

The method 900 may include extracting 906 environmental variable relationships 702. Extracting environmental variable relationships 702 may include parsing statements of the form "<configuration instruction> . . . <configured component identifier> . . . <referenced component identifier>." For example, there may be a set of keywords found in instruction statements or log messages relating to the setting of environmental variables. These keywords may be identified and lines of code or log messages including these keywords may be processed to identifying the identifiers of the configured component, i.e., the component having the environmental variable(s) thereof set, and the referenced component, i.e., the referenced component is the component that is referenced by an environmental variable of the configured component. An environmental variable relationship 702 may then be created that references the identifiers of the configured component and the referenced component and possibly the one or more environmental variables of the configured component configured to reference the referenced component.

Statements in the log files 200 that create an environmental variable relationship 702 may change a previously existing environmental variable relationship. For example, an environmental variable relationship 702 may record the name of the environmental variable of the configured component. A first environmental variable relationship 702 for the configured component including a variable name may be deleted in response to a subsequently identified environmental variable relationship 702 for the configured component that references the same variable name. Exceptions to this approach may be implemented where an environmental variable may store multiple values. For example, an explicit deleting instruction including the variable name, configured component identifier, and the referenced component identifier is required before the environmental variable relationship 702 including the variable name, the configured component identifier, reference component identifier will be deleted.

The method 900 may include extracting 908 network relationships 704. Extracting network relationships 704 may include parsing statements of the form "<network configuration instruction> . . . <configured component identifier> .

. . <IP address, domain name, URL, etc.>" and statements of the form "<address assignment instruction> . . . <referenced component identifier> . . . <IP address, domain name, URL, etc.>," which may be located at different locations within a manifest or log file 200. For example, there may be a set of keywords found in instruction statements or log messages relating to the assignment of networking addresses to a referenced component and configuring a configured component to communicate with the address of the referenced component. These keywords may be identified and lines of code or log messages including these keywords may be processed to identifying the network address and identifiers of the configured component and the referenced component, i.e., the referenced component is the component that is assigned the network address and the configured component is the component configured to use the network address to transmit data to and/or receive data from the referenced component. A network relationship 704 may then be created that references the identifiers of the configured component and the referenced component and possibly includes the network address. Additional information may include a protocol used, port number, a network relationship (e.g., whether referenced component functions as a network gateway, proxy, etc.).

Statements in the log files 200 may change the configuration of the configured component such that the configured component is configured to use the network address of a different referenced component. Such statements may be parsed and a new network relationship 704 may be created in a like manner as described above. The previously-created network relationship 704 for the configured component may be deleted or may continue to exist. For example, there may be an explicit instruction to remove the configuration of the configured component to use the network address of the referenced component referenced by the previously-created network relationship 704. In response to a record of execution of such an instruction, the previously-created network relationship 704 may be deleted.

Figure 10:
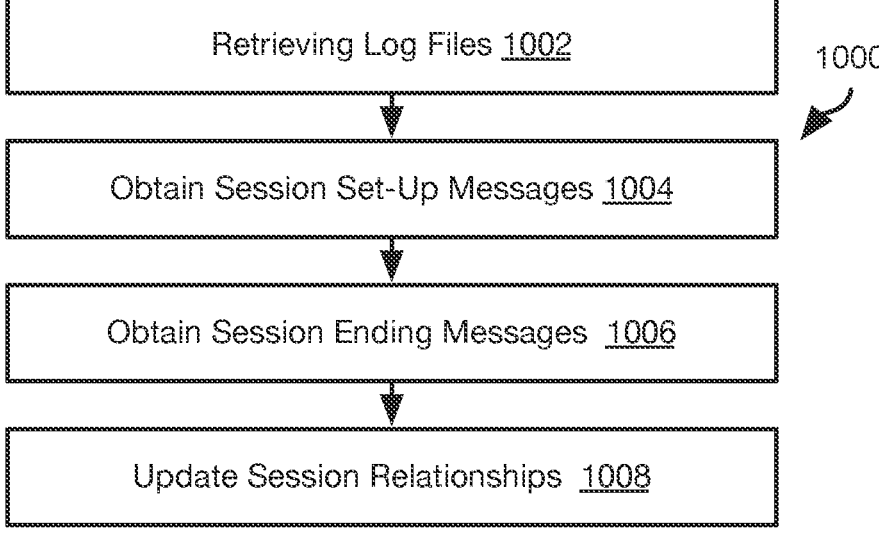
FIG. 10 is a process flow diagram of a method for identifying session relationships between components in accordance with an embodiment.

FIG. 10 illustrates a method 1000 for extracting session relationships 706. The method 1000 may be performed by the log processor 130, the orchestrator 106, and/or some other component. The method 1000 includes retrieving 1002 log files 200. Retrieving 1002 the log files 200 may include pulling the log files 200 from components as described above with respect to FIG. 2. Retrieving 1002 may include an enriching step by which the data from the log files 200 is processed by the vector log agent 126 in order to add additional information, perform a map-reduce operation, or other operations. For example, enriching may include adding an identifier of a source of a log file 200, a directory location of a log file 200, or other data to facilitate relating the data of the log file 200 to a particular component identifier. Retrieving 1002 may include processing log files 200 according to one or more VRL statements.

The method 1000 may include obtaining 1004 session set-up messages from the log files 200 either before or after any enriching of the log files 200. The session set-up messages may be messages indicating that a session was successfully started and may include an identifier of the server component (i.e., the component providing a service) and the client component (i.e., the component requesting the service).

The method 1000 may include obtaining 1006 session ending messages from the log files 200 either before or after any enriching of the log files 200. The session ending messages may be messages indicating that a session was ended either in response to an instruction from the client component, an instruction from the server component, expiration of a timeout period, failure of an intermediate component or network connection between the client component and the server component, restarting or failure of the client component or server component, or other cause. The session ending messages may also include an identifier of the server component (i.e., the component providing a service) and the client component (i.e., the component requesting the service). Where session ending is due to a failure (network connection, intermediate component, client component, or server component), it may be that only the server component or the client component is referenced by a log message. In such instances, all session relationships referencing the component referenced in the log message may be deemed ended and deleted.

The method 1000 may include updating 1008 the session relationships 706 by adding session relationships 706 corresponding to sessions identified as being created in the set-up messages. Session relationships 706 may include the identifiers of the server and client components and may include other information such as a timestamp from the set-up message, an identifier of the session itself, a type of the session, or other data.

Updating 1008 the session relationships 706 may include deleting session relationships 706 corresponding to sessions identified as ended in the session ending messages (including messages indicating a failure). For example, where a session has a unique session identifier, a session relationship 706 including the session identifier included in a session ending message may be deleted. Alternatively, where a session ending message references a set of client and server component identifiers, the session relationship 706 including the same client and server component identifiers may be deleted. In some implementations, where sessions have a known time to live (TTL), session relationships 706 may be deleted based on expiration of the TTL regardless of whether a session ending message corresponding to the session relationships are received.

Figure 11:
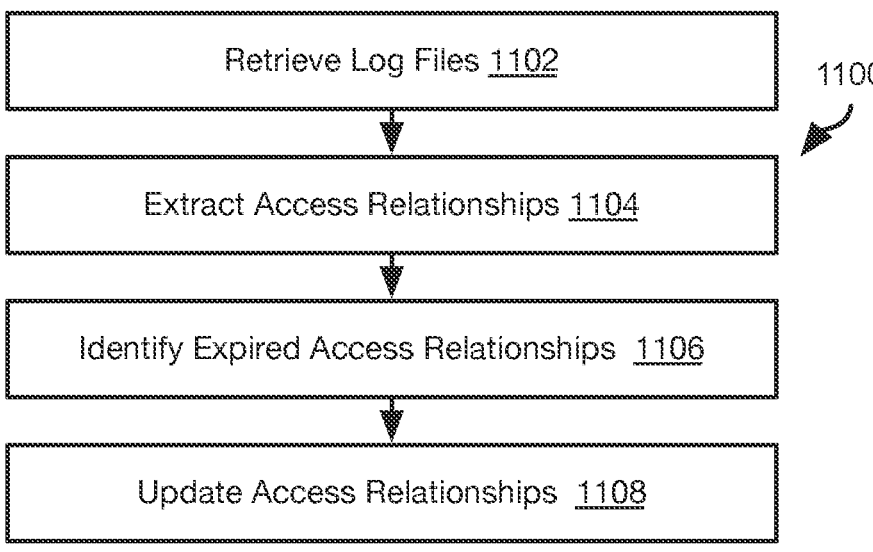
FIG. 11 is a process flow diagram of a method for identifying access relationships between components in accordance with an embodiment.

FIG. 11 illustrates a method 1100 for extracting access relationships 708. The method 1100 may be performed by the log processor 130, the orchestrator 106, and/or some other component. The method 1100 includes retrieving 1102 log files 200. Retrieving 1102 the log files 200 may include pulling the log files 200 from components as described above with respect to FIG. 2. Retrieving 1102 may include an enriching step by which the data from the log files 200 is processed by the vector log agent 126 in order to add additional information, perform a map-reduce operation, or other operations. For example, enriching may include adding an identifier of a source of a log file 200, a directory location of a log file 200, or other data to facilitate relating the data of the log file 200 to a particular component identifier. Retrieving 1102 may include processing log files 200 according to one or more VRL statements.

The method 1100 may include extracting 1104 access relationships 708 from the log files 200 either before or after enriching of the log files 200. Access relationships 708 may be identified in various ways: parsing a log message indicating a request from a client component (i.e., a component requesting a service) in the log file 200 of a server component (i.e., a component providing the service), a log message indicating a request from the client component to the server component in the log file 200 of the client component, a log message of another component that stores a result of an access request from the client component to the server component. An access relationship 708 may include an identifier of the server component, an identifier of the client component, and one or more times stamps or other metadata for one or both of (a) each request from the client component to the server component and (b) each response from the server component to the client component.

The method 1100 may include identifying 1106 expired access relationships 708. Expired access relationships 708 may be defined as those with a most recent time stamp (for a request and/or response) that is older than a threshold time, e.g., 1 minute, 5 minutes, 1 hours, 1 day, etc. The threshold time may be unique to each type of component, e.g., an instance 118 of one application may have a different threshold from an instance of a different application. The threshold time may be automatically derived: a multiple of the average time between requests for each client of the server component.

The method 1100 may then include updating 1108 the access relationships 708 to add access relationships detected at step 1104. Updating 1108 the access relationships may include deleting expired access relationships. Updating 1108 the access relationships may include consolidating access relationships 708. For example, if a pair of access relationships 708 reference the same server and client component identifiers, the access relationships 708 may be combined into a single access relationship 708 that includes the newest time stamp of the pair of access relationships 708. The access relationship 708 may include a record of access requests and/or responses between the client and server component such that upon consolidation the records of the pair of access requests are combined. Alternatively, each access relationship 708 includes a statistical characterization of past requests and/or responses such that the consolidated access requests includes a combination of the statistical characterizations of the pair of access relationships 708. In some embodiments, consolidation is performed before identifying 1106 expired relationships.

Figure 12:
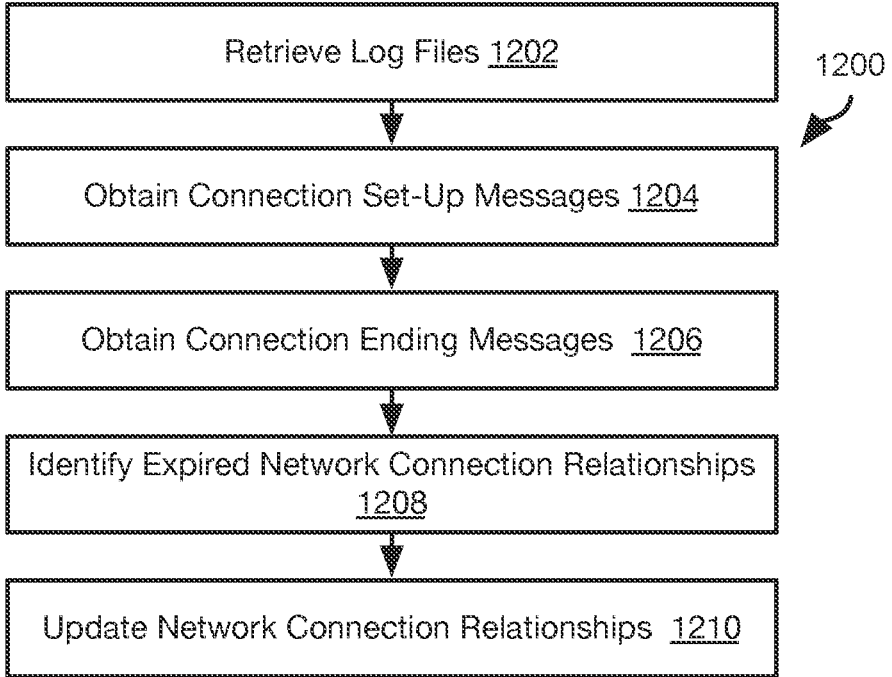
FIG. 12 is a process flow diagram of a method for identifying network relationships in accordance with an embodiment.

FIG. 12 illustrates a method 1200 for extracting network connection relationships 710. The method 1200 may be performed by the log processor 130, the orchestrator 106, and/or some other component. The method 1200 includes retrieving 1102 log files 200. Retrieving 1202 the log files 200 may include pulling the log files 200 from components as described above with respect to FIG. 2. Retrieving 1202 may include an enriching step by which the data from the log files 200 is processed by the vector log agent 126 in order to add additional information, perform a map-reduce operation, or other operations. For example, enriching may include adding an identifier of a source of a log file 200, a directory location of a log file 200, or other data to facilitate relating the data of the log file 200 to a particular component identifier. Retrieving 1202 may include processing log files 200 according to one or more VRL statements.

The method 1200 may include obtaining 1204 connection set-up messages from the log files 200 either before or after any enriching of the log files 200. The session set-up messages may be records of the exchange of handshake messages or other messages indicating that a network connection was successfully established between a first component and a second component.

The method 1200 may include obtaining 1206 connection ending messages from the log files 200 either before or after any enriching of the log files 200. The connection ending messages may be messages indicating that a network connection was ended either in response to an instruction from the client component, an instruction from the server component, expiration of a timeout period, failure of an intermediate component or network connection between the client component and the server component, or other cause.

In some implementations, session ending messages may include messages indicating failure of a physical link between a first component and the second component, restarting of the first component or the second component, and failure or restarting of a component hosting the first component or the second component.

The method 1000 may include identifying 1208 expired network connection relationships 710. Identifying 1208 expired network connection relationships 710 may include identifying a pair of components (a) for which a network connection relationship 710 exists, (b) has no current network connections as indicated by the connection ending messages, (c) a predefined time period has expired since the last connection ending message was received for the pair of components. Regarding (c), some connections have a predefined TTL such that the network connection relationship 710 is expired if a predefined time period that is greater than the TTL has expired since the last connection set-up message for the pair of components.

As an alternative to the above-described approach, network connection relationships 710 all expire as soon as the network connection represented by the network connection relationship 710 is ended due to TTL expiration or explicit ending as indicated in a connection ending message.

The method 1200 may include updating 1210 the network connection relationships 710 by deleting expired network connection relationships 710 and adding new network connection relationships 710 indicated by the connection set-up messages from step 1204. It is possible for a first and second component to have multiple network connection relationships, such as connections to different ports by different applications. Accordingly, a separate network connection relationship 710 may exist for each network connection or a single network connection relationship 710 may be created to represent all network connections between a pair of components. The network connection relationship 710 may include data describing each connection (timestamp of set up, protocol, port, etc.). This data may be updated to remove data describing a connection when that connection ends. Likewise, the network connection relationship 710 may be updated to add data describing a connection between the pair of components represented by the network connection relationship 710 when the connection is set up.

Referring to FIGS. 13 and 14A to 14D, the illustrated method 1300 may be used to generate a visual representations of a topology that is displayed on a display device, such as a user device 110 by way of the orchestrator dashboard 108.

Figure 14A:
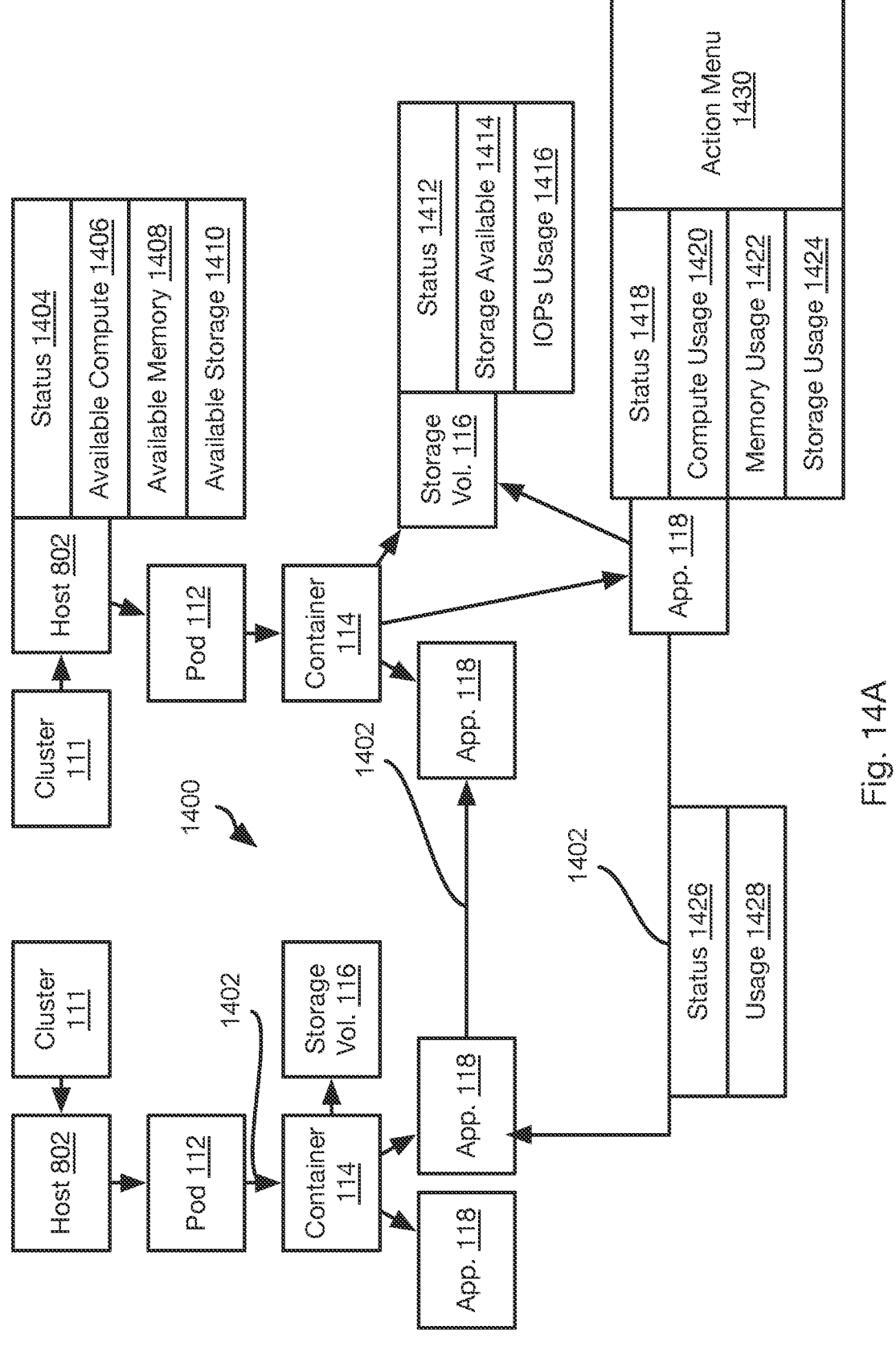
FIG. 14A is an example representation of a topology in accordance with an embodiment.

Referring specifically to FIGS. 13 and 14A, the method 1300 may be executed by the orchestrator 106 with the visual representation 1400 being provided to a user computing device 110 by way of the orchestrator dashboard 108. The user computing device 110 may then display the visual representation 1400, receive user interactions with the visual representation 1400, and report the user interactions to the orchestrator 106 for processing. A user may request generation of the visual representation 1400 by way of the orchestrator dashboard 108. The retrieval and processing of provisioning data 300 and log files 200 to generate the visual representation may be performed in response to the request from the user.

The method 1300 may include extracting 1302 component identifiers from provisioning data as described above. Each component identifier is then used as a node of a graph. The method 1300 may then include adding 1304 edges between nodes for hosting relationships 700 between component identifiers represented by the nodes. The method

1300 may include adding 1306 edges between nodes for environmental variable relationships 702 between component identifiers represented by the nodes. The method 1300 may include adding 1308 edges between nodes for network relationships 704 between component identifiers represented by the nodes. The method 1300 may include adding 1308 edges between nodes for network relationships 704 between component identifiers represented by the nodes. The method 1300 may include adding 1310 edges between nodes for session relationships 706 between component identifiers represented by the nodes. The method 1300 may include adding 1312 edges between nodes for access relationships 708 between component identifiers represented by the nodes. The method 1300 may include adding 1314 edges between nodes for network connection relationships 710 between component identifiers represented by the nodes. The relationships between components described herein are exemplary only such that the method 1300 may include adding edges for other types of relationships between components.

A visual representation 1400 of the topology represented by the graph may then be displayed 1316. An example visual representation 1400 is shown in FIG. 14. Graphical elements may be displayed to represent components such as hosts 802, pods 112, containers 114, storage volumes 116, and application instances 118. The graphical elements may include an image and/or text, such as a UUID of each component.

The visual representation 1400 may include lines 1402 between the graphical elements representing components, the lines 1402 representing edges of the graph. The lines 1402 may be color coded, each color representing a type of relationship 702-710. A pair of components may have multiple relationships, such as some or all of a environmental variable relationship 702, network relationship 704, session relationship 706, access relationship 708, and a network connection relationships. Separate lines 1402 may be displayed to represent each type of relationship or a single line may represent all of the relationships between components represented by a pair of graphical elements.

A graphical element or a line 1402 may be augmented with additional visual data describing the component or relationship represented by the graphical element or line 1402. For example, the additional visual data may be displayed upon clicking the graphical element or line 1402, hovering over the graphical element or line 1402, or other interaction. The additional data may be collected from the logs 200 and may include usage and/or AAI data for a component as described above.

For example, for a graphical element representing a host 802, the additional data may include a status 1404 (up, critical, down, unreachable, etc.) and AAI data for the host such as available and/or used computing power 1406 (processor cores, processor time, processor cycles, etc.), available and/or used memory 1408, and available and/or used storage 1410. For a graphical element representing a storage volume 116, the additional data may include a status 1412, available storage 1414 and/or storage usage, and IOP (input output operation) usage 1416 and/or availability. For a graphical element representing a cluster 111, pod 112, container 114, or application instance 118, the additional data may include a status 1418, computing power usage 1420, memory usage 1422, and storage usage 1424. For a cluster 111 and/or pod 112, the computing power usage 1420, memory usage 1422, and storage usage 1424 may be an aggregate for all containers 114, application instances 118, and storage volumes 116 managed by the cluster 111 and/or pod 112 as wells the computing resources used by the cluster 111 and/or the pod 112 itself.

For a line 1402, the additional data may include data describing the one or more relationships represented by the line 1402, such as a listing of each type of relationship 700-710 represented by the line, a status 1426 of each relationship, and usage 1428 of each relationship. Usage of a relationship may include, for example, an amount of data transmitted over a network connection, number of requests or frequency of requests for a session or access relationship, latency of a network connection, latency of responses to requests for a session or access relationship, or other data.

A graphical element or a line 1402 may also be augmented with an action menu 1430, such as in response to user interaction with the graphical element or line 1402. The action menu 1430 may include graphical elements that, when selected by a user, invoke actions to one or both of (a) modify the information shown in the visual representation 1400 and (b) perform actions with respect to a component represented by a graphical element or line 1402. For example, the action menu 1430 may include elements to invoke deleting a component, restarting a component, creating a relationship 702-710 between a component and another component, creating a snapshot or backup copy of a component, replicating a component, duplicating a component, or other actions. The method 1300 may therefore include receiving 1318 interactions with the visual representation 1400 of the topology and performing actions in response, such as modifying 1320 the information displayed in the visual representation and/or modifying the components represented by the visual representation of the topology. An action invoked for a component may be performed with respect to other components, such as those hosted by the component. For example, an action invoked with respect to a cluster 111 may be performed for all pods 112, containers 114, storage volumes 116, and application instances 118 hosted by the cluster 111.

Figure 14B:
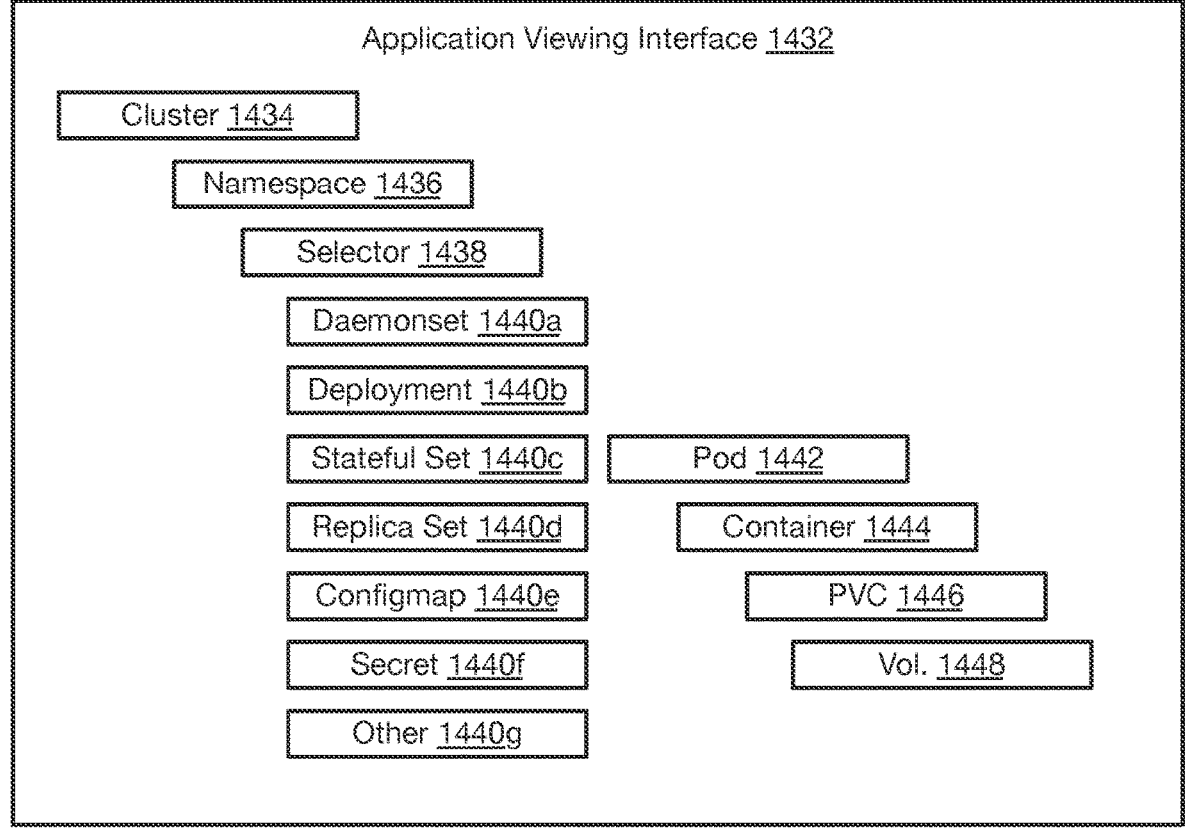
FIG. 14B is an example view of application data in accordance with an embodiment.

FIG. 14B shows an application viewing interface 1432 that may be displayed to a user, such as using data obtained according to the method 1300 or some other approach. The application viewing interface 1432 may include one or more cluster elements 1434 representing clusters 111. A user may select one of the cluster elements 1434 to invoke display of additional information regarding a cluster 111. For example, display of one or more namespace elements 1436, such as a listing of names in a namespace of the cluster 111, each name representing a component 112, 114, 116, 118 of the cluster 111 or other variables, services, or other entities accessible to components of the cluster 111. The interface 1432 may display a selector element 1438 by which a user may input a criteria to filter or select a name from the namespace of the cluster 111. For example, a user may select based on version (e.g., which HELM release of KUBERNETES a component belongs to or was deployed by), type of application (database, webserver, etc.), executable image, data of instantiation, or any other criteria.

For each application instance 118 satisfying the criteria input by the user to the selector element 1438, the application viewing interface 1432 may display various items of information for the application instance 118. Exemplary items of information may include a daemon set 1440a, deployment data 1440b, a stateful set 1440c, a replica set 1440d, a configmap 1440e, one or more secrets 1440f, or other data 1440g. Some or all of the items may be selected by a user to invoke display of additional data. For example, a user may invoke display of pod data 1442 for a pod 112 hosting the application instance 118, container data 1444 describing the container 114 hosting the application instance 118, persistent volume claim (PVC) data 1446 for a storage volume 116 accessed by the application instance 118, and volume data 1448 describing the storage volume 116 accessed by the application instance 118.

For each element selectable in the application viewing interface 1432, selection of that element may invoke display of elements associated with that element and may also invoke display of real time data for each element, such as any of the observability data (e.g., log data 200) for each element that may be collected, processed (aggregated, formatted, etc.), and displayed as the observability data is generated for each element.

Figure 14C:
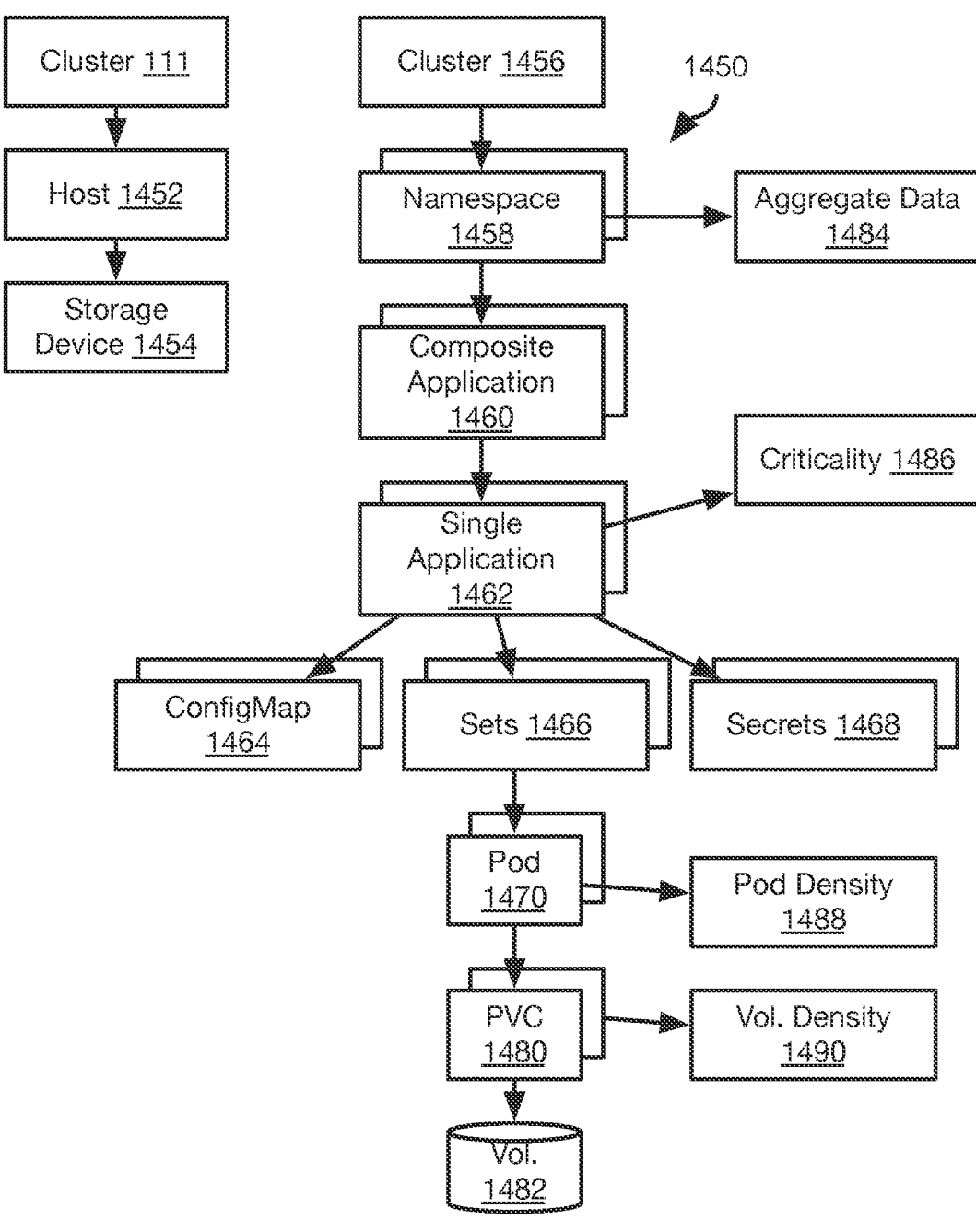
FIG. 14C is an example view of cluster data in accordance with an embodiment.

FIG. 14C illustrates yet another interface 1450 that may be used to visually represent the topology and receiver user inputs in order to invoke display of additional information for a cluster 111, a host 1452 executing one or more components of the cluster 111, and a storage device 1454 of one of the hosts 1452. The interface 1450 may include a cluster element 1456 representing a cluster 111, a namespace element 1458 representing a namespace of the cluster 111, a composite application element 1460 representing two or more application instances 118 that cooperatively define a bundled application, and a single application element 1462 representing a single application instance 118.

Selecting of a given element 1456, 1458, 1460, 1462 may invoke display of additional information: selecting cluster element 1456 may invoke display of the namespace element 1458, selecting a name from the namespace element 1458 may invoke display of a composite application element 1460, and selecting a name from the composite application element 1460 may invoke display of a single application element 1462.

Selecting a single application element 1462 may invoke display of data describing the application instance 118 represented by the single application instance 118. For example, the data may include element 1464 showing configmap data, element 1466 showing various sets (replica set, deployment set, stateful set, daemon set, etc.), element 1468 showing secrets, or other data, such as any observability data of the application instance 118.

Selection of an element 1462, 1464, 1466, may invoke display of additional data, for example, a pod element 1470 including data describing a pod 112, a PVC element 1480 describing a PVC, and a volume element 1482 describing a storage volume 116 (such as data describing the amount of data used by the storage volume 116 and a storage device storing data for the storage volume 116).

The interface 1450 may be used to evaluate the criticality of components of a cluster 111. For example, selecting the namespace element 1458 may invoke display of aggregate data 1484, such as aggregated logs (e.g., log files combined by ordering messages in the log files by time sequence), aggregated metrics (aggregate processor usage, memory utilization, storage utilization), aggregated alerts and/or events (e.g., events and/or alerts combined and ordered by time of occurrence), aggregated access logs (e.g., to enable tracking of user actions with respect to the cluster 111 or a component of the cluster 111). The aggregate data 1484 may be used to perform root cause analysis (RCA) in combination with the topology data as described in U.S. application Ser. No. 16/561,994, filed Sep. 5, 2019, and entitled PERFORMING ROOT CAUSE ANALYSIS IN A MULTI-ROLE APPLICATION, which is hereby incorporated herein by reference in its entirety.

Selecting an single application element 1462 may invoke display of a criticality 1486 of the application instance 118 represented by the single application element 1462. Criticality 1486 may be a metric that is a function of a number of other application instances 118 that are dependent on the application instance 118, e.g., having a relationship 700-710 with the application instance 118. Criticality 1486 may include a "blast radius" of the application instance 118 (see FIG. 14D and corresponding description).

Selecting a pod element 1470 may invoke display of a pod density 1488 (e.g., number of pods) for a host executing the pod 112 represented by the pod element 1470. The pod density 1488 may be used to determine criticality of the host and whether the host may be overloaded.

Selecting a PVC element 1480 may invoke display of a volume density 1490 (e.g., number of storage volumes 116, total size of storage volumes 116) stored on the storage devices or an individual storage device of the host. The volume density 1490 may be used to determine criticality of the host and whether the storage devices of the host may be overloaded.

Figure 14D:
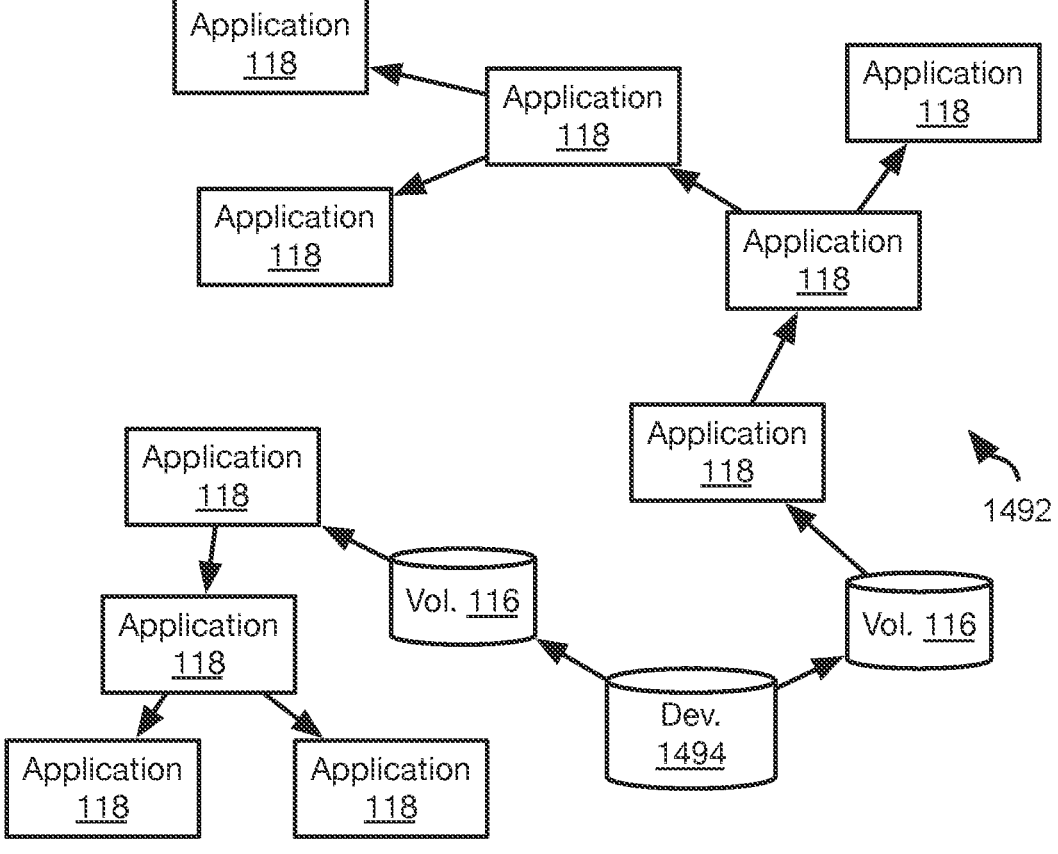
FIG. 14D is an example view showing the criticality of a storage volume in accordance with an embodiment.

FIG. 14D illustrates yet another interface 1492 that may be used to visually represent the topology. The interface 1492 may include visual representations of the illustrated components. A storage device 1494 (e.g., hard disk drive, solid state drive) stores data for a storage volume 116 is used by an application instance 118 that may have one or more relationships, e.g., relationship 700-710, with other application instances 118 that themselves have relationships 700-710 with other application instances. In particular, one or more application instances 118 that are not executing on the same host as the storage volume may be represented in the interface 1492. The interface 1492 may be a "blast radius" representation that illustrates the impact of failure of the storage device 1494 would have on other application instances 118 or other components of a cluster 111 including the storage volume 116 or one or more other clusters 111.

Referring to FIGS. 15 to 19, using the AAI, the computing resources allocated to components in a network environment 100 may be reduced based on usage of computing resources by application instances 118. A cloud computing platform 104 may charge for computing resources purchased independently of actual usage. Accordingly, AAI may be used to identify modifications to deployments of application instances in order to reduce purchased computing resources.

Figure 15:
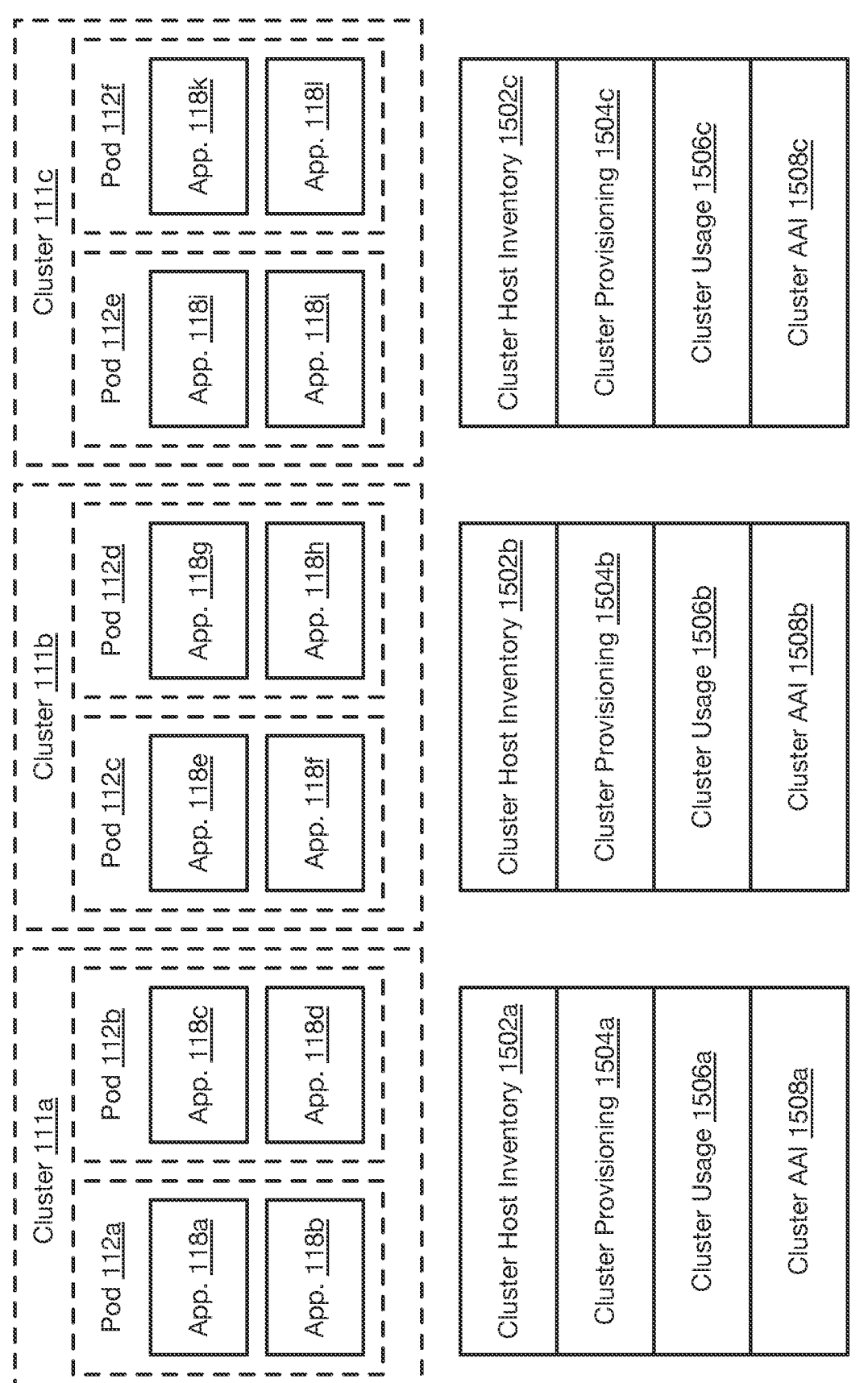
FIG. 15 is a diagram showing data used to redeploy applications and perform cluster consolidation in accordance with an embodiment.

Referring specifically to FIG. 15, the orchestrator 106 or another component may calculate, for each cluster of a plurality of clusters 111a-111c, a cluster host inventory 1502a-1502c. The cluster host inventory 1502a-1502c is the number of processing cores, amount of memory, and amount of storage on servers 102 that is allocated to a particular cluster 111a-111c. For a cloud computing platform 104, the cluster host inventory 1502a-1502c may include the amount of computing power, memory, and storage of the cloud computing platform allocated to the cluster 111a-111c.

The orchestrator 106 or another component may further calculate cluster provisioning 1504a-1504c for each cluster 111a-111c. Cluster provisioning 1504a-1504c is the computing resources (computing power, memory, and/or storage) allocated to a component (e.g., pod 112a-112c, container 114, storage volume 116, or application instance 118a-118l) within a cluster 111a-111c. In some instances, the cluster provisioning 1504a-1504c is identical to the cluster host inventory 1502a-1502c and is omitted. In other instances, cluster provisioning 1504a-1504c includes the computing resources allocated to individual components (pods 112a-11c, storage volumes 116, application instances 118a-118l) of a cluster 111a-111c.

The orchestrator 106 or another component may further calculate cluster usage 1506a-1506c for each cluster 111a-111c. The cluster usage 1506a-1506c for a cluster 111a-111c may include, for each computing resource (computing power, memory, storage) the total usage of that computing resource by all components within the cluster 111a-111c, including the cluster itself. The cluster usage 1506a-1506c may be obtained from log files 200 as described above. The cluster usage 1506a-1506c for a cluster 111a-111c may include a listing of the amount of each computing resource used by each individual component of the cluster 111a-111c and the cluster 111a-111c itself.

The orchestrator 106 or another component may further calculate cluster AAI 1508a-1508c for each cluster 111a-111c. Cluster AAI 1508a-1508c may include AAI(t), O(t,i), and O(t) calculated as described above except that the hardware inventory is limited to the cluster host inventory 1502a-1502c and only the usage of components within the cluster 111a-111c and the cluster itself is used in the calculation.

Figures 16A, 16B:
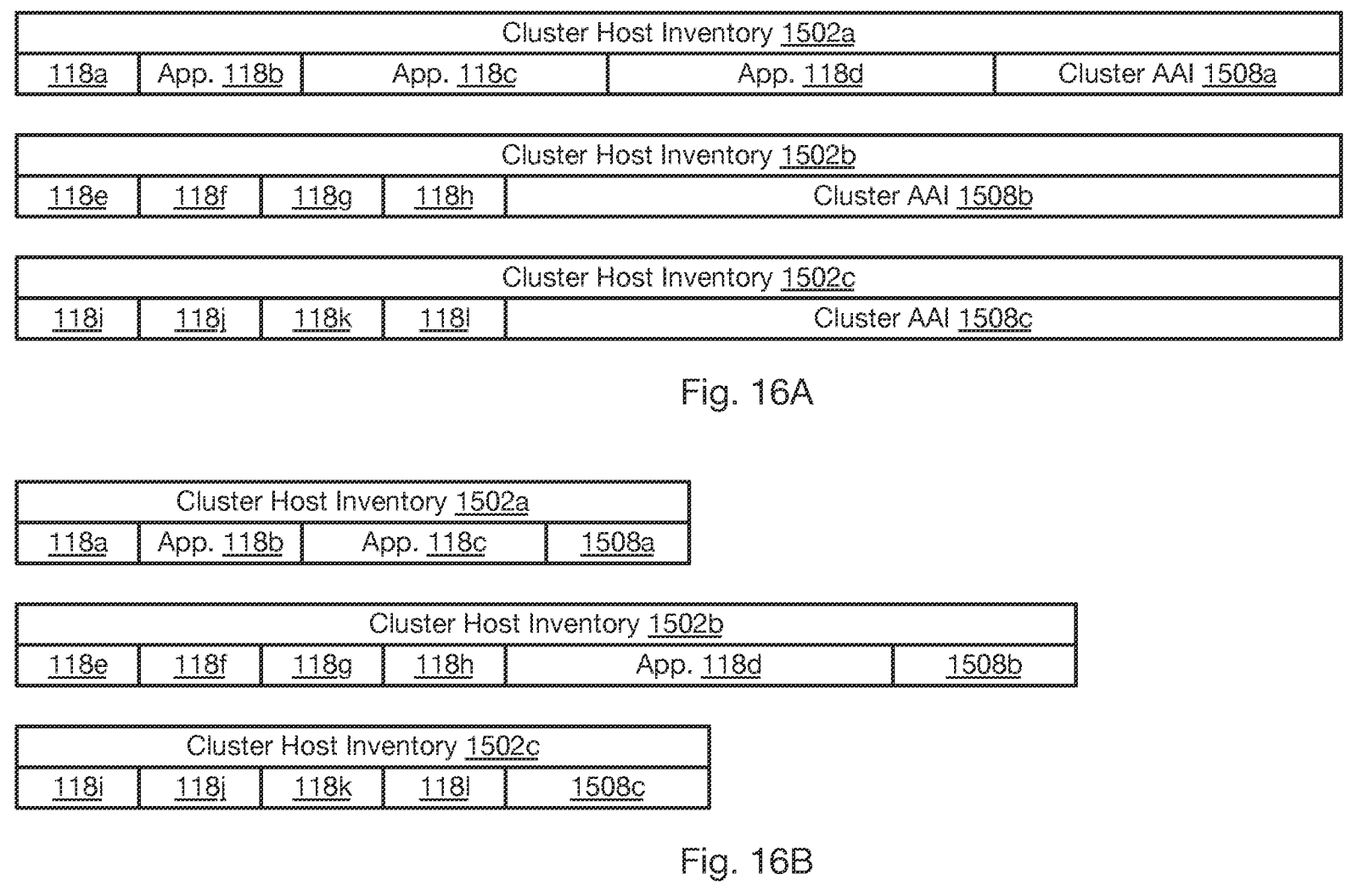

FIG. 16A is a simplified representation of an available computing resource and usage thereof. Each bar in FIG. 16A represents either an amount of a computing resource (hardware inventory 1502a-1502c, cluster AAI 1508a-1508c) or usage of the computing resource (application instances 118a-118l). The illustrated representation is simplified in that other usages have been omitted (pods 112a-112c, storage volumes 116, the clusters 111a-111c themselves) and only one computing resource is represented, however these usages and computing resources could be included in practice. As is apparent, each cluster has an amount of cluster AAI 1508a-1508c of the computing resource representing the difference between the cluster host inventory 1502a-1502c and the usage by various components of each cluster 111a-111c.

Referring to FIG. 16B, while still referring to FIG. 16A, one or more components may be redeployed from one cluster 111a-111c to another. For example, application 118d on cluster 111a is consuming much more of the computing resource than other applications 118a-118c on the cluster 111a. In contrast, cluster 111b has sufficient cluster AAI 1508b of the computing resource to host the application 118d. Accordingly, application 118d may be redeployed on cluster 111b.

In a cloud computing environment 104 where computing resourced are virtualized, the amount of the cluster host inventory 1502a-1502c for some or all of clusters 111a-111c may be reduced, thereby reducing the amount charged for the cluster host inventory 1502a-1502c. In particular, the usage of the cluster host inventory 1502a is drastically reduced by removing the usage of the application instance 118d such that significant cost savings may then be achieved by reducing the cluster host inventory 1502a.

Redeployment of an application instance 118d to another cluster 111b may be done subject to satisfying one or more constraints. Otherwise, the redeployment may be prevented. For example, there may be a requirement that the receiving cluster 111b have sufficient amounts of multiple computing resources (computing power, memory, and storage) to receive the application instance 118d. There may be a requirement that moving the application instance 118d to cluster 111b does not violate any affinity requirements with respect to application instances 118a-118c that remain on the original cluster 111a. There may be a constraint that moving the application instance 118d to cluster 111b does not violate any anti-affinity requirements with respect to application instances 118e-118h executing on the receiving cluster 111b.

Redeployment of an application instance 118*d* to a receiving cluster 111*b* may also include adding the application instance 118*d* to a pod 112*c*, 112*d* of the receiving cluster 111*b* or creating a new pod on the receiving cluster 111*b*.

Re-deployment of an application instance 118, e.g., application instance 118*d* in the illustrated example, may include re-deploying the application instance 118 from a server 102 to the cloud computing platform 104 or vice versa. For example, application instance 118*d* may be hosted on the cloud computing platform 104 and may be moved to a server 102 because the application instance 118*d* is using an above-threshold amount of computing resources and will have higher performance if hosted locally on the server 102 and cost less if charges from the cloud computing platform 104 for the application instance 118*d* were eliminated. Similarly, an application instance 118 having usage below a minimum threshold may be moved from a server 102 to the cloud to provide local computing resources on the server 102 for an application instance on the cloud computing platform 104 with usage above a maximum threshold.

Figure 16C:
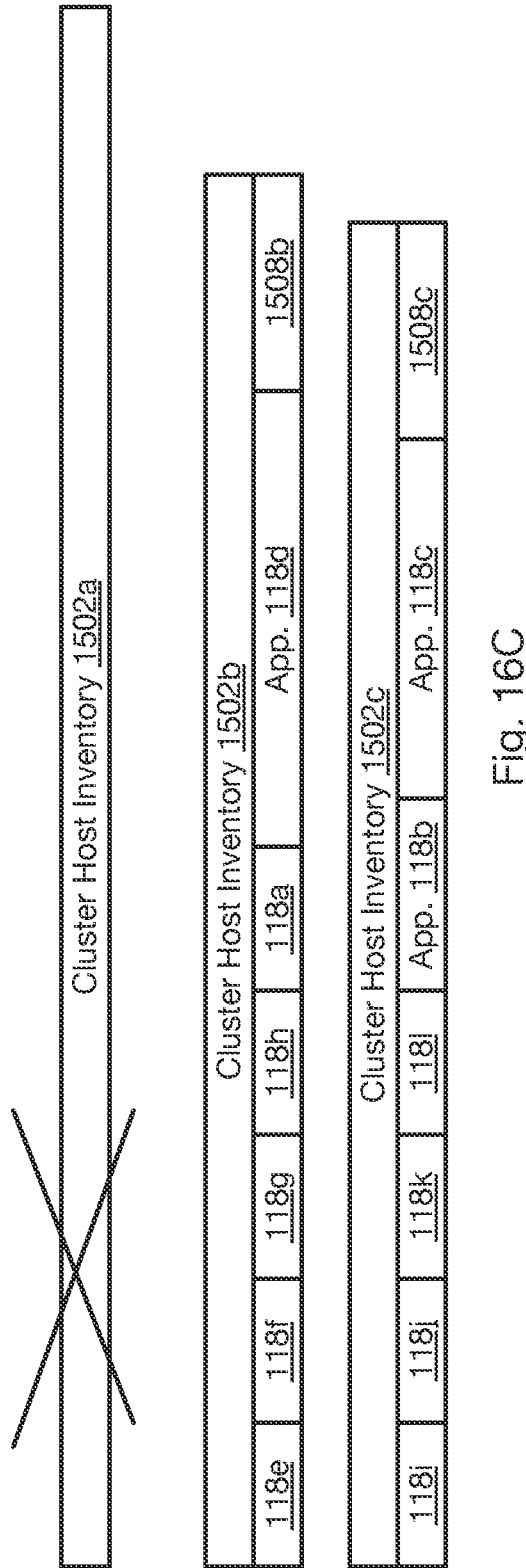

Referring to FIG. 16C, in another example, consolidation of clusters may be performed by moving all application instances 118*a*-118*d* to one or more other clusters 111*b*, 111*c* subject to any affinity and anti-affinity constraints and subject to the other clusters 111*b*, 111*c* having sufficient cluster AAI 1508*b*, 1508*c*. The entirety of the cluster host inventory 1502*a* may then be removed along with the corresponding cost of the cluster host inventory 1502*a*.

Figure 17A:
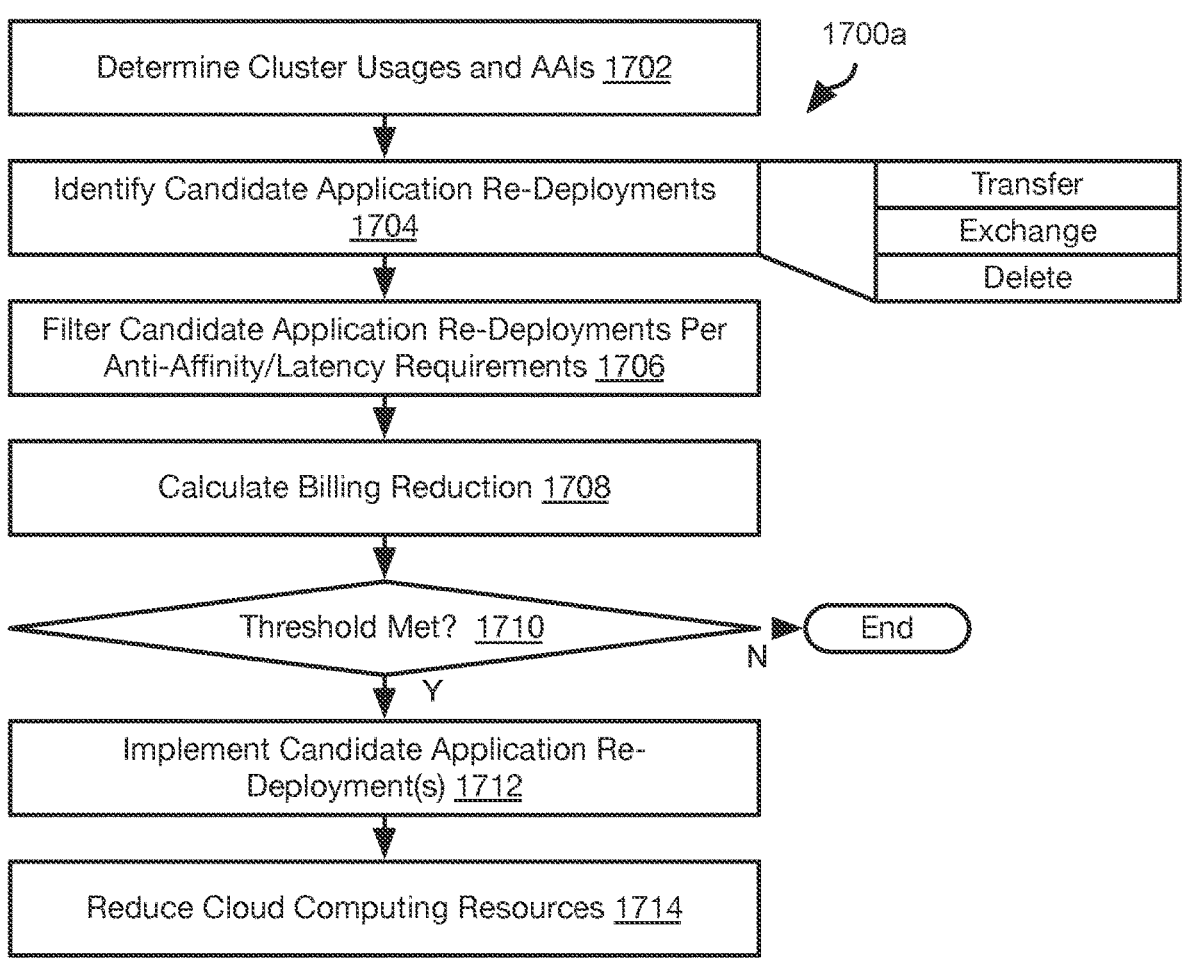
FIG. 17A is a process flow diagram of an example method for performing application redeployments in accordance with an embodiment.

FIG. 17A illustrates an example method 1700*a* that may be executed by the orchestrator 106 or another component in order to redeploy application instances 118 to a different cluster 111. To facilitate the understanding of the method, reference is made to the components shown in FIG. 15 as a non-limiting example. In particular, any number of clusters 111 hosting any number of components may be processed according to the method 1700*a*.

The method 1700*a* may include determining 1702 the usages and cluster AAIs of each cluster 111, such as the usages 1506*a*-1506*c* of the components of a plurality of clusters 111*a*-111*c* and the cluster AAIs 1508*a*-1508*c* of the plurality of clusters 111*a*-111*c*. The method 1700*a* may include identifying 1704 candidate re-deployments. Identifying 1704 candidate redeployments may be limited to evaluating usage of application instances 118 with respect to cluster AAI of clusters 111 to determine whether redeployment is possible. Candidate redeployments may include transferring a particular application instance 118 (e.g., application instance 118*d*) to a receiving cluster 111 (e.g., cluster 111*b*) that has sufficient cluster AAI to receive the application instance 118. Candidate redeployments may include exchanging a first application instance 118 on a first cluster 111 with a second application instance on a second cluster 111 where the second cluster has greater host AAI than the first cluster and the first application instance 118 has greater usage than the second application instance 118. Candidate redeployments may include deleting a first application instance 118 on a first cluster 111 where a second application instance 118 on a second cluster 111 is in a load balancing relationship with the second application instance 118 and the second cluster 111 has sufficient cluster AAI to receive the usage of the first application instance 118 and possibly greater cluster AAI than the first cluster 111. When identifying 1704 a candidate redeployment, multiple application instances 118 of a cluster 111 that have affinity constraints with respect to one another may be treated as a unit, i.e., a receiving cluster 111 must have sufficient cluster AAI to receive all of the multiple application instances 118.

The method 1700*a* may include filtering 1706 the candidate redeployments based on constraints, such as anti-affinity requirements, latency requirements, or other requirements. For example, if redeploying application instance 118*d* to cluster 111*b* violates an anti-affinity constraint of application instance 118*d* with respect to application instance 118*e*, then such a redeployment of application instance 118*d* would be filtered out at step 1706. Likewise, if redeploying application instance 118*d* to cluster 11*b* would exceed a minimum latency required for the application instance 118*d* with respect to an application instance 118*i*-118*l* in cluster 111*c*, then such a redeployment would be filtered out at step 1706. The anti-affinity and latency requirements are exemplary only and other constraints may also be imposed at step 1706.

The method 1700*a* may include calculating 1708 the billing reduction achievable by a candidate redeployment, i.e., how much the cluster host inventory 1502*a*-1502*c* of the clusters modified by the candidate redeployment could be reduced if the candidate redeployment were performed. If the billing reduction is found to be larger than a minimum threshold, then the candidate redeployment is implemented 1712 by performing the transfer, exchange, or deletion of the candidate redeployment. Redeployment that involves moving an application instance 118 from a first cluster 111 to a second cluster 111 may include installing a new application instance 118 on the second cluster (creating a container, installing the application instance 118 in the container), stopping the original application instance 118 on the first cluster 111 and starting execution of the new application instance 118 on the second cluster 111. Other configuration changes may be required to configure other components to access the new application instance 118 on the second cluster 111.

The method 1700*a* may further include reducing 1714 the amount of cloud computing resources used by one or more clusters 111. For example, in the example of FIG. 16B, the computing resources allocated to the cluster 111*a* may be reduced following redeployment of application instance 118*d* to cluster 111*b*. The amount of reduction may be such that the cluster AAI of each cluster 111 is brought down to zero or to a non-zero threshold (e.g., percentage of usage of components deployed on each cluster) for one or more computing resources (computing power, memory, storage) assuming that the usage of the components of the clusters following redeployment remains the same as the usage values used to calculate the cluster AAI of the clusters 111.

Figure 17B:
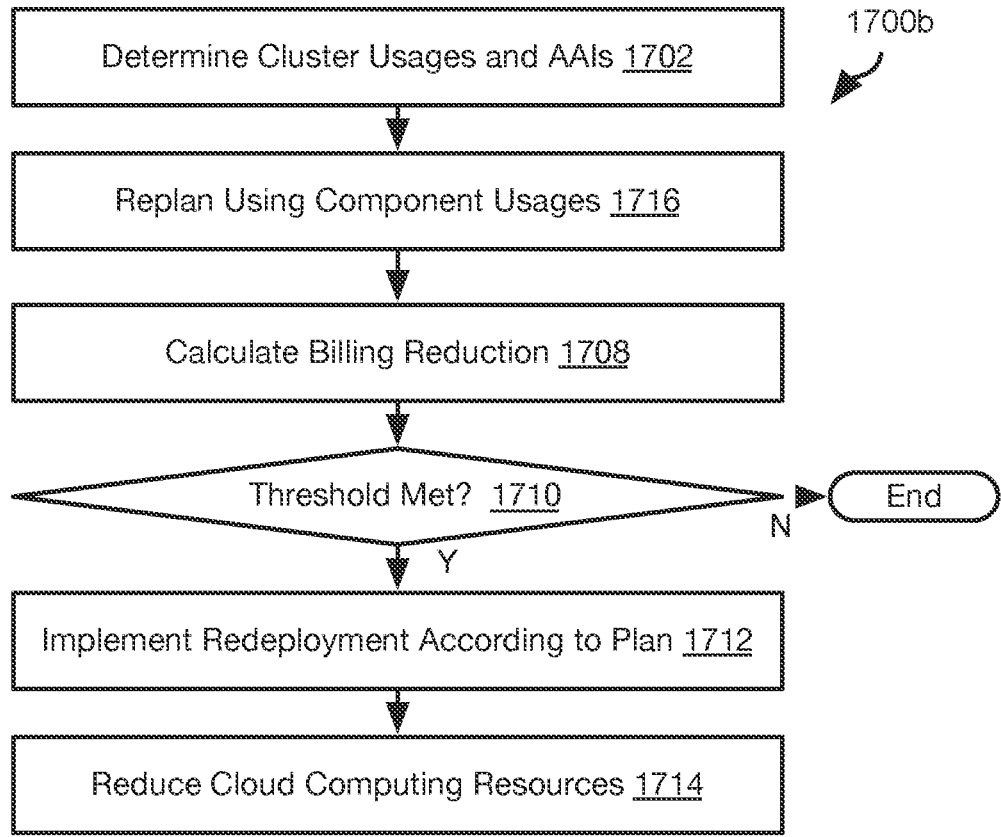
FIG. 17B is a process flow diagram of an example method for performing application redeployments in accordance with an embodiment.

FIG. 17B illustrates an alternative method 1700*b* for redeploying application instances 118. The method 1700*b* may be executed by the orchestrator 106 or other component in order to redeploy application instances 118 to a different cluster 111.

The method 1700*a* may include determining 1702 the usages and cluster AAIs of each cluster 111, such as the usages 1506*a*-1506*c* of the components of a plurality of clusters 111*a*-111*c* and the cluster AAIs 1508*a*-1508*c* of the plurality of clusters 111*a*-111*c*.

The method 1700*a* may include replanning 1704 placement of components using the usages of computing resources for the components in place of provisioning requirements. When initially instantiating the components 111, 112, 114, 116, 118 of in the network environment 100, the orchestrator 106 may perform a planning processing that places components based on required computing resources, affinity requirements, anti-affinity requirements, latency requirements, or other requirements. The orchestrator 106 further attempts to improve the performance of the components operating together by reducing latency and using computing resources as efficiently as possible.

As an example, the orchestrator 106 may use a planning algorithm, such as that disclosed in U.S. Pat. No. 10,817, 380B2 filed Oct. 27, 2020, and entitled IMPLEMENTING AFFINITY AND ANTI-AFFINITY CONSTRAINTS IN A BUNDLED APPLICATION, which is hereby incorporated herein by reference in its entirety. In contrast to the initial planning, the provisioning requirements at step 1716 for each component may be set to be the usage of computing resources measured for each component as described above using log data pulled from hosts of the components. Alternatively, the provisioning requirement may be set to an intermediate value between provisioning for a component as defined by a manifest and the usage measured for that component, such as the usage scaled by a number greater than one, such as a number between 1.1 and 2.

The result of step 1716 may be one or more plans that define where each component is to be placed (which server 102 or which unit of computing resources of the cloud computing platform, which pod 112, which cluster 111, etc.). The billing reduction achieved by each plan may be calculated 1708 and evaluated 1710 to determine whether the plan provides at least a threshold reduction in allocation of computing resources than the current configuration of the components based on the usage of each component measured at step 1702. As noted above, reducing the allocation of computing resources results in a reduction in cost for a cloud computing platform 104.

If so, then one of the plans may be implemented 1712, such as the plan that provides the greatest cost reduction. Implementing 1712 the plan may include migrating components to the locations defined in the plan one at a time to avoid disruption or pausing all components, re-deploying components as defined in the plan, and restarting all components. Re-deploying each component may be performed as described above with respect to step 1712 of the method 1700a.

Following or during implementing 1712 the redeployment, the method 1700b may include reducing allocated cloud computing resources 1714 from the cloud computing platform. The amount of reduction may be such that the cluster AAI of each cluster 111 is brought down to zero or to a non-zero threshold (e.g, percentage of usage of each cluster following re-deployment) for one or more computing resources (computing power, memory, storage) assuming that the usage of the components of the clusters following redeployment remains the same as the usage values used to calculate the cluster AAI of the clusters 111.

Figure 18:
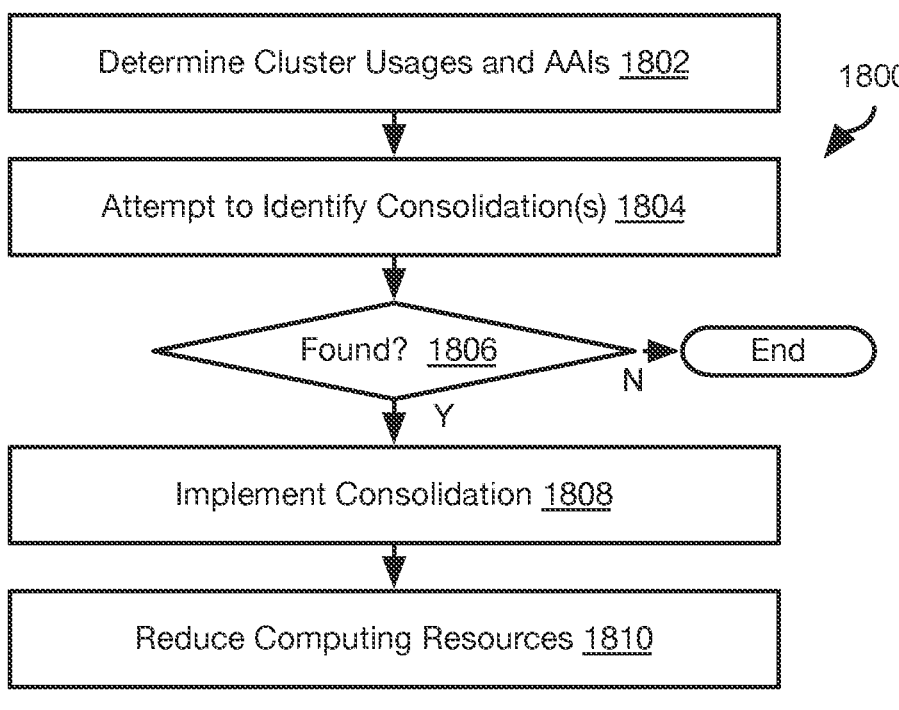
FIG. 18 is a process flow diagram of a method for consolidating clusters in accordance with an embodiment of the invention.

FIG. 18 illustrates an alternative method 1800 for redeploying application instances 118 in order to consolidate the number of clusters 111 of an original configuration, such as the illustrated reduction in clusters shown in FIGS. 16A and 16C. The method 1700b may be executed by the orchestrator 106 or another component.

The method 1800 may include determining 1802 the usages and cluster AAIs of each cluster 111 of the original configuration, such as the usages 1506a-1506c of the components of a plurality of clusters 111a-111c and the cluster AAIs 1508a-1508c of the plurality of clusters 111a-111c.

The method 1800 may include attempting 1804 to identify consolidations. A consolidation is an arrangement of the components of the plurality of clusters on a subset of the plurality of clusters in which one or more clusters of the plurality of clusters and one or more hosts of the plurality of clusters are eliminated. A method for attempting to identify consolidations is described below with respect to FIG. 19.

If a consolidation is found 1806, then the consolidation may be implemented 1808. Where multiple consolidations are found the consolidation that achieves the highest cost savings may be implemented 1808. A consolidation may include a plan defining the location for each component on the remaining clusters 111. Accordingly, the components may be re-instantiated and configured on the remaining clusters and started. In some embodiment, only those components that are at different locations in the plan relative to the original configuration of the components are re-deployed to different locations either. While the consolidation is implemented, the original components may be shut down. Alternatively, the components may continue to operate and be migrated one at a time until the plan is implemented 1808.

The computing resources allocated to clusters that are removed as part of implementing 1808 the consolidation may be reduced 1810. For on-premise equipment, servers 102 may be moved offline or be allocated to other uses. For units of cloud computing resources on a cloud computing platform 104, payments for the use of one or more units of cloud computing resources allocated to a removed cluster may be ended or other action may be taken to end the acquisition of the one or more units of cloud computing resources.

Figure 19:
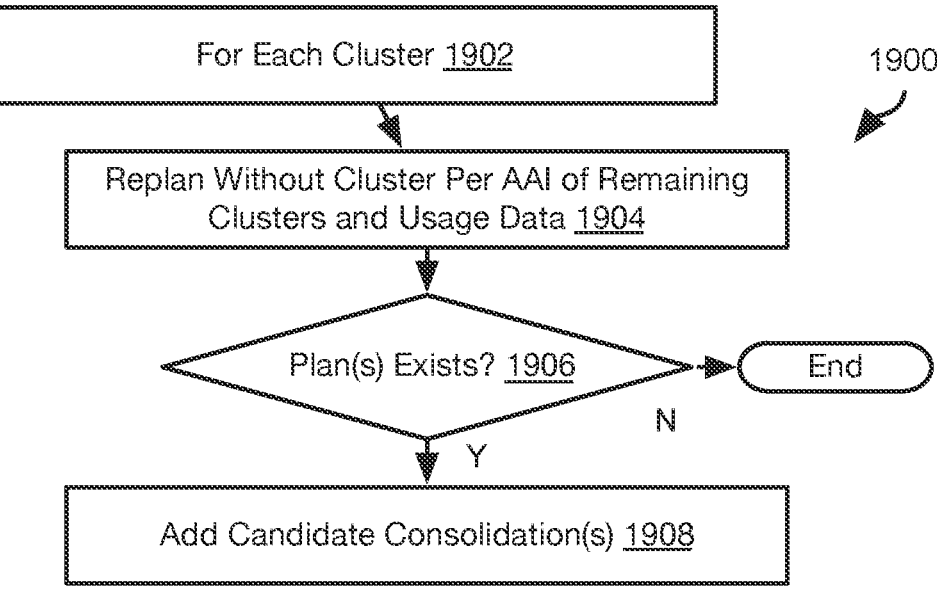
FIG. 19 is a process flow diagram of a method for identifying candidate cluster consolidations.

FIG. 19 illustrates a method 1900 that may be used to identify potential cluster consolidations. The method 1900 may be executed by the orchestrator 106 or another component. The method 1900 may include processing 1902 each cluster 111 as "the subject cluster" by replanning 1904 without the subject cluster 111, i.e., without the cluster host inventory currently allocated to the subject cluster 111. Replanning may be implemented as described above with respect to step 1716 of the method 1700b with respect to the cluster host inventory of the clusters 111 other than the subject cluster 111 ("the remaining clusters"). As noted above, replanning may include using a planning algorithm, such as that disclosed in U.S. Pat. No. 10,817,380B2, to identify locations for each component on the hosts of the remaining clusters such that each component has allocated computing resources at least as large as the usage for each component and such that the location for each component satisfies any affinity, anti-affinity, latency, or other requirements with respect to the locations for the other components.

If a plan that eliminates the subject cluster 111 is not found 1906 to exist, then the method 1900 ends with respect to the subject cluster 111. If one or more plans are found to exist, then each plan is added 1908 to a set of candidate consolidations.

After processing each cluster 111 as the subject cluster, if one or more plan is found that eliminate the subject cluster, the method 1900 may be repeated recursively using the set of clusters 111 excluding the subject cluster. For example, supposing there are cluster 111a-111f and a plan is found that eliminates the cluster host inventory of cluster 111a. The method 1900 may be repeated to determine if the cluster host inventory of any of clusters 111b-111f may be eliminated. This process may be repeated until the method 1900 does not identify any possible consolidations.

After processing each cluster 111 as the subject cluster, and any recursive iterations have been performed, the result is either no possible candidate consolidations or a set of one or more candidate consolidations. If there are multiple candidate consolidations, then the candidate consolidation providing the greatest billing reduction may be selected to be implemented at step 1808.

Figure 20:
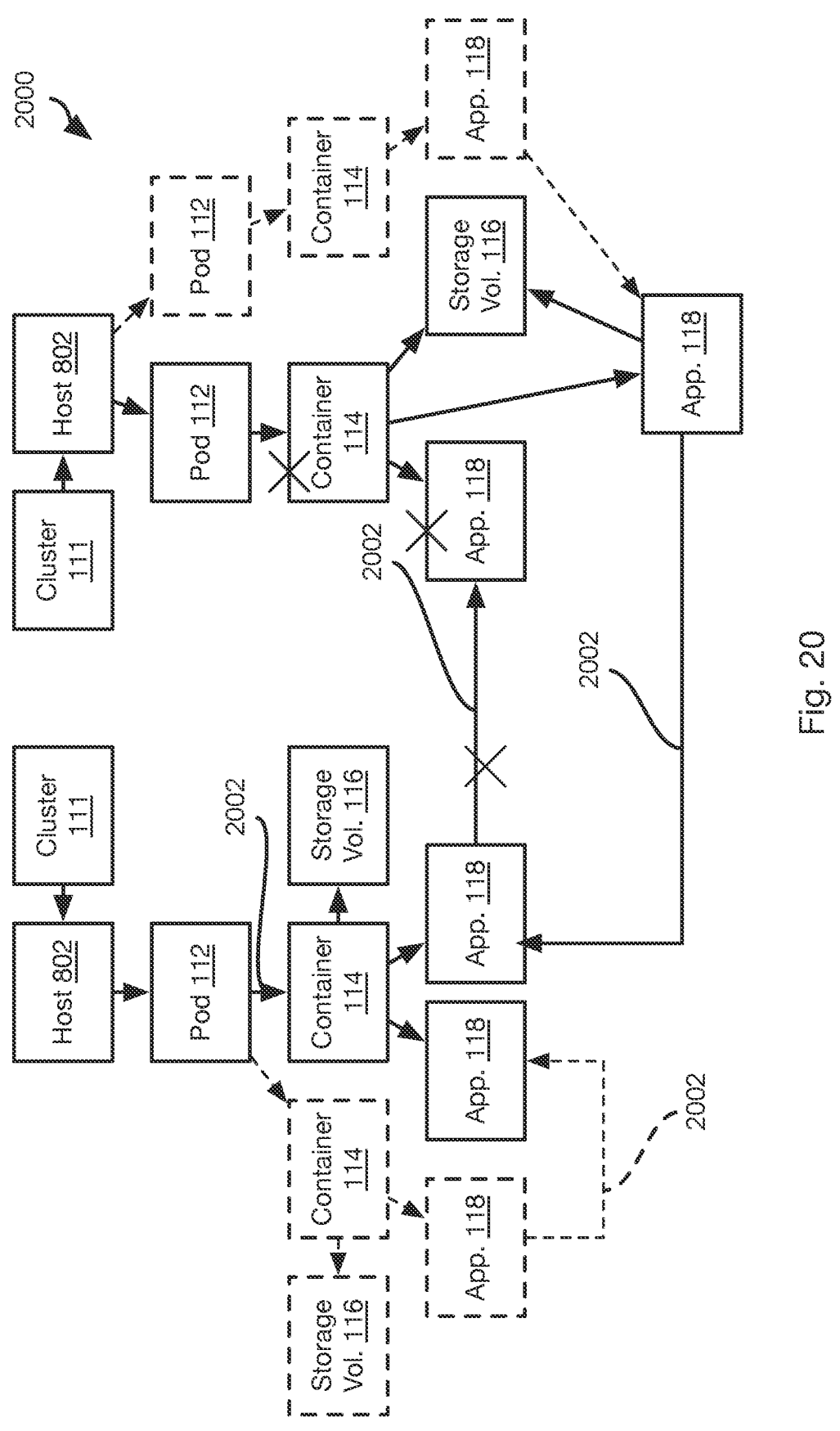
FIG. 20 is a schematic block diagram illustrating modification of a topology in accordance with an embodiment.

Referring to FIG. 20, as noted throughout the description above, a topology is dynamic. The components (clusters 111, pods 112, containers 114, storage volumes 116, and application instances 118) of a topology 2000 may change at any time. Sources of change include automatic scaling up or scaling down of components based on usage by the orchestrator 106, such as using a tool such as KUBERNETES. In particular, for each cluster 111, KUBERNETES manages the scaling up or scaling down of the number of pods 112 and corresponding containers 114, storage volumes 116, and application instances either alone or in cooperation with the orchestrator 106. Administrators may also manually add or remove components as well as relationships between components.

For example, as shown by the dotted representations, pods 112, containers 114, storage volumes 116, and application instances 118 may be added. Likewise, components and relationships (represented by lines 2002) marked "X" represent components and relationships between components that maybe removed from a topology 2000.

In a production installation where stability is critical, modification of the topology 2000 may be forbidden or subject to one or more constraints in order to reduce the risk of changes that could cause a crash, overloading, or other type of instability.

Figure 21:
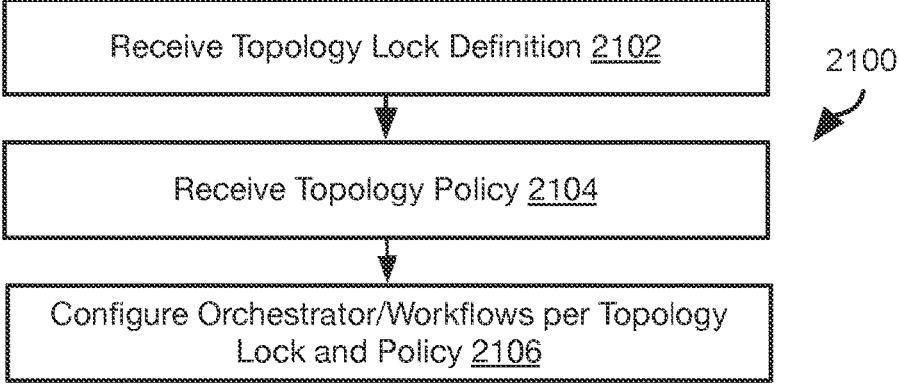
FIG. 21 is a process flow diagram of a method for locking a topology in accordance with an embodiment.

Referring to FIG. 21, for example, the illustrated method 2100 may be executed by the orchestrator 106 in cooperation with the orchestrator dashboard 108 or some other component. The method 2100 may include receiving 2102 a topology lock definition, such as from a user device 110 through the orchestrator dashboard 108. The topology lock definition may define a scope of the topology lock, e.g., an entire topology, a particular cluster 111 or set of clusters 111, a particular host or set of hosts (servers 102 or units of computing resources on a cloud computing platform 104), hosts located in a particular geographic region or facility, a particular region of a cloud computing platform 104, or other definition.

The topology lock definition may further include limitations for a particular type of component (cluster 111, pod 112, container 114, storage volume 116, application instance 118) or particular type of relationship. With respect to application instances 118, a limitation may refer to a instances of a particular executable or class of executable. The limitation may specify, for a particular type of component, instances of particular executable, or particular type of relationship any of (a) that the number thereof cannot change, (b) that the number thereof cannot increase, (c) that the number thereof cannot decrease, (d) that the number thereof cannot increase faster than a predefined rate, or that the number thereof cannot decrease faster than a predefined rate.

The method 2100 may include receiving 2104 a topology policy for each topology lock definition. The topology policy defines action to be taken to one or both of (a) prevent violation of the topology lock definition or (b) handle violations to the topology lock definition.

The method 2100 may include configuring 2106 some or all of the orchestrator 106, workflows in the workflow repository 120, or other components in order to implement each topology lock definition and its corresponding topology policy.

For example, workflows usage to instantiate or de-instantiate (i.e., delete) a type of component may be modified to reference a topology lock and corresponding topology policy referencing that type of component such that an instantiation or de-instantiation of that type of component will not be allowed to complete in violation of the topology lock if required according to the corresponding policy. In other instances, an alert is generated by the workflow that would be in violation of a topology lock.

In another example, a container 114 may be configured to reference a container network interface (CNI), container runtime interface (CRI), or container storage interface (CSI) that is called by the container 114 during instantiation and/or start up. Any of the CNI, CRI, and CSI may be an agent of the orchestrator and may be modified to respond to instantiation of a container 114 hosting an application instance 118 that is in modification of a topology lock with either (a) preventing instantiation if required by the corresponding topology policy or (b) generating an alert.

The above described examples are only examples of ways in which a topology lock may be enforced and any other aspect of the instantiation or de-instantiation of a component may be modified to include evaluating whether the instantiation or de-instantiation is in violation of a topology lock and implementing an action required by the corresponding topology policy.

Figure 22:
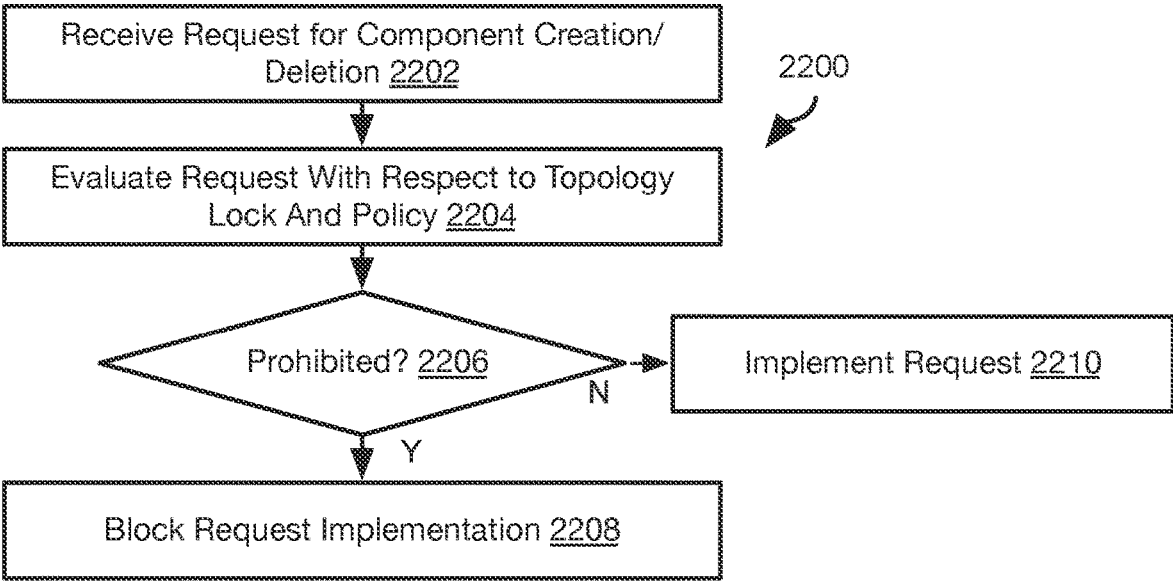
FIG. 22 is a process flow diagram of a method for preventing modification of a topology in accordance with an embodiment.

For example, FIG. 22 illustrates a method 2200 for preventing violations of a topology lock having a corresponding topology policy. The method 2200 may be executed by the orchestrator 106, CRI, CNI, CSI, or other component. The method 2200 includes receiving 2202 a request for component creation. Note that a request to delete a component may be processed in a like manner with respect The request may be evaluated 2204 with respect to a topology lock and corresponding policy. For example, step 2204 may include evaluating whether the request is to create a component in a portion of the topology referenced by the topology lock (in a particular cluster 111, particular set of servers 102, particular region or data center, particular region of a cloud computing platform, etc.) and whether the component is a type of component referenced by the topology lock. Step 2204 may include evaluating whether the request to create or delete a component is a prohibited action of the topology lock. For example, where no changes are permitted a request to create or delete a component is prohibited. Where only decreasing is prohibited, a request to create a component may be permitted. Where rate-limited increase is permitted, step 2204 may include evaluating whether creating the component will exceed the rate limit. Where the request is a request to delete a component and only increasing is prohibited, the request to delete a component may be permitted. Where rate-limited decrease is permitted, step 2204 may include evaluating whether deleting the component will exceed the rate limit.

If the request to create or delete is found 2206 to be allowed, the request is implemented 2210. If not, then the method 2200 may include blocking implementation of the request. Blocking may include one or more of:

Causing a workflow required to implement the request to terminate.

Causing a CNI, CRI, or CSI to prevent completion of set up of a container that is the component to be created or hosts the component to be created.

Note that the creation or deletion of relationships between components may be processed in a like manner. A request to create or delete a relationship may be evaluated 2204 with respect to one or more topology locks and either implemented 2210 or blocked 2208 where not allowed according to the topology lock. Blocking may be implemented using a modified workflow, CNI, CRI, or CSI. Blocking may also be performed in other ways, such as blocking network traffic to set up a session relationship 706, access relationship 708, or network connection relationship 710.

Figure 23:
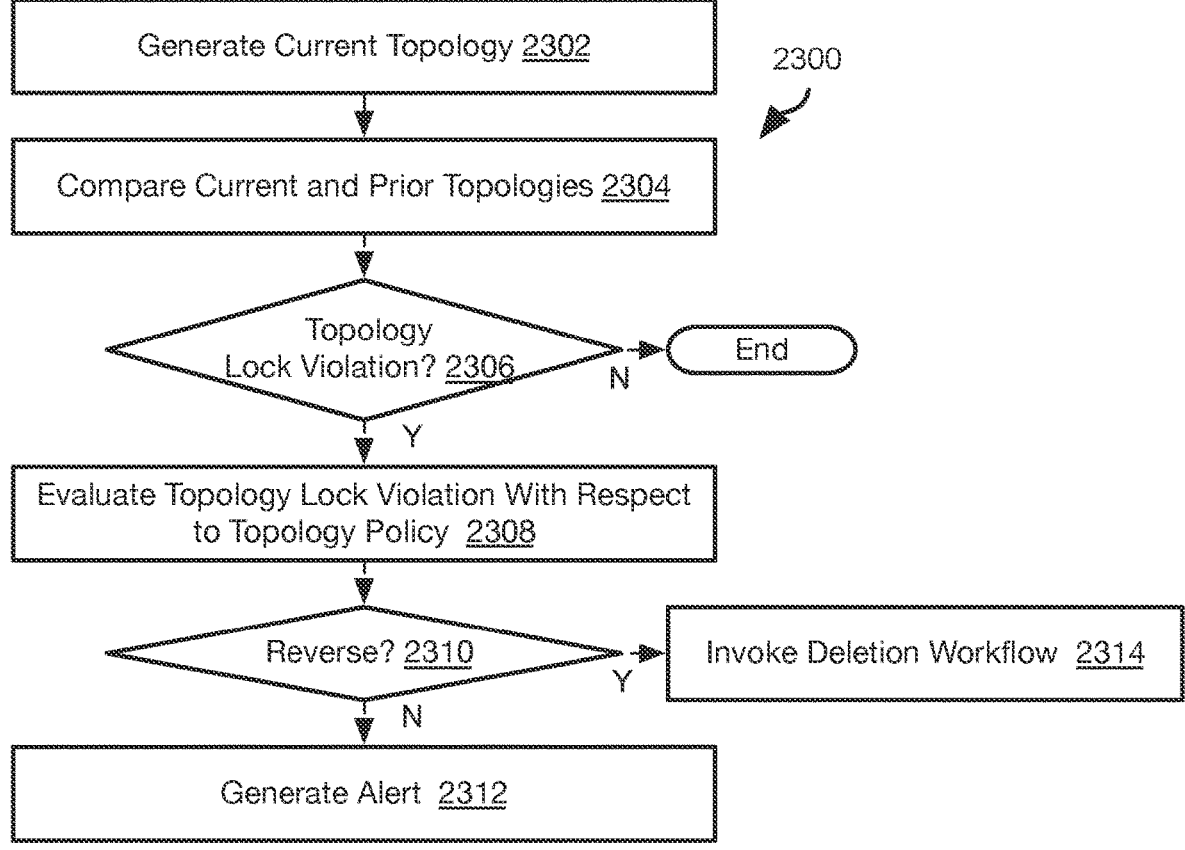
FIG. 23 is a process flow diagram of a method for detecting changes to a topology in accordance with an embodiment.

FIG. 23 illustrates a method 2300 for handling a topology lock and corresponding policy. The method 2300 may be performed by the orchestrator 106 or other component. The method 2300 may be performed in addition to the method 2200 or as an alternative to the method 2200. For example, a policy corresponding to a topology lock may specify that changes in violation of the topology lock should be blocked such that the method 2200 is implemented. A policy corresponding to a topology lock may specify that violations of the topology lock should be detected after occurrence and an alert raised or the violation be reversed such that the method 2300 is performed.

The method 2300 may include generating 2302 the current topology of an installation, such as according to the method 1300 of FIG. 13 or some other approach. The method 2300 may include comparing 2304 the current topology to a prior topology for the installation at a prior time, either at an initial instantiation of the installation or at a time subsequent to the initial installation. For example, the prior topology may be a topology that existed at or before a first time at which the topology lock was created whereas the current topology is obtained from provisioning data 300 and/or log files 200 that were generated at a second time subsequent to the first time.

A topology lock may have a scope that is less than all of an entire topology (see discussion of step 2102 of the method 2100). Accordingly, the portion of the current and prior topologies corresponding only to that scope may be compared at step 2304. A toplogy lock may be limited to a particular type of component such that only components of the current topology having that particular type are compared at step 2304. Where a topology lock references a type of relationship, then relationships of that type in the current and prior topologies may be compared.

The method 2300 may include evaluating 2306 whether the current topology violates one or more topology locks with respect to the prior topology. For example, whether a new component of a particular type has been added to a part (cluster 111, server 102, data center, cloud computing region, etc.) of the installation. For example, the component identifiers for each component of each type referenced by a topology lock may be compiled for the current and prior topologies. Component identifiers for the current topology that are not included in the component identifiers of the prior topology may be identified. Likewise, where a topology lock prevents deletion, component identifiers for the prior topology that are not in the current topology may be identified.

Where a topology lock references a type of relationship, then each relationship in the current topology may be attempted to be matched with a relationship in the prior topology, i.e. having the same component identifiers and type as a relationship in the prior topology. Relationships without a corresponding patch in the prior topology may be deemed new. Likewise, relationships in the prior topology that lack a match in the current topology may be deemed deleted. Whether a new or deleted relationship violates a policy may be determined at step 2306.

For topology lock violated at step 2306, the method 2300 may include evaluating 2308 the topology policy corresponding to the topology lock. The action indicated in the topology policy may then be implemented. For example, where the policy is found 2310 to require that a change in violation of a topology lock be reversed, the method 2300 may include invoking 2314 a workflow to reverse the change. The workflow may be a workflow to delete a component or relationship in violation of the topology lock. Such a workflow may be the same workflow used to remove that type of component or relationship when scaling down due to lack of usage. The workflow may be a series of steps to delete a component or relationship in an orderly and non-disruptive way, i.e. handling pending transactions and transitioning workloads to another component. Where a component or relationship is deleted in violation of the topology lock, the workflow may re-instantiate the component or relationship. The workflow to re-instantiate a component or relationship may be the same used to create an initial instance of that type of component or relationship or to scale up the number of components or relationships of that type.

Where indicated by the topology policy corresponding to a topology lock, the method 2300 may include generating 2312 an alert. The alert maybe directed to the user device 110 or user account of an administrator, an individual that invoked a change to the policy in violation of the topology lock, or other user. The alert may communicate information such as the topology lock violated, a number of components or relationships that violated the policy, a graphical representation of the change to the policy (see, e.g., the graphical representation of FIG. 20), or other data.

Figure 24:
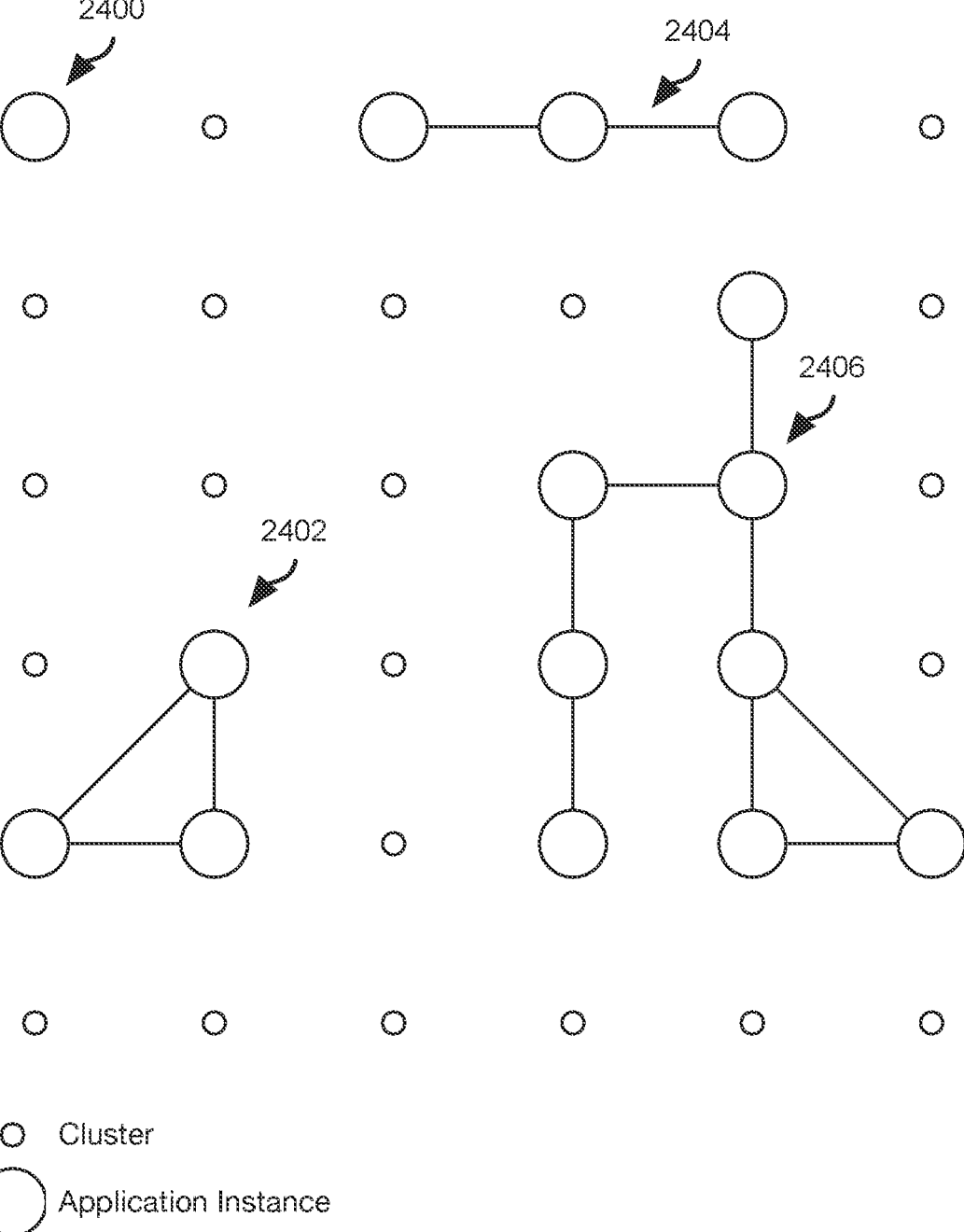
FIG. 24 is a schematic diagram illustrating the deployment of multiple applications on a plurality of clusters in accordance with an embodiment.

Referring to FIG. 24, application instances 118 may have various relationships with respect to one another. As discussed herein, application instances 118 are classified as being either a dot application instance 2400, triangle application instances 2402, line application instances 2404, and graph application instances.

A dot application instance 2400 is an application instance 118 that does not have a relationship (e.g., a relationship 700-710) with another application instance 118. For example, an application instance 2400 may be an instance of an application providing a standalone service. A dot application instance 2400 may be an application instance that does not have any relationships of a certain type with respect to other application instances 118. For example, a dot application instance 2400 may lack a hosting relationship 700, environmental variable relationship 702, or network relationship 704 with another application instance 118. In some embodiments, one or more of a session relationship 706, access relationship 708, and network connection relationship 710 may still exist with respect to a dot application instance 2400 and another application instance 118.

Triangle application instances 2402 include at least three application instances 118 that all have a relationship, such as any of the relationships 700-710, with respect to one another. Although "triangle application instances" is used throughout, this term shall be understood as including any number of application instances 118 for which each application instance 118 is dependent on every other application instance 118.

In one example of a triangle application instances 2402, the application instances 118 may be replicas of one another with one of the application instances 118 being a primary replica that processes production requests and two or more other application instances 118 being backup replicas that mirror a state of the primary replica. Accordingly, each change to the state of the primary replica must be propagated to and acknowledged by each backup replica. Health checks may be performed by the backup replicas with respect to one another and the primary replica in order to determine whether a backup replica should become the primary replica. The above-described relationships between the primary replica and the backup replicas relationships therefore result in triangle application instances 2402. In the illustrated example, each application instance 118 of a set of triangle application instances 2402 executes on a different cluster 111.

Line application instances 2404 include a plurality of application instances 118 that are arranged in a pipeline such that an input to a first application instance results in a corresponding output that is received as an input to a second application instance, and so on for any number of application instances. As an example, application instances 118 of line application instances 2404 may include a web server, a back-end server, and a database server. A web request received by the webserver may be translated by the web server into one or more requests to the back-end server. The back-end server may process the one or more request, requiring one or more queries to the database server. Responses from the database server are processed by the back-end server to obtain a response that is transmitted to the web server. The web-server may then generate a web page including the response and transmit the web page as a response to the web request. In the illustrated example, each application instance 118 of a set of line application instances 2404 executes on a different cluster 111.

Graph application instances 2406 include a plurality of application instances 118 that include line application instances 2404 and/or triangle application instances 2402 connected by one or more relationships, such as one or more relationships 700-710. For example, an application instance 118 of first line application instances 2404 may receive an output of an application instance 118 of second line application instances 2404 thereby creating a branch. Likewise, an application instance 118 of a first set of triangle application instances 2402 may produce an output that is received by an application instance 118 of an application instance of line application instances 2404 or another set of triangle application instances 2402. An application instance 118 of a first set of triangle application instances 2402 may receive an output from an application instance 118 of an application instance of line application instances 2404 or another set of triangle application instances 2402.

Figure 25:
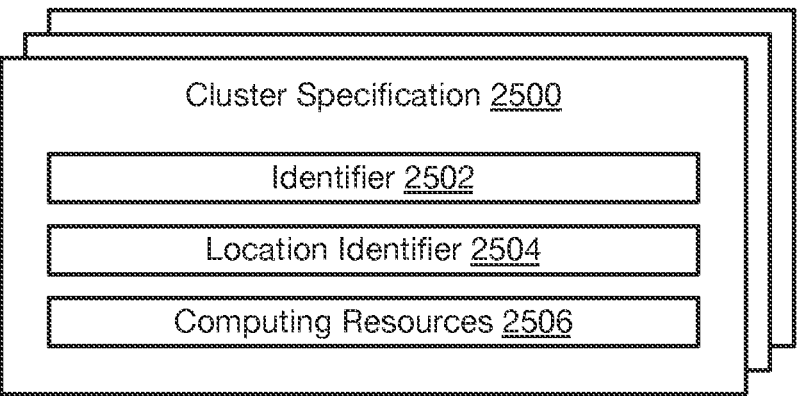
FIG. 25 is a schematic block diagram illustrating a cluster specification in accordance with an embodiment.

Referring to FIG. 25, a cluster 111 may have a corresponding cluster specification 2500. The cluster specification 2500 may be created before or after creation of the cluster 111 and includes information that is helpful for provisioning components (pods 112, containers 114, storage volumes 116, and/or application instances 118) on a cluster 111.

For example, a cluster specification 2500 for a cluster 111 may include an identifier 2502 of the cluster 111 and a location identifier 2504. The location identifier 2504 may include one or both of a name assigned to the geographic region in which the one or more hosts on which the cluster 111 executed are located and data describing the geographic region in which the one or more hosts are located, such as in the form of a name of a city, state, country, zip code, or the name of some other political or geographic entity. The location identifier 2504 may include coordinates (latitude and longitude or global positioning system) describing the location of the one or more hosts. Where there are multiple hosts that are geographically distributed, a location (political or geographic name and/or coordinates) for each host may be included in the location identifier 2504.

The cluster specification 2500 may include a listing of computing resources 2506 of the one or more hosts. The computing resources may include a number of processing cores, amount of memory, and amount of storage available on the one or more hosts. For example, the computing resources may include the cluster host inventory of the cluster 111 as described above. Where the cluster 111 is already hosting one or more components, the computing resources 2506 may additionally or alternatively include the cluster AAI of the one or more hosts as defined above.

Figure 26:
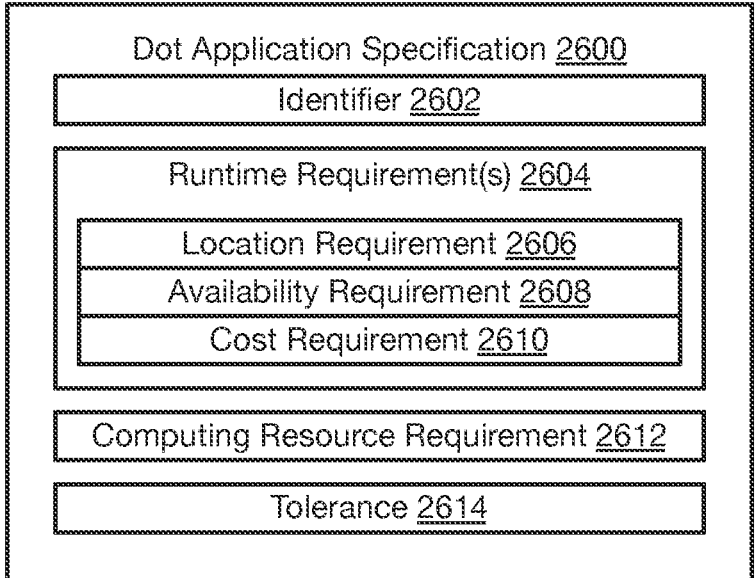
FIG. 26 is a schematic block diagram illustrating a dot application specification in accordance with an embodiment.

Referring to FIG. 26, a dot application specification 2600 may include an identifier 2602 of an application instance 118 to be created according to the dot application specification 2600. The dot application specification 2600 may include one or more runtime requirements 2604. For example, the runtime requirements 2604 may include a location requirement 2606. For example, the location requirement 2606 may include a name of a political or geographic entity in which a host executing the application instance 118 must be located. The location requirement 2606 may be specified in terms of a coordinate and a radius about the coordinate in which the host executing the application instance 118 must be located.

The runtime requirements 2604 may further include an availability requirement 2608. The availability requirement 2608 may be a value from a set of possible values indicating required availability of the application instance 118 of the dot application specification 2600. For example, such values may include "high availability," "intermittent availability," and "low availability." The orchestrator 106 may then interpret the availability requirement 2608 when selecting a host for the application instance 118 and configuring the application instance 118 on the selected host.

The runtime requirements 2604 may further include a cost requirement 2610. The cost requirement 2610 may indicate a permitted cost to execute the application instance 118 of the dot application specification 2600. For example, a cloud computing provider may charge for some or all of the computing power (e.g., processor cores), memory, and storage used by an application instance 118. Accordingly, the cost requirement 2610 may specify a maximum amount that may be spent executing the application instance 118, such as an amount that may be spent per day, month, or other time period.

The dot application specification 2600 may further include a computing resource requirement 2612 that specifies the amount of processing power, memory, and/or storage required to execute the application instance 118 of the dot application specification 2600. The computing resource requirement 2612 may be a static definition or may be dynamic, e.g., an initial provisioning requirement and an annotation indicating that provisioning may be dynamically modified based on usage (e.g., as described above with respect to FIGS. 15-19).

The dot application specification 2600 may further include a tolerance 2614 that specifies whether exceptions to any of the above-described requirements 2604, 2612 are permitted. For example, the tolerance 2614 may indicate that the application instances 118 for the dot application specification 2600 should not be deployed unless all of the requirements 2604, 2612 are met. The tolerance 2614 may indicate the application instance 118 can be deployed to a closest alternative ("best fit") if a cluster 111 meeting the requirements 2604, 2612 is not found. The tolerance may indicate a permitted deviation from any of the requirements 2604, 2612 if a cluster 111 meeting the requirements 2604, 2612 is not found.

The dot application specification 2600 defines the provisioning of the application instances 118 for the dot application specification. Other parameters defining the instantiation and configuring of the application instance 118 on a selected host may be included in a manifest ingested by the orchestrator 106 that is in addition to the dot application specification 2600. Alternatively, the dot application specification 2600 may be part of the manifest.

Figure 27:
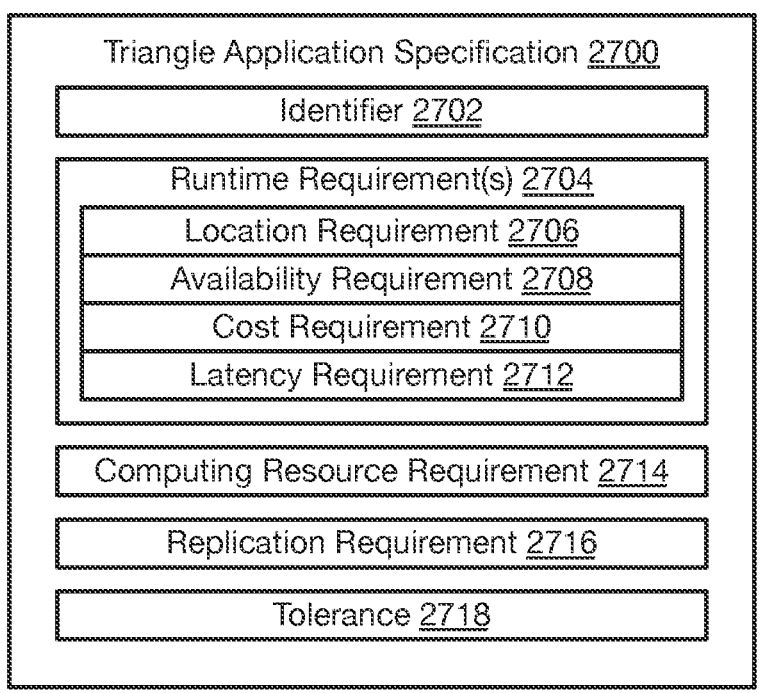
FIG. 27 is a schematic block diagram illustrating a triangle application specification in accordance with an embodiment.

Referring to FIG. 27, a triangle application specification 2700 may include an identifier 2702 of a set of application instances 118 to be created according to the triangle application specification 2700. The triangle application specification 2700 may include one or more runtime requirements 2704. For example, the runtime requirements 2704 may include a location requirement 2706. For example, the location requirement 2706 may include a name of a political or geographic entity in which the hosts executing the set of application instances 118 must be located. The location requirement 2606 may be specified in terms of a coordinate and a radius about the coordinate in which one or more hosts executing the one or more application instances 118 of the tier must be located. The location requirement 2706 may include a separate location for each application instance 118 of the set of application instances 118.

The runtime requirements 2704 may further include an availability requirement 2708. The availability requirement 2708 may be a value from a set of possible values indicating required availability for the set of application instances 118 of the triangle application specification 2700. For example, such values may include "high availability," "intermittent availability," and "low availability." The orchestrator 106 may then interpret the availability requirement 2708 when selecting hosts for the set of application instances 118 and configuring the set of application instances 118 on the selected hosts. The availability requirement 2708 may include a separate availability requirement for each application instance 118 of the set of application instances 118.

The runtime requirements 2704 may further include a cost requirement 2710. The cost requirement 2710 may indicate a permitted cost to execute the set of application instances 118 of the triangle application specification 2700. For example, a cloud computing provider may charge for some or all of the computing power (e.g., processor cores), memory, and storage used by each application instance 118 of the set of application instances 118. Accordingly, the cost requirement 2710 may specify a maximum amount that may be spent executing the set of application instances 118, such as an amount that may be spent per day, month, or other time period. The cost requirement 2710 may include a separate cost requirement for each application instance 118 of the set of application instances 118.

The runtime requirements 2704 may further include a latency requirement 2712. Since each application instance 118 of the set of application instances 118 has a dependency on every other application instance of the set, proper function may require that latency be below a maximum latency specified in terms of a time, e.g., 10 ms, 20 ms, or some other time value. The latency requirement 2712 may be specified for each pair of application instance 118 in the set, i.e., the maximum permitted latency between the application instances 118 of each possible pair of application instances 118.

The triangle application specification 2700 may further include a computing resource requirement 2714 that specifies the amount of processing power, memory, and/or storage required to execute each application instance 118 of the set of application instances 118 of the triangle application specification 2700. The computing resource requirement 2714 may be a static definition or may be dynamic, e.g., an initial provisioning requirement and an annotation indicating that provisioning may be dynamically modified based on usage (e.g., as described above with respect to FIGS. 15-19).

The triangle application specification 2700 may further include a replication requirement 2716 that specifies how many application instance 118 are included in the set of application instances, e.g., a value of 3 or more. In the event that an application instance 118 fails, the orchestrator 106 will therefore create a new application instance 118 to meet the replication requirement 2716.

The triangle application specification 2700 may further include a tolerance 2718 that specifies whether exceptions to any of the above-described requirements 2704, 2714, 2716 are permitted. For example, the tolerance 2718 may indicate that the application instances 118 for the triangle application specification 2700 should not be deployed unless all of the requirements 2704, 2714, 2716 are met. The tolerance 2718 may indicate the application instances 118 can be deployed to a closest alternative ("best fit") if clusters 111 meeting the requirements 2704, 2714, 2716 are not found. The tolerance may indicate a permitted deviation from any of the requirements 2704, 2714, 2716 if clusters 111 meeting the requirements 2704, 2714, 2716 are not found.

The triangle application specification 2700 defines the provisioning of the set of application instances 118. The instantiation and configuring of each application instance 118 on selected hosts and creating any relationships 700-710 between application instances 118 may be performed according to a manifest ingested by the orchestrator 106 that is in addition to the triangle application specification 2700. Alternatively, the triangle application specification 2700 may be part of the manifest.

Figure 28:
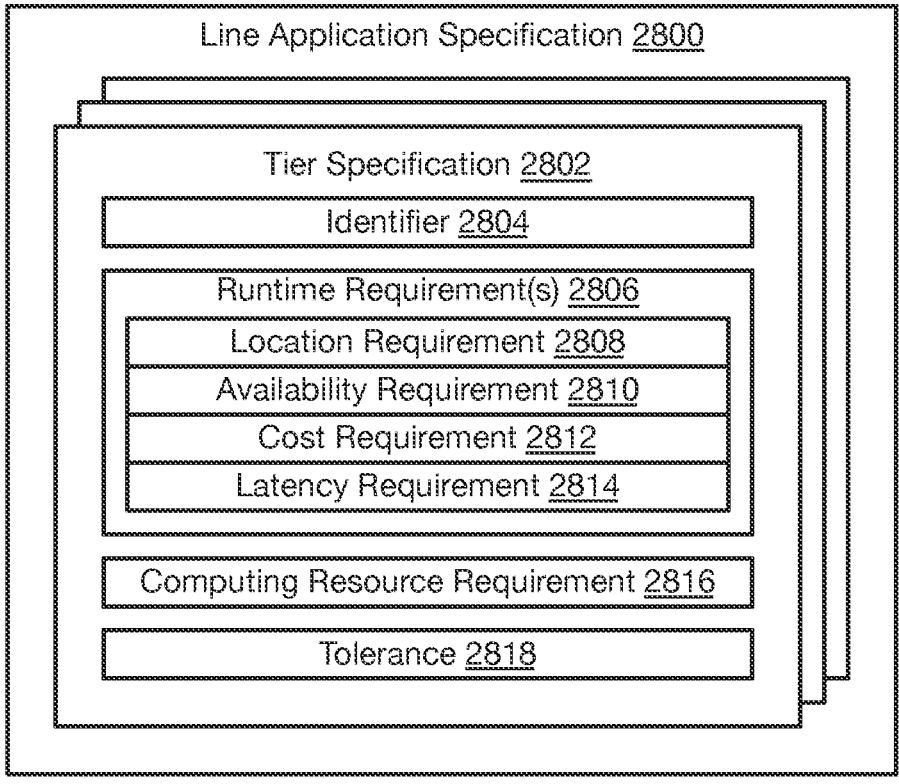
FIG. 28 is a schematic block diagram illustrating a line application specification in accordance with an embodiment.

Referring to FIG. 28, a line application specification 2800 may include a plurality of tier specifications 2802. Each tier specification 2802 corresponds to a different tier in a pipeline defined by the line application specification 2800. Each tier specification 2802 may include a specification of a type of application instance 118 to be instantiated for that tier. Each tier may include multiple application instances 118 of the same or different types.

Each tier specification 2802 may include an identifier 2804 of one or more application instances 118 to be created according to the tier specification 2802. The tier specification 2802 may include one or more runtime requirements 2806. For example, the runtime requirements 2806 may include a location requirement 2808. For example, the location requirement 2808 may include a name of a political or geographic entity in which one or more hosts executing the one or more application instances 118 of the tier must be located. The location requirement 2808 may be specified in terms of a coordinate and a radius about the coordinate in which all of the hosts executing the one or more application instances 118 of the tier must be located. The location requirement 2808 may include a separate location for the one or more application instances 118 of the tier.

The runtime requirements 2806 may further include an availability requirement 2810. The availability requirement 2810 may be a value from a set of possible values indicating required availability for the one or more application instances 118 of the tier. For example, such values may include "high availability," "intermittent availability," and "low availability." The orchestrator 106 may then interpret the availability requirement 2810 when selecting one or more hosts for the one or more application instances 118 of the tier and configuring the one or more application instances 118 on the selected hosts. The availability requirement 2810 may include a separate availability requirement for each application instance 118 of the one or more application instances 118.

The runtime requirements 2806 may further include a cost requirement 2812. The cost requirement 2812 may indicate a permitted cost to execute the one or more application instances 118 of the tier. For example, a cloud computing provider may charge for some or all of the computing power (e.g., processor cores), memory, and storage used by each application instance 118 of the one or more application instances 118. Accordingly, the cost requirement 2812 may specify a maximum amount that may be spent executing the one or more application instances 118 of the tier, such as an amount that may be spent per day, month, or other time period. The cost requirement 2812 may include a separate cost requirement for each application instance 118 of one or more application instances 118 of the tier.

The runtime requirements 2806 may further include a latency requirement 2814. The latency requirement 2814 may one or both of (a) define a maximum permitted latency between multiple application instances of the same tier and (b) define a maximum latency with respect to the application instances 118 of a preceding and/or subsequent tier.

The tier specification 2802 may further include a computing resource requirement 2816 that specifies the amount of processing power, memory, and/or storage required to execute each application instance 118 of the one or more application instances 118 of the tier. The computing resource requirement 2816 may be a static definition or may be dynamic, e.g., an initial provisioning requirement and an annotation indicating that provisioning may be dynamically modified based on usage (e.g., as described above with respect to FIGS. 15-19).

The tier specification 2802 may further include a tolerance 2818 that specifies whether exceptions to any of the above-described requirements 2806, 2816 are permitted. For example, the tolerance 2818 may indicate that the one or more application instances 118 of the tier should not be deployed unless all of the requirements 2806, 2816 are met. The tolerance 2818 may indicate the one or more application instances 118 can be deployed to a closest alternative ("best fit") if clusters 111 meeting the requirements 2806, 2816 are not found. The tolerance may indicate a permitted deviation from any of the requirements 2806, 2816 if clusters 111 meeting the requirements 2806, 2816 are not found.

As noted above, graph application instances 2406 include a plurality of application instances 118 that include multiple line application instances 2404 and/or triangle application instances 2402. Accordingly, the specification for graph application instances may include a collection of specifications 2700, 2800 for the constituent line application instances 2404 and/or triangle application instances 2402 of the graph application instances.

Figure 29:
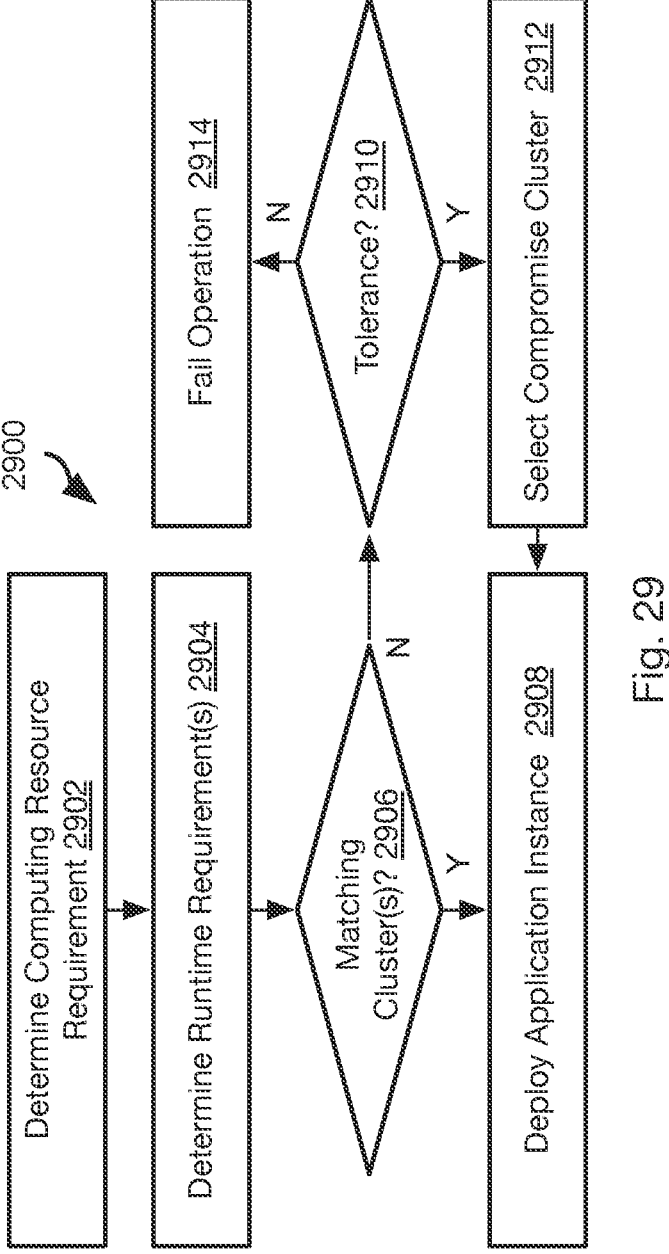
FIG. 29 is a process flow diagram of a method for provisioning a dot application in accordance with an embodiment.

FIG. 29 illustrates a method 2900 for deploying a dot application instance 2400. The method 2900 may be executed by the orchestrator 106. For example, the orchestrator 106 may invoke execution of a workflow from the workflow repository 120 by a worker 124 in order to perform some or part of the method 2900. The method 2900 may be executed in response to the orchestrator 106 receiving a dot application specification 2600 from a user or as part of a manifest.

The method 2900 may include determining 2902 the computing resource requirement 2612 for the dot application instance 2400 and determining 2904 one or more runtime requirements 2604 for the dot application instance 2400. The method 2900 may then include evaluating 2906 the cluster specifications 2500 of available clusters 111 to determine whether any of the clusters 111 have both sufficient computing resources 2506 to meet the computing resource requirements 2612 and satisfy the runtime requirements 2604. As noted above, the available computing resources that are evaluated may be either the cluster host inventory of the cluster 111 or the cluster AAI of the cluster 111 that already has one or more components executing thereon.

If one or more matching clusters are found at step 2906, the method 2900 may include deploying an application instance 118 corresponding to the dot application instance 2400 on the one of the one or more clusters. Where multiple clusters are found at step 2906, one cluster 111 may be selected based on one or more criteria, such as geographic proximity, performance, available cluster inventory or cluster AAI, or other criteria.

If no matching clusters 111 are found at step 2906, the method 2900 may include evaluating 2910 whether the dot application specification 2600 defines a tolerance 2718. Step 2910 may further include evaluating whether any of the available clusters 111 are within a tolerance defined for the computing resource requirement 2612 and/or runtime requirements 2604 of the dot application specification 2600. If the dot application specification 2600 does not provide a tolerance or no clusters 111 are within the defined tolerance, then the operation fails 2914 and an error message may be returned to a user, orchestrator 106, log file 200, or other destination.

If the dot application specification 2600 does provide for a tolerance and/or one or more clusters 111 exists that are within any defined tolerance, then a compromise cluster 111 may be selected 2912. The compromise cluster 111 may be cluster 111 that most closely matches one or both of the computing resource requirement 2612 and the runtime requirements 2604. For example, among the clusters 111 having cluster host inventory and/or cluster AAI meeting the computing resource requirement 2612, a cluster 111 may then be selected that most closely meets the runtime requirements 2604. For example, the runtime requirements 2604 may be ranked such that the cluster 111 meeting the highest ranked runtime requirement(s) 2604 is selected 2912. Once a compromise cluster is selected, the application instance 118 of the dot application instance 2400 is deployed 2908 on the compromise cluster.

Figure 30:
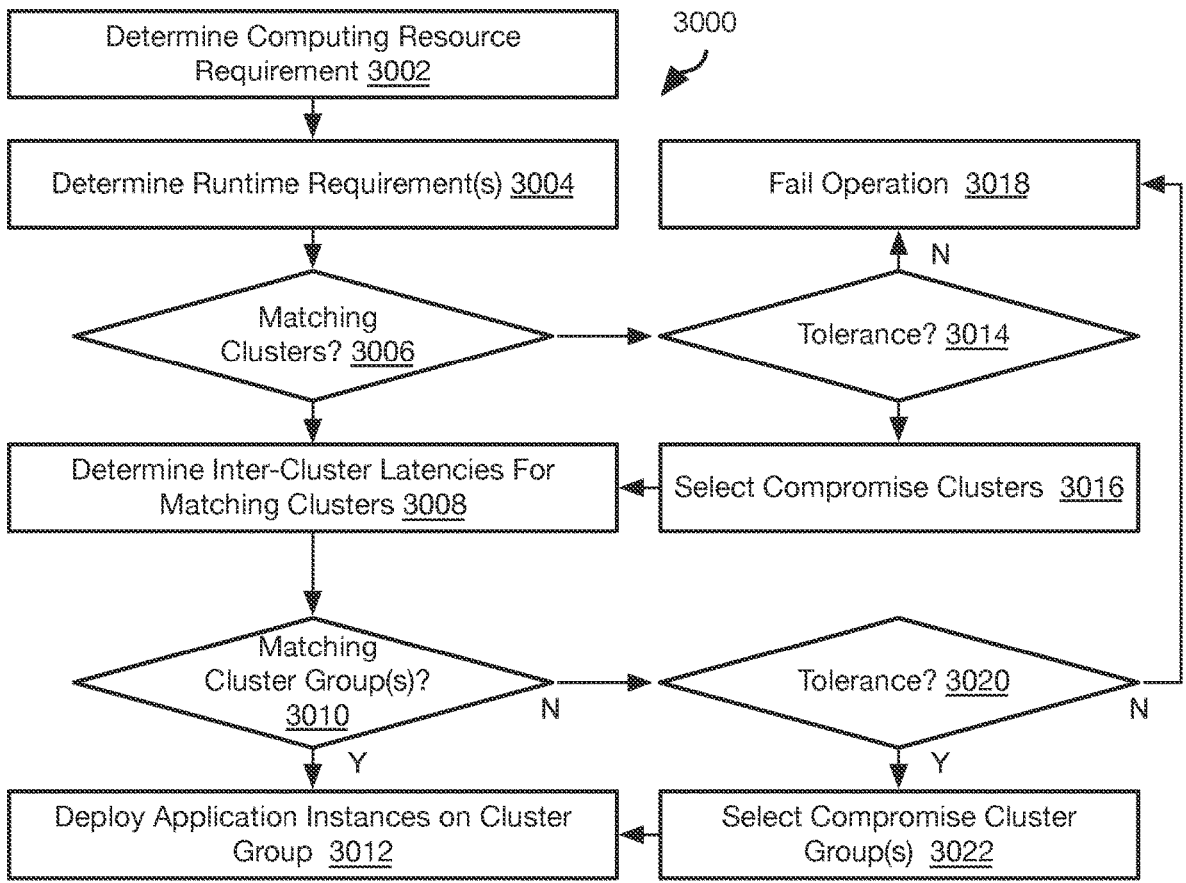
FIG. 30 is a process flow diagram of a method for provisioning a triangle application in accordance with an embodiment.

FIG. 30 illustrates a method 3000 for deploying triangle application instances 2402. The method 3000 may be executed by the orchestrator 106. For example, the orchestrator 106 may invoke execution of a workflow from the workflow repository 120 by a worker 124 in order to perform some or part of the method 3000. The method 3000 may be executed in response to the orchestrator 106 receiving a triangle application specification 2700 from a user or as part of a manifest.

The method 3000 may include determining 3002 the computing resource requirement 2714 for the triangle application instances 2402 and determining 3004 one or more runtime requirements 2704 for the triangle application instances 2402. The method 3000 may then include evaluating 3006 the cluster specifications 2500 of available clusters 111 to determine whether any of the clusters 111 have both sufficient computing resources 2506 to meet the computing resource requirements 2714 and satisfy the runtime requirements 2704. The evaluation of step 3006 may be performed for each application instance 118 of the triangle application instances 2402: for each application instance 118, identify any cluster 111 having sufficient computing resources 2506 and meeting the runtime requirements 2704 for that application instance 118.

Any matching cluster 111 identified at step 3006 may then be further evaluated to determine 3008 inter-cluster latencies for the matching clusters 111. The inter cluster latencies may have been previously calculated and retrieved or may be tested as part of step 3008.

The method 3000 may then include evaluating 3010 whether any cluster groups may be found among the matching clusters that meet the latency requirement 2712 of the triangle application instances 2402. For example, let the application instance 118 of the triangle application instances 2402 be designated as A, B, and C, a matching cluster group is one including a cluster $C_A$ matching the computing resource requirements 2714 and the runtime requirements 2704 of application instance A, a cluster $C_B$ matching the computing resource requirements 2714 and the runtime requirements 2704 of application instance B, and a cluster $C_C$ matching the computing resource requirements 2714 and the runtime requirements 2704 of application instance C, and wherein the latencies between each of these clusters (between $C_A$ and $C_B$, between $C_B$ and $C_C$, and between $C_A$ and $C_C$) meet the latency requirement 2712.

If one or more matching cluster groups are found at step 3010, the method 3000 may include deploying 3012 the application instances 118 of the triangle application instances 2402 on the clusters 111 of one of the one or more matching cluster groups. Where multiple cluster groups are found at step 3010, one cluster group may be selected based on one or more criteria, such as average inter-cluster latency, geographic proximity, performance, available cluster inventory or cluster AAI, or other criteria.

If no matching clusters are found at step 3006, or the number of matching clusters is less than the number needed to implement the triangle application instances 2402, the method 3000 may include evaluating 3014 whether the triangle application specification 2700 defines a tolerance 2718. Step 3014 may further include evaluating whether any of the available clusters 111 are within a tolerance defined for the computing resource requirement 2714 and/or runtime requirements 2704 of the triangle application specification 2700. If the triangle application specification 2700 does not provide a tolerance or no clusters 111 are within the defined tolerance, then the operation fails 3018 and an error message may be returned to a user, orchestrator 106, log file 200, or other destination.

If the triangle application specification 2700 does provide for a tolerance and/or a cluster 111 exists that is within any defined tolerance, then one or more compromise clusters 111 may be selected 3016. The compromise cluster 111 may be a cluster 111 that most closely matches one or both of the computing resource requirement 2714 and the runtime requirements 2704. For example, among the clusters 111 having cluster host inventory and/or cluster AAI meeting the computing resource requirement 2714, a cluster 111 may then be selected that most closely meets the runtime requirements 2704. For example, the runtime requirements 2704 may be ranked such that the cluster 111 meeting the highest ranked runtime requirement(s) 2704 is selected 3016. Any compromise clusters selected at step 3016 may then be processed at step 3008, which may include processing the compromise clusters along with any matching clusters identified at step 3006.

If no matching cluster groups are found at step 3010, the method 3000 may include evaluating 3020 whether the triangle application specification 2700 defines a tolerance 2718 with respect to the latency requirement 2712. Step 3020 may further include evaluating whether any of the inter-cluster latencies for any of the non-matching cluster groups are within a tolerance defined for the latency requirement 2712. If the triangle application specification 2700 does not provide a tolerance or no clusters groups are within the defined tolerance, then the operation fails 3018 and an error message may be returned to a user, orchestrator 106, log file 200, or other destination.

If the triangle application specification 2700 does provide for a tolerance and/or at least one cluster group exists that is within any defined tolerance, then a compromise cluster group may be selected 3022 and the application instances 118 of the triangle application instances 2402 may be deployed on the clusters 111 of the selected compromise cluster group. The compromise cluster group may be the cluster group that most closely matches the latency requirement 2712. Where one or more cluster groups include compromise clusters selected at step 3016, selecting 3022 the compromise cluster group may also include evaluating a combination of the inter-cluster latency of each cluster group and how closely the each cluster of each cluster group meets the computing resource requirement 2714 and the runtime requirements 2704.

Figure 31:
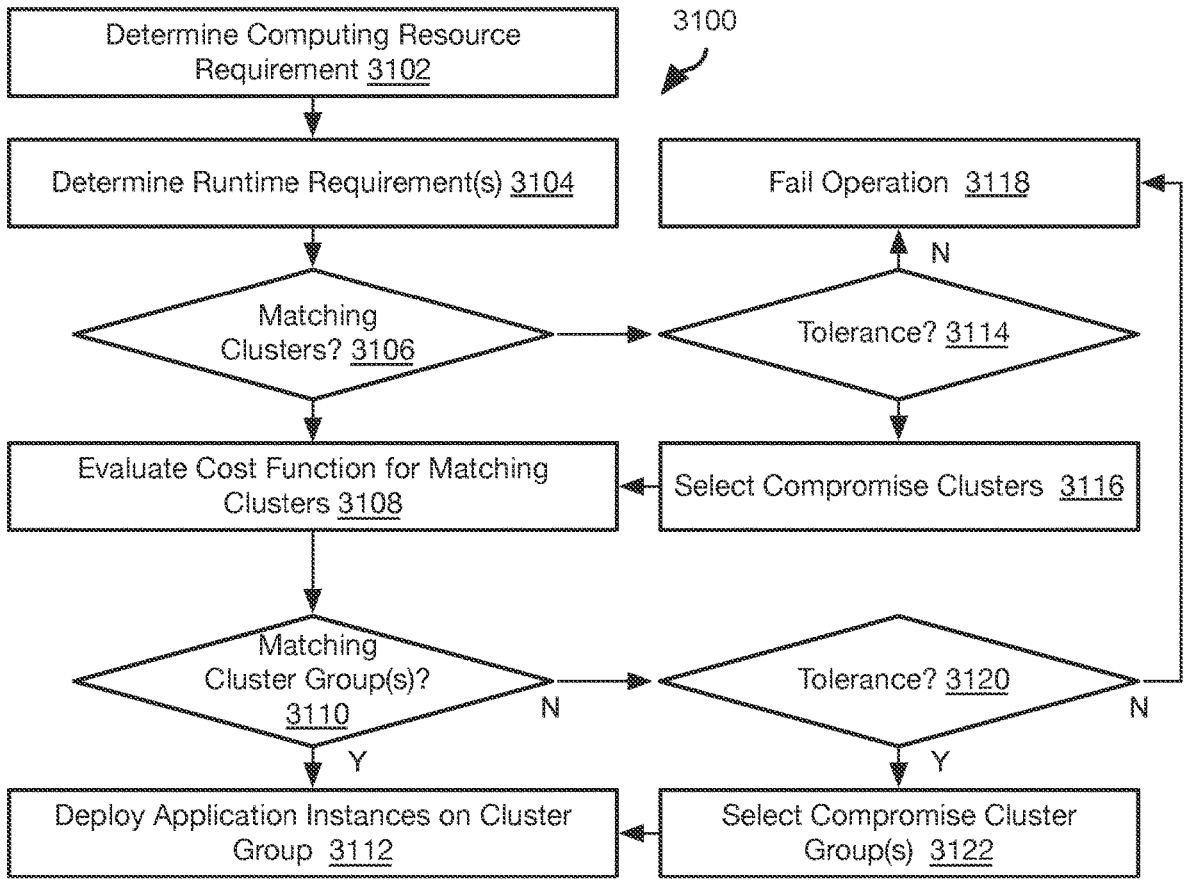
FIG. 31 is a process flow diagram of a method for provisioning a line application in accordance with an embodiment.

FIG. 31 illustrates a method 3100 for deploying line application instances 2404. The method 3100 may be executed by the orchestrator 106. For example, the orchestrator 106 may invoke execution of a workflow from the workflow repository 120 by a worker 124 in order to perform some or part of the method 3100. The method 3100 may be executed in response to the orchestrator 106 receiving a line application specification 2800 from a user or as part of a manifest.

The method 3100 may include determining 3102 the computing resource requirement 2816 for the line application instances 2404 and determining 3104 one or more runtime requirements 2806 for the line application instances 2404. The method 3100 may then include evaluating 3006 the cluster specifications 2500 of available clusters 111 to determine whether any of the clusters 111 have both sufficient computing resources 2506 to meet the computing resource requirements 2816 and satisfy the runtime requirements 2806. The evaluation of step 3106 may be performed for each application instance 118 of the line application instances 2404: for each application instance 118, identify any cluster 111 having sufficient computing resources 2506 and meeting the runtime requirements 2806 for that application instance 118.

Groups of matching clusters 111 identified at step 3106 may then be evaluated 3108 to determine a cost function for each group of matching clusters. The cost function for a group of clusters may include an evaluating of a monetary cost, such as a total monetary cost for deploying the application instances 118 of the line application instances 2404 on the clusters 111 of the group or the monetary cost of deploying the most resource-intensive of the application instances 118 of the line application instances 2404. For example, the application instance 118 hosting a database will be the most resource intensive in most application such that the cost function may be limited to evaluating the monetary cost of deploying the application instance 118 hosting the database on a cluster 111 of a given cluster group meeting the computing resource requirement 2816 and one or more runtime requirements 2806 of the application instance 118 hosting the database.

The method 3100 may then include evaluating 3110 whether there are any cluster groups matching a selection criteria. For example, the selection criteria may be the cost function of any cluster groups falling below a pre-defined threshold.

If one or more matching cluster groups are found at step 3110, the method 3100 may include deploying 3112 the application instances 118 of the line application instances 2404 on the clusters 111 of one of the one or more matching cluster groups. Where multiple cluster groups are found at step 3110, one cluster group may be selected based on one or more criteria, such as cost function, average inter-cluster latency, geographic proximity, performance, available cluster inventory or cluster AAI, or other criteria.

If no matching clusters are found at step 3106, or the number of matching clusters is less than the number needed to implement the line application instances 2404, the method 3100 may include evaluating 3114 whether the line application specification 2800 defines a tolerance 2818. Step 3114 may further include evaluating whether any of the available clusters 111 are within a tolerance defined for the computing resource requirement 2816 and/or runtime requirements 2806 of the line application specification 2800. If the line application specification 2800 does not provide a tolerance or no clusters 111 are within the defined tolerance, then the operation fails 3118 and an error message may be returned to a user, orchestrator 106, log file 200, or other destination.

If the line application specification 2800 does provide for a tolerance and/or a cluster 111 exists that is within any defined tolerance, then one or more compromise clusters 111 may be selected 3116. A compromise cluster 111 may be a cluster 111 that most closely matches one or both of the computing resource requirement 2816 and the runtime requirements 2806. For example, among the clusters 111 having cluster host inventory and/or cluster AAI meeting the computing resource requirement 2816, a cluster 111 may then be selected that most closely meets the runtime requirements 2806. For example, the runtime requirements 2806 may be ranked such that the cluster 111 meeting the highest ranked runtime requirement(s) 2704 is selected 3116. Any compromise clusters selected at step 3116 may then be processed at step 3108, which may include processing the compromise clusters along with any matching clusters identified at step 3106.

If no matching cluster groups are found at step 3110, the method 3100 may include evaluating 3120 whether the line application specification 2800 defines a tolerance 2818 with respect to the cost requirement 2812. Step 3120 may further include evaluating whether cost functions of any of the non-matching cluster groups are within a tolerance defined for the cost requirement 2812. If the line application specification 2800 does not provide a tolerance or no clusters groups are within the defined tolerance, then the operation fails 3118 and an error message may be returned to a user, orchestrator 106, log file 200, or other destination.

If the line application specification 2800 does provide for a tolerance and/or at least one cluster group exists that is within any defined tolerance, then a compromise cluster group may be selected 3122 and the application instances 118 of the line application instances 2404 may be deployed on the clusters 111 of the selected compromise cluster group. The compromise cluster group may be the cluster group that most closely matches the latency requirement 2712. Where one or more cluster groups include compromise clusters selected at step 3116, selecting the compromise cluster group may also evaluate a combination of the inter-cluster latency of each cluster group and how closely the each cluster of each cluster group meets the computing resource requirement 2816 and the runtime requirements 2806.

Figure 32:
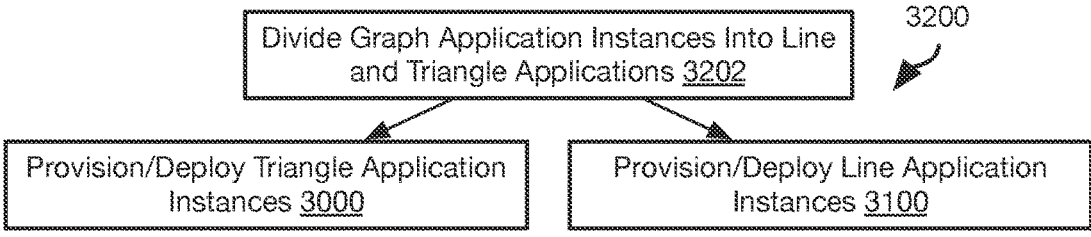
FIG. 32 is a process flow diagram of a method for provisioning a graph application in accordance with an embodiment.
Figure 33:
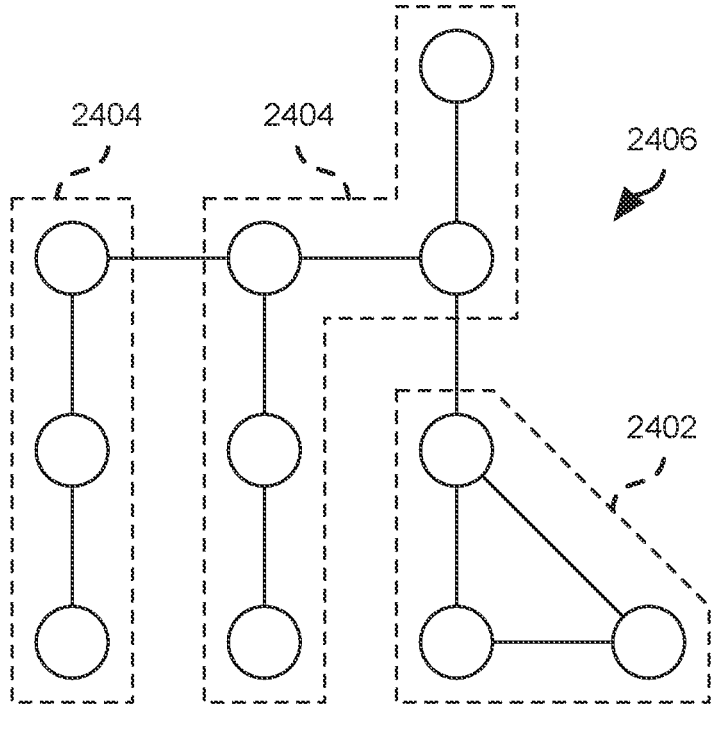
FIG. 33 is a diagram illustrating division of a graph application into line and triangle applications in accordance with an embodiment.

FIGS. 32 and 33 illustrates a method 3200 for deploying graph application instances 2406. The method 3200 may include dividing 3202 the graph application instances 2406 into one or more triangle application instances 2402 and line application instances 2404 as shown in FIG. 33. Dividing 3202 may be performed in view of the a specification of the graph application instances 2406 including explicitly defined triangle application specifications 2700 and/or line application specifications 2800. Dividing may also include analyzing a graph representing the application instances 118 of the graph application instances 2406 to identify triangle application instances 2402 and line application instances 2404.

The method 3200 may include provisioning and deploying the triangle application instances 2402, such as according to the method 3000. The method 3200 may include provisioning and deploying the line application instances 2404, such as according to the method 3100.

The methods 3000, 3100 may be modified in one or more respects when deploying graph application instances 2406. The method 3000 includes evaluating 3010 whether there are any matching cluster groups and the method 3100 includes evaluating 3110 whether there are any matching cluster groups. For the method 3200, a "matching cluster group" may be defined as a matching cluster group including a cluster for each application instances 118 of all of the triangle application instances 2402 and line application instances 2404 of the graph application instances 2406. Thus, in some embodiments, a matching cluster group must simultaneously satisfy all of the requirements of all of the triangle application instances 2402 and line application instances 2404 of the graph application instances 2406. In an alternative approach, the triangle application instances 2402 and line application instances 2404 of the graph application instances 2406 are processed one at a time, such as from largest to smallest (by number of application instances 118) of the triangle application instances 2402 and line application instances 2404 of the graph application instances 2406 or some other ordering. In either approach, if any set of triangle application instances 2402 or line application instances 2404 cannot be provisioned, i.e., an operation fail 3018, 3118, then the method 3200 will fail for the graph application instances. Alternatively, partial failure may be permitted such that a first portion of the triangle application instances and/or line application instances 2404 will be deployed even where a second portion cannot be deployed.

Figure 34:
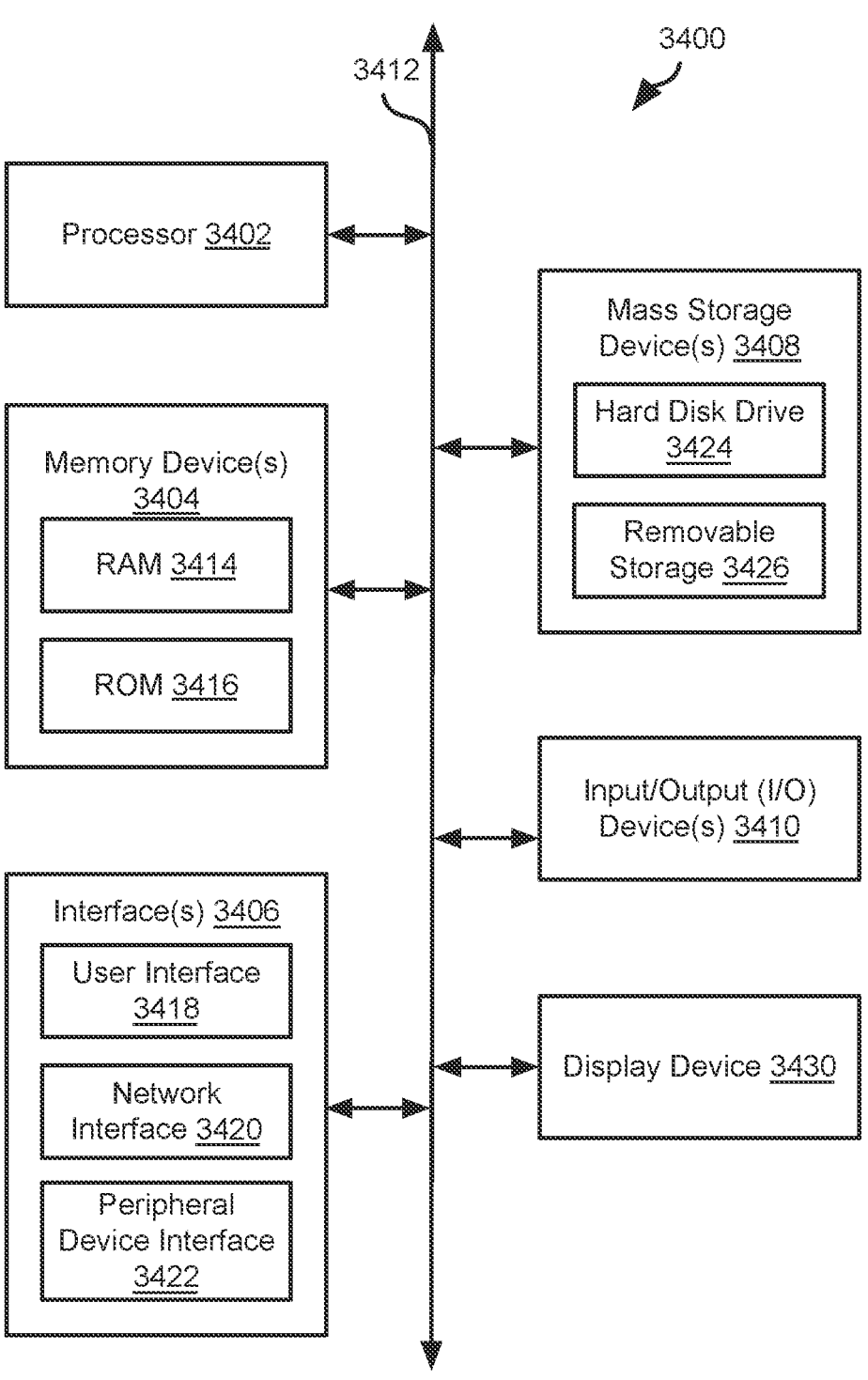
FIG. 34 is a schematic block diagram of an example computing device suitable for implementing methods in accordance with embodiments of the invention.

FIG. 34 is a block diagram illustrating an example computing device 3400. Computing device 3400 may be used to perform various procedures, such as those discussed herein. The servers 102, orchestrator 106, workflow orchestrator 122, vector log agent 126, log processor 130, and cloud computing platform 104 may each be implemented using one or more computing devices 3400. The orchestrator 106, workflow orchestrator 122, vector log agent 126, and log processor 130 may be implemented on different computing devices 3400 or a single computing device 3400 may host two or more of the orchestrator 106, workflow orchestrator 122, vector log agent 126, and log processor 130.

Computing device 3400 includes one or more processor(s) 3402, one or more memory device(s) 3404, one or more interface(s) 3406, one or more mass storage device(s) 3408, one or more Input/output (I/O) device(s) 3410, and a display device 3430 all of which are coupled to a bus 3412. Processor(s) 3402 include one or more processors or controllers that execute instructions stored in memory device(s) 3404 and/or mass storage device(s) 3408. Processor(s) 3402 may also include various types of computer-readable media, such as cache memory.

Memory device(s) 3404 include various computer-readable media, such as volatile memory (e.g., random access memory (RAM) 3414) and/or nonvolatile memory (e.g., read-only memory (ROM) 3416). Memory device(s) 3404 may also include rewritable ROM, such as Flash memory.

Mass storage device(s) 3408 include various computer readable media, such as magnetic tapes, magnetic disks, optical disks, solid-state memory (e.g., Flash memory), and so forth. As shown in FIG. 34, a particular mass storage device is a hard disk drive 3424. Various drives may also be included in mass storage device(s) 3408 to enable reading from and/or writing to the various computer readable media. Mass storage device(s) 3408 include removable media 3426 and/or non-removable media.

I/O device(s) 3410 include various devices that allow data and/or other information to be input to or retrieved from computing device 3400. Example I/O device(s) 3410 include cursor control devices, keyboards, keypads, microphones, monitors or other display devices, speakers, printers, network interface cards, modems, lenses, CCDs or other image capture devices, and the like.

Display device 3430 includes any type of device capable of displaying information to one or more users of computing device 3400. Examples of display device 3430 include a monitor, display terminal, video projection device, and the like.

Interface(s) 3406 include various interfaces that allow computing device 3400 to interact with other systems, devices, or computing environments. Example interface(s) 3406 include any number of different network interfaces 3420, such as interfaces to local area networks (LANs), wide area networks (WANs), wireless networks, and the Internet. Other interface(s) include user interface 3418 and peripheral device interface 3422. The interface(s) 3406 may also include one or more peripheral interfaces such as interfaces for printers, pointing devices (mice, track pad, etc.), keyboards, and the like.

Bus 3412 allows processor(s) 3402, memory device(s) 3404, interface(s) 3406, mass storage device(s) 3408, I/O device(s) 3410, and display device 3430 to communicate with one another, as well as other devices or components coupled to bus 3412. Bus 3412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 3400, and are executed by processor(s) 3402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessorbased or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
   a computing device including one or more processing devices and one or more memory devices operably coupled to the one or more processing devices, the one or more memory devices storing executable code that, when executed by the one or more processing devices, causes the one or more processing devices to:

retrieve provisioning data describing instantiation of a plurality of components on remote servers over a network;

extract component identifiers of the plurality of components from the provisioning data;

retrieve log data from the remote servers without use of an agent executing on the remote servers; and process the provisioning data and the log data to obtain a topology of the plurality of components, the topology including nodes representing the plurality of components and edges representing relationships between pairs of components of the plurality of components.

2. The apparatus of claim 1, wherein the relationships include at least one of hosting relationships, environmental variable relationships, network relationships, session relationships, access relationships, and network connection relationships.

3. The apparatus of claim 1, wherein the relationships include hosting relationships; and
   wherein the executable code, when executed by the one or more processing devices, further causing the one or more processing devices to extract the hosting relationships between the pairs of components of the plurality of components from one or both of the provisioning data and the log data.

4. The apparatus of claim 1, wherein the relationships include environmental variable relationships; and
   wherein the executable code, when executed by the one or more processing devices, further causes the one or more processing devices to extract environmental variable relationships between the pairs of components of the plurality of components from one or both of the provisioning data and the log data.

5. The apparatus of claim 1, wherein the relationships include network relationships; and
   wherein the executable code, when executed by the one or more processing devices, further causes the one or more processing devices to extract the network relationships between the pairs of components of the plurality of components from one or both of the provisioning data and the log data.

6. The apparatus of claim 1, wherein the relationships include session relationships; and
   wherein the executable code, when executed by the one or more processing devices, further causes the one or more processing devices to extract the session relationships between the pairs of components of the plurality of components from one or both of the provisioning data and the log data.

7. The apparatus of claim 1, wherein the relationships include access relationships; and
   wherein the executable code, when executed by the one or more processing devices, further causes the one or more processing devices to extract the access relationships between the pairs of components of the plurality of components from one or both of the provisioning data and the log data.

8. The apparatus of claim 1, wherein the relationships include network connection relationships; and
   wherein the executable code, when executed by the one or more processing devices, further causes the one or more processing devices to extract the network connection relationships between the pairs of components of the plurality of components from one or both of the provisioning data and the log data.

9. The apparatus of claim 1, wherein the executable code, when executed by the one or more processing devices, further causes the one or more processing devices to obtain the provisioning data from a manifest ingested by an orchestrator, the manifest instructing the orchestrator to instantiate the plurality of components.

10. The apparatus of claim 1, wherein the executable code, when executed by the one or more processing devices, further causes the one or more processing devices to:

invoke display of a visual representation of the topology on a display device;

receive an interaction with the visual representation of the topology;

in response to the interaction, modify at least one of the visual representation of the topology and the plurality of components.

11. A method comprising:

retrieving, by a computing device, provisioning data describing instantiation of a plurality of components on remote servers over a network;

extracting, by the computing device, component identifiers of the plurality of components from the provisioning data;

retrieving, by the computing device, log data from the remote servers without use of an agent executing on the remote servers; and processing, by the computing device, the provisioning data and the log data to obtain a topology of the plurality of components, the topology including nodes representing the plurality of components and edges representing relationships between pairs of components of the plurality of components.

12. The method of claim 11, wherein the relationships include at least one of hosting relationships, environmental variable relationships, network relationships, session relationships, access relationships, and network connection relationships.

13. The method of claim 11, wherein the relationships include hosting 13. relationships; and wherein the method further comprises extracting the hosting relationships between the pairs of components of the plurality of components from one or both of the provisioning data and the log data.

14. The method of claim 11, wherein the relationships include environmental variable relationships; and wherein the method further comprises extracting the environmental variable relationships between the pairs of components of the plurality of components from one or both of the provisioning data and the log data.

15. The method of claim 11, wherein the relationships include network relationships; and wherein the method further comprises extracting the network relationships between the pairs of components of the plurality of components from one or both of the provisioning data and the log data.

16. The method of claim 11, wherein the relationships include session relationships; and wherein the method further comprises extracting the session relationships between the pairs of components of the plurality of components from one or both of the provisioning data and the log data.

17. The method of claim 11, wherein the relationships include access relationships; and wherein the method further comprises extracting the access relationships between the pairs of components of the plurality of components from one or both of the provisioning data and the log data.

18. The method of claim 11, wherein the relationships include network connection relationships; and wherein the method further comprises extracting the network connection relationships between the pairs of components of the plurality of components from one or both of the provisioning data and the log data.

19. The method of claim 11, wherein the method further comprises obtaining, by the computing device, the provisioning data from a manifest ingested by an orchestrator, the manifest instructing the orchestrator to instantiate the plurality of components.

20. The method of claim 11, wherein the method further comprises invoking, by the computing device, display of a visual representation of the topology on a display device;

receiving, by the computing device, an interaction with the visual representation of the topology;

in response to the interaction, modifying, by the computing device, at least one of the visual representation of the topology and the plurality of components.

* * * * *